(12) United States Patent
Balasubramanian et al.

(10) Patent No.: US 11,461,215 B2
(45) Date of Patent: Oct. 4, 2022

(54) WORKFLOW ANALYZER SYSTEM AND METHODS

(71) Applicant: ATOS SYNTEL, INC., Troy, MI (US)

(72) Inventors: Ashok Balasubramanian, Chennai (IN); Girish Chhabra, Maharashtra (IN); Karthikeyan Krishnaswamy Raja, Chennai (IN); Swapnil Shankar Jadhao, Maharashtra (IN); Mohammad Hamza Ansari, Maharashtra (IN)

(73) Assignee: ATOS FRANCE, Bezons (FR)

( * ) Notice: Subject to any disclaimer, the term of this patent is extended or adjusted under 35 U.S.C. 154(b) by 568 days.

(21) Appl. No.: 16/535,920

(22) Filed: Aug. 8, 2019

(65) Prior Publication Data
US 2020/0050529 A1 Feb. 13, 2020

Related U.S. Application Data

(60) Provisional application No. 62/716,069, filed on Aug. 8, 2018.

(51) Int. Cl.
| | |
|---|---|
| *G06F 11/34* | (2006.01) |
| *G06F 9/451* | (2018.01) |
| *G06F 21/60* | (2013.01) |
| *G06N 20/00* | (2019.01) |
| *G06F 40/30* | (2020.01) |
| *G06F 8/30* | (2018.01) |
| *G06Q 10/06* | (2012.01) |
| *H04L 9/06* | (2006.01) |
| *G06V 10/75* | (2022.01) |
| *G11B 27/00* | (2006.01) |
| *H04N 5/76* | (2006.01) |

(52) U.S. Cl.
CPC .......... *G06F 11/3447* (2013.01); *G06F 8/30* (2013.01); *G06F 9/451* (2018.02); *G06F 11/3423* (2013.01); *G06F 11/3438* (2013.01); *G06F 11/3452* (2013.01); *G06F 21/602* (2013.01); *G06F 40/30* (2020.01); *G06N 20/00* (2019.01); *G06Q 10/0633* (2013.01); *G06V 10/751* (2022.01); *H04L 9/065* (2013.01); *G11B 27/005* (2013.01); *H04N 5/76* (2013.01)

(58) Field of Classification Search
CPC .................................................. G06F 11/344
See application file for complete search history.

(56) References Cited

U.S. PATENT DOCUMENTS

2003/0212580 A1\* 11/2003 Shen ...................... G06F 17/60
2003/0233374 A1 12/2003 Spinola et al.
(Continued)

OTHER PUBLICATIONS

"BPMN 2.0 by Example Version 1.0 (non-normative)", Jun. 2010, pp. 1-47, https://www.omg.org/spec/BPMN/2.0/examples/PDF.

*Primary Examiner* — James J Debrow
(74) *Attorney, Agent, or Firm* — ARC IP Law, PC; Joseph J. Mayo

(57) ABSTRACT

System and methods for analyzing workflow processes by recording a series of screen captures in real-time that can assist in capturing the steps for completing the business workflow process across one or more business applications in a workflow data file. The workflow data file includes a graphical representation of the steps in a sequential order for performing the business workflow process. The workflow data file is compatible with a workflow application.

45 Claims, 36 Drawing Sheets

(56) References Cited

U.S. PATENT DOCUMENTS

| | | |
|---|---|---|
| 2004/0103409 A1 | 5/2004 | Hayner et al. |
| 2005/0144150 A1 | 6/2005 | Ramamurthy et al. |
| 2007/0067373 A1* | 3/2007 | Higgins et al. ......... G06F 17/30 |
| 2008/0288621 A1* | 11/2008 | Snell et al. ............ G06F 15/173 |
| 2010/0223557 A1* | 9/2010 | Kenney et al. ........... G06F 3/01 |
| 2011/0038542 A1 | 2/2011 | Barkan et al. |
| 2012/0210234 A1* | 8/2012 | Bonforte et al. ......... G06F 3/00 |
| 2015/0067520 A1* | 1/2015 | Kovacs et al. ........ G06F 3/0484 |
| 2016/0110814 A1* | 4/2016 | Harris et al. ........... G06Q 40/06 |

\* cited by examiner

Activity Time for Workflow: SearchClaim

1200

| S.No | Control Type | Activity | In Time(hh:mm:ss) | Out Time(hh:mm:ss) | Total Time(hh:mm:ss) | Screen Name | Screen-In | Screen-Out | Screen-Spent Time |
|---|---|---|---|---|---|---|---|---|---|
| 1 | TextBox | Enter User Name | 18:19:15 | 18:19:20 | 00:00:05 | Login | 18:19:15 | 18:19:24 | 00:00:09 |
| 2 | TextBox | Enter Password | 18:19:20 | 18:19:25 | 00:00:05 | | | | |
| 3 | TD | Click Login Button | 18:19:25 | 18:19:34 | 00:00:09 | | | | |
| 4 | Div | Search Claim Data (inserted) | 18:19:36 | 18:19:44 | 00:00:08 | Home | 18:19:36 | 18:19:23 | 00:00:09 |
| 5 | TextBox | View Claim Data (Inserted) | 18:19:20 | 18:19:24 | 00:00:04 | | | | |
| 6 | Custom | Click on Logout | 18:19:34 | 18:19:44 | 00:00:10 | Logout | 18:19:34 | 18:19:44 | 00:00:10 |

Total Time 00:00:43

Complexity Score: 16 — Low
Feasibility Score: 100 — High 1265  1270  1275  1280  1260 Activity Listing Copyright 2018 Syntel, Inc.

WORKFLOW ANALYZER SYSTEM AND METHODS

PRIORITY APPLICATION

This non-provisional application claims the benefit of priority of U.S. Provisional Patent Application No. 62/716,069, filed on Aug. 8, 2018, which is hereby incorporated herein by reference in its entirety.

FIELD OF INVENTION

Embodiments of the present invention are generally directed to recording a series of screen captures in real-time for generating a business workflow process.

BACKGROUND

Knowledge of managerial aspects for a given business process is often not a priority unless it becomes absolutely necessary. For instance, where the applications for performing a business process and steps for performing the business process are stable and new issues do not frequently arise, the quantum and quality of business process documents are very low.

However, the current knowledge of the business process (namely, the exact modus operandi) becomes important if the business process changes, or is about to change, either partially or completely. There can be a number of business drivers that necessitate a change in a business process such as change in a business portfolio, adherence to a compliance requirement or standard, improvement in productivity or demand, or for a similar reason.

The depth of knowledge to be captured for the business process varies from business to business depending upon the criticality of the business process. For a very critical business process, every minute detail of its execution is noted and verified whereas for a non-critical business process, the details are captured at high level.

SUMMARY

Systems and methods for capturing the process flow knowledge, automation complexity and feasibility of a business process are described herein. A series of screen captures from one or more workflows for a given business process are recorded on one or more end user's machine to generate raw recordings. The raw recordings can then modified by performing a noise reduction (elimination of steps that are not required, or are not part of the identified workflow), re-captioning, data enrichment (enrichment of one or more steps with more specific details), or a similar function.

A workflow data file is generated based on the modified or non-modified raw recordings. The workflow data file can contain a linear representation of a workflow process. If the linear representation of the workflow process does not provide a holistic view of the entire business process, linear workflows are superimposed over each other to form a uniform one-view representation of the workflow process. The superimposed (or merged) workflows are a complete representation of the process and are a guiding aid to managerial aspects of the workflow process and process automation mapping.

Various embodiments can comprise a method of analyzing a workflow process using a plurality of screen captures, the method including: recording the plurality of screen captures in real-time to generate a plurality of raw recordings, the plurality of screen captures occurring in series, and each of the plurality of screen captures occurring on a control business application; generating, using a processor, a workflow data file based on the plurality of raw recordings, the workflow data file including a graphical representation of steps in a sequential order for performing the workflow process, the workflow data file being compatible with a workflow application; capturing user-interaction based data during the recording of the plurality of screen captures; and generating an operational metrics report for the workflow process, in which the operational metrics report including at least one selected from the group consisting of workflow scope, workflow metrics, application inflight time, platform distribution, web distribution, windows distribution, mainframe distribution, and a time-and-motion study, and in which the user-interaction based data includes at least one selected from the group consisting of a click, a tab, a keystroke, mouse coordinates, a number of used-control applications, a number of used-control platforms, audio and video, and in which the workflow data file is further based on the user-interaction based data.

The method can further include measuring a total number of hours taken to perform the workflow process according to the workflow data file; and reporting the total number of hours in the operational metrics report.

The operational metrics report can include at least one selected from the group consisting of an automation complexity score and a feasibility score, and the generating of the workflow data file can include using at least one selected from the group consisting of the automation complexity score and the feasibility score.

The workflow scope can include pre and post activities carried out by a user in order to execute a workflow; and workflow metrics can include mathematical indices that are automatically calculated including at least one selected from the group consisting of a count of business applications within the workflow, a number of hops between each application, a duration of workflow before and after cleanup activities, and a number of activities within the workflow before and after cleanup. The application inflight time can include an identification of a platform and a time consumed by a user on a business application to identify a potential automation candidate application for consideration to be automated; and the platform distribution can include an overall time consumed by the user on the platform; the web distribution can include a listing of applications that are web based; the Windows distribution can include a listing of applications that are windows based; and the mainframe distribution can include a listing of mainframe applications.

The automation complexity score and the feasibility score can be calculated based on a plurality of attributes including at least one selected from the group consisting of a like automation ID, class name, xpath, cognitive computing required status, robotic processing automation status, structured nature of input format, count of inputs, percentage distribution of types of inputs, underlying technology and platform of business application, real time processing requirements, third party integration, annual volume, database/network access requirements within that workflow, need for standardization of workflow, and natural language processing.

The method can further include superimposing multiple graphical representations each corresponding to one of a plurality of linear workflows to generate a merged graphical representation of a common workflow; identifying one or more activities that are common among said plurality of linear workflows; and calculating a count of a frequency of occurrence of each said activity that is common among said plurality of linear workflows, in which the superimposing includes superimposing one or more most-visited-paths to identify high-traffic routes of interactions to identify priority tasks in an automation roadmap.

The recording of the plurality of screen captures can be selective.

The workflow application can be a diagramming and vector graphics application, and the workflow data file can be in a .bpmn format, a .vsd file format, a vsdx. file format, a .vsdm file format, or a .vdx file format.

The plurality of screen captures can be each in an active-time window, and the recording of the plurality of screen captures may be paused if the active-time window is closed, and may resume if the active-time window is opened.

The method can further include automatically identifying activity that requires cognitive computing.

The method can further include generating source code for the workflow data file in at least one software language based on the plurality of raw recordings.

The generating of the workflow data file can further include encrypting at rest each of the plurality of raw recordings or metadata of the plurality of raw recordings using 2-phase 256 bit encryption to prevent output of the raw recordings in clear text.

The method can further include capturing a technical attribute during the recording of the plurality of screen captures; and predicting a caption for each of the plurality of screen captures based on one or more of the technical attribute, historical references, and a standardized caption for each of the plurality of screen captures based on similar captions using natural language processing, in which the technical attribute includes at least one selected from the group consisting of a control ID, a control type, a control name, a class name, a control-data value, an x-path, a process name, a process ID, a process description, a name of the control application and a name of the control application screen.

The recording of the plurality of screen captures can occur across two or more computer monitors, in which the two or more computers monitors can have different resolutions, and in which the recording of the plurality of screen captures can include adjusting a resolution of the plurality of raw recordings during the recording to provide uniform resolution among screen captures from said two more computers.

The method can further include recording A/V data associated with the plurality of screen captures during the recording to generate a plurality of A/V raw recordings; and adjusting a playback rate of the plurality of A/V raw recordings to correspond to a playback rate of the plurality of raw recordings.

Various embodiments can comprise a system for analyzing a workflow process using a plurality of screen captures, the system including: a recorder configured to record the plurality of screen captures in real-time to generate a plurality of raw recordings, the plurality of screen captures occurring in series, and each of the plurality of screen captures occurring on a control business application; a processor configured to generate a workflow data file based on the plurality of raw recordings, the workflow data file including a graphical representation of steps in a sequential order for performing the workflow process, the workflow data file being compatible with a workflow application; capture user-interaction based data during the recording of the plurality of screen captures; and generate an operational metrics report for the workflow process, in which the operational metrics report can include at least one selected from the group consisting of workflow scope, workflow metrics, application inflight time, platform distribution, web distribution, windows distribution, mainframe distribution, and a time-and-motion study, in which the user-interaction based data can include at least one selected from the group consisting of a click, a tab, a keystroke, mouse coordinates, a number of used-control applications, a number of used-control platforms, audio and video, and in which the workflow data file is further based on the user-interaction based data.

The processor can be further configured to measure a total number of hours taken to perform the workflow process according to the workflow data file; and report the total number of hours in the operational metrics report.

The operational metrics report can include at least one selected from the group consisting of an automation complexity score and a feasibility score, and the generating of the workflow data file can include using at least one selected from the group consisting of the automation complexity score and the feasibility score. The workflow scope can include pre and post activities carried out by a user in order to execute a workflow; the workflow metrics can include mathematical indices that are automatically calculated including at least one selected from the group consisting of a count of business applications within the workflow, a number of hops between each application, a duration of workflow before and after cleanup activities, and a number of activities within the workflow before and after cleanup; the application inflight time can include an identification of a platform and a time consumed by a user on a business application to identify a potential automation candidate application for consideration to be automated; the platform distribution can include an overall time consumed by the user on the platform; the web distribution can include a listing of applications that are web based; the Windows distribution can include a listing of applications that are windows based; and the mainframe distribution can include a listing of mainframe applications.

The automation complexity score and the feasibility score can be calculated based on a plurality of attributes including at least one selected from the group consisting of a like automation ID, class name, xpath, cognitive computing required status, robotic processing automation status, structured nature of input format, count of inputs, percentage distribution of types of inputs, underlying technology and platform of business application, real time processing requirements, third party integration, annual volume, database/network access requirements within that workflow, need for standardization of workflow, and natural language processing.

The processor can be further configured to superimpose multiple graphical representations each corresponding to one of a plurality of linear workflows to generate a merged graphical representation of a common workflow; identify one or more activities that are common among said plurality of linear workflows; and calculate a count of a frequency of occurrence of each said activity that is common among said plurality of linear workflows, in which the superimposing includes superimposing one or more most-visited-paths to identify high-traffic routes of interactions to identify priority tasks in an automation roadmap.

The recording of the plurality of screen captures can be selective.

The workflow application can be a diagramming and vector graphics application, and the workflow data file can be in a .bpmn format, a .vsd file format, a vsdx. file format, a .vsdm file format, or a .vdx file format.

The plurality of screen captures can be each in an active-time window, and the recording of the plurality of screen captures may be paused if the active-time window is closed, and may resume if the active-time window is opened.

The processor can be further configured to automatically identify activity that requires cognitive computing.

The processor can be further configured to generate source code for the workflow data file in at least one software language based on the plurality of raw recordings.

The generating of the workflow data file can include encrypting at rest each of the plurality of raw recordings or metadata of the plurality of raw recordings using 2-phase 256 bit encryption to prevent output of the raw recordings in clear text.

The processor can be further configured to capture a technical attribute during the recording of the plurality of screen captures; and to predict a caption for each of the plurality of screen captures based on one or more of the technical attribute, historical references, and a standardized caption for each of the plurality of screen captures based on similar captions using natural language processing, in which the technical attribute includes at least one selected from the group consisting of a control ID, a control type, a control name, a class name, a control-data value, an x-path, a process name, a process ID, a process description, a name of the control application and a name of the control application screen.

The recording of the plurality of screen captures can occur across two or more computer monitors, the two or more computers monitors can have different resolutions, and the recording of the plurality of screen captures can include adjusting a resolution of the plurality of raw recordings during the recording to provide uniform resolution among screen captures from said two more computers.

The processor can be further configured to record A/V data associated with the plurality of screen captures during the recording to generate a plurality of A/V raw recordings; and to adjust a playback rate of the plurality of A/V raw recordings to correspond to a playback rate of the plurality of raw recordings.

Various embodiments can comprise a non-transitory computer readable medium having instructions embodied thereon that, when executed by a processor, cause the processor to perform operations including: recording the plurality of screen captures in real-time to generate a plurality of raw recordings, the plurality of screen captures occurring in series, and each of the plurality of screen captures occurring on a control business application; generating, using a processor, a workflow data file based on the plurality of raw recordings, the workflow data file including a graphical representation of steps in a sequential order for performing the workflow process, the workflow data file being compatible with a workflow application; capturing user-interaction based data during the recording of the plurality of screen captures; and generating an operational metrics report for the workflow process, wherein the operational metrics report can include at least one selected from the group consisting of workflow scope, workflow metrics, application inflight time, platform distribution, web distribution, windows distribution, mainframe distribution, and a time-and-motion study, the user-interaction based data can include at least one selected from the group consisting of a click, a tab, a keystroke, mouse coordinates, a number of used-control applications, a number of used-control platforms, audio and video, and the workflow data file can be further based on the user-interaction based data.

The operations can further include measuring a total number of hours taken to perform the workflow process according to the workflow data file; and reporting the total number of hours in the operational metrics report. The operational metrics report can include at least one selected from the group consisting of an automation complexity score and a feasibility score, and the generating of the workflow data file can include using at least one selected from the group consisting of the automation complexity score and the feasibility score.

The workflow scope can include pre and post activities carried out by a user in order to execute a workflow; the workflow metrics can include mathematical indices that are automatically calculated including at least one selected from the group consisting of a count of business applications within the workflow, a number of hops between each application, a duration of workflow before and after cleanup activities, and a number of activities within the workflow before and after cleanup; the application inflight time can include an identification of a platform and a time consumed by a user on a business application to identify a potential automation candidate application for consideration to be automated; the platform distribution can include an overall time consumed by the user on the platform; the web distribution can include a listing of applications that are web based; the Windows distribution can include a listing of applications that are windows based; and the mainframe distribution can include a listing of mainframe applications.

The automation complexity score and the feasibility score can be calculated based on a plurality of attributes including at least one selected from the group consisting of a like automation ID, class name, xpath, cognitive computing required status, robotic processing automation status, structured nature of input format, count of inputs, percentage distribution of types of inputs, underlying technology and platform of business application, real time processing requirements, third party integration, annual volume, database/network access requirements within that workflow, need for standardization of workflow, and natural language processing. The operations can further include superimposing multiple graphical representations each corresponding to one of a plurality of linear workflows to generate a merged graphical representation of a common workflow; identifying one or more activities that are common among said plurality of linear workflows; and calculating a count of a frequency of occurrence of each said activity that is common among said plurality of linear workflows, in which the superimposing can include superimposing one or more most-visited-paths to identify high-traffic routes of interactions to identify priority tasks in an automation roadmap.

The recording of the plurality of screen captures can be selective.

The workflow application can be a diagramming and vector graphics application, and the workflow data file can be in a .bpmn format, a .vsd file format, a vsdx. file format, a .vsdm file format, or a .vdx file format.

The plurality of screen captures can be each in an active-time window, and the recording of the plurality of screen captures may be paused if the active-time window is closed, and may resume if the active-time window is opened.

The operations can further include automatically identifying activity that requires cognitive computing.

The operations can further include generating source code for the workflow data file in at least one software language based on the plurality of raw recordings.

The generating of the workflow data file can include encrypting at rest each of the plurality of raw recordings or metadata of the plurality of raw recordings using 2-phase 256 bit encryption to prevent output of the raw recordings in clear text.

The operations can further include capturing a technical attribute during the recording of the plurality of screen captures; and predicting a caption for each of the plurality of screen captures based on one or more of the technical attribute, historical references, and a standardized caption for each of the plurality of screen captures based on similar captions using natural language processing, in which the technical attribute includes at least one selected from the group consisting of a control ID, a control type, a control name, a class name, a control-data value, an x-path, a process name, a process ID, a process description, a name of the control application and a name of the control application screen.

The recording of the plurality of screen captures can occur across two or more computer monitors, the two or more computers monitors can have different resolutions, and the recording of the plurality of screen captures can include adjusting a resolution of the plurality of raw recordings during the recording to provide uniform resolution among screen captures from said two more computers.

The operations can further include recording A/V data associated with the plurality of screen captures during the recording to generate a plurality of A/V raw recordings; and adjusting a playback rate of the plurality of A/V raw recordings to correspond to a playback rate of the plurality of raw recordings.

BRIEF DESCRIPTION OF THE DRAWINGS

Embodiments will be more clearly understood from the following detailed description taken in conjunction with the accompanying drawings. FIGS. 1-29 represent non-limiting, embodiments as described herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1:
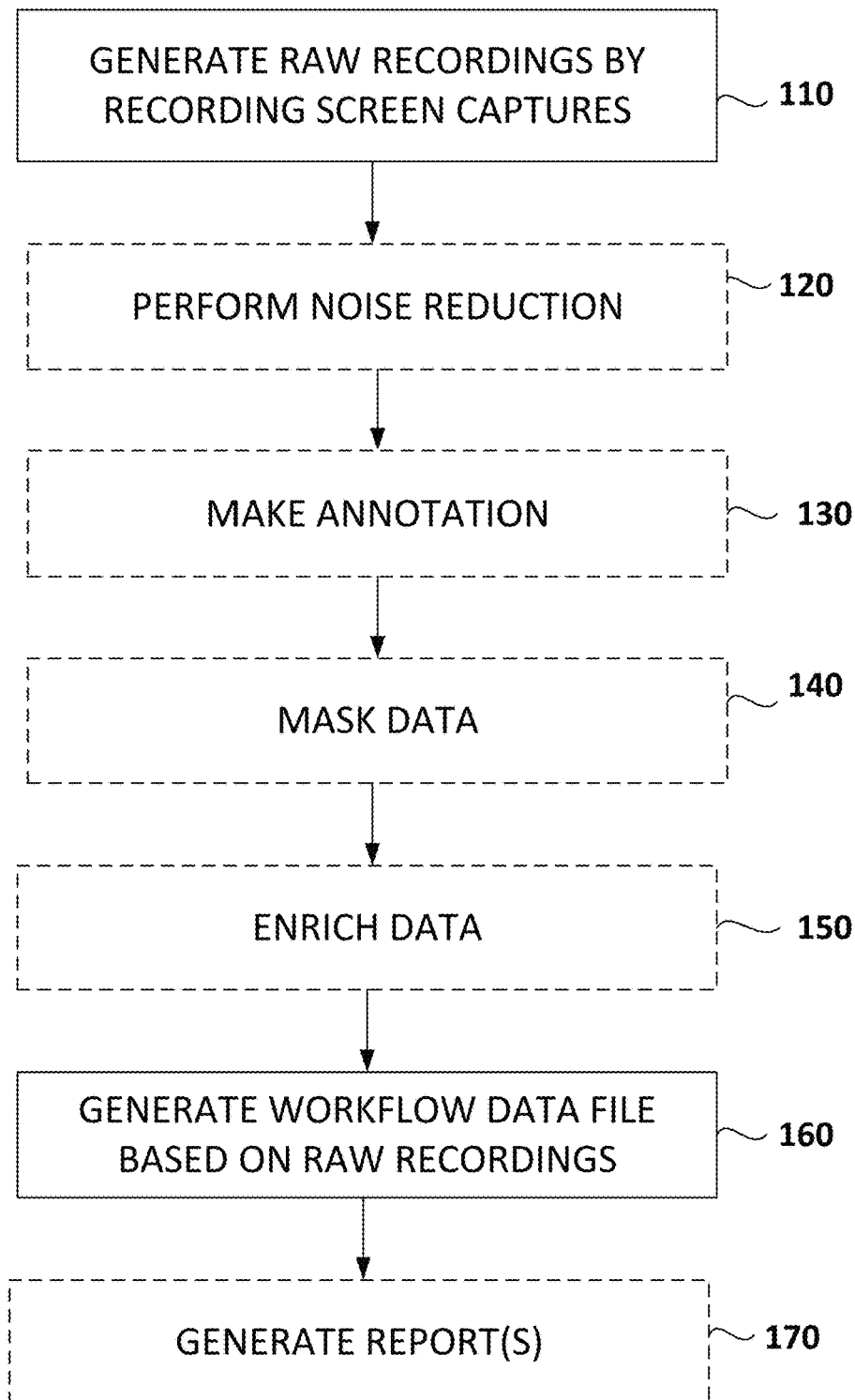

FIG. 1 is a flow diagram of generating a workflow process according to an embodiment.

Figure 2A:
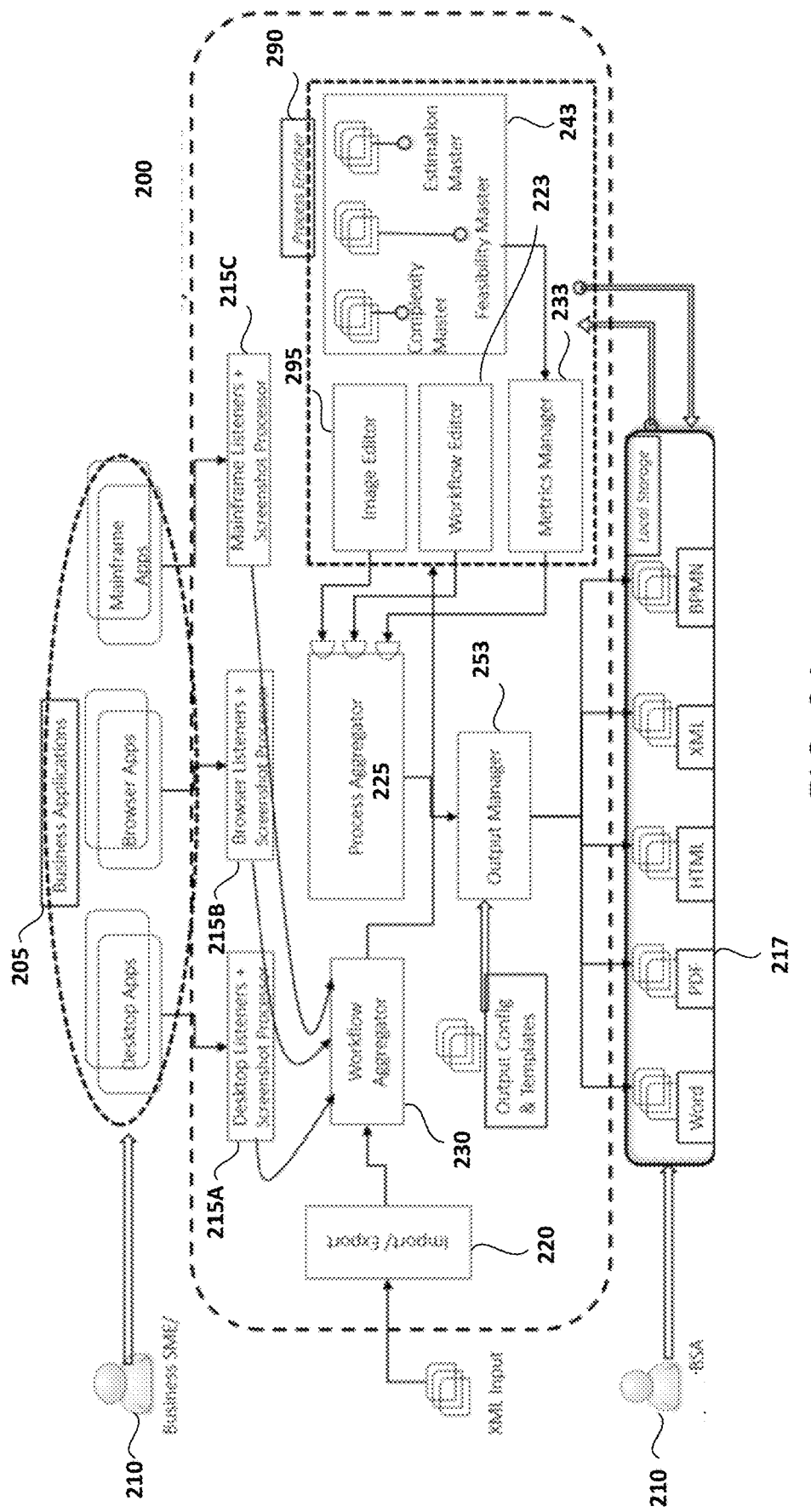
Figure 2B:
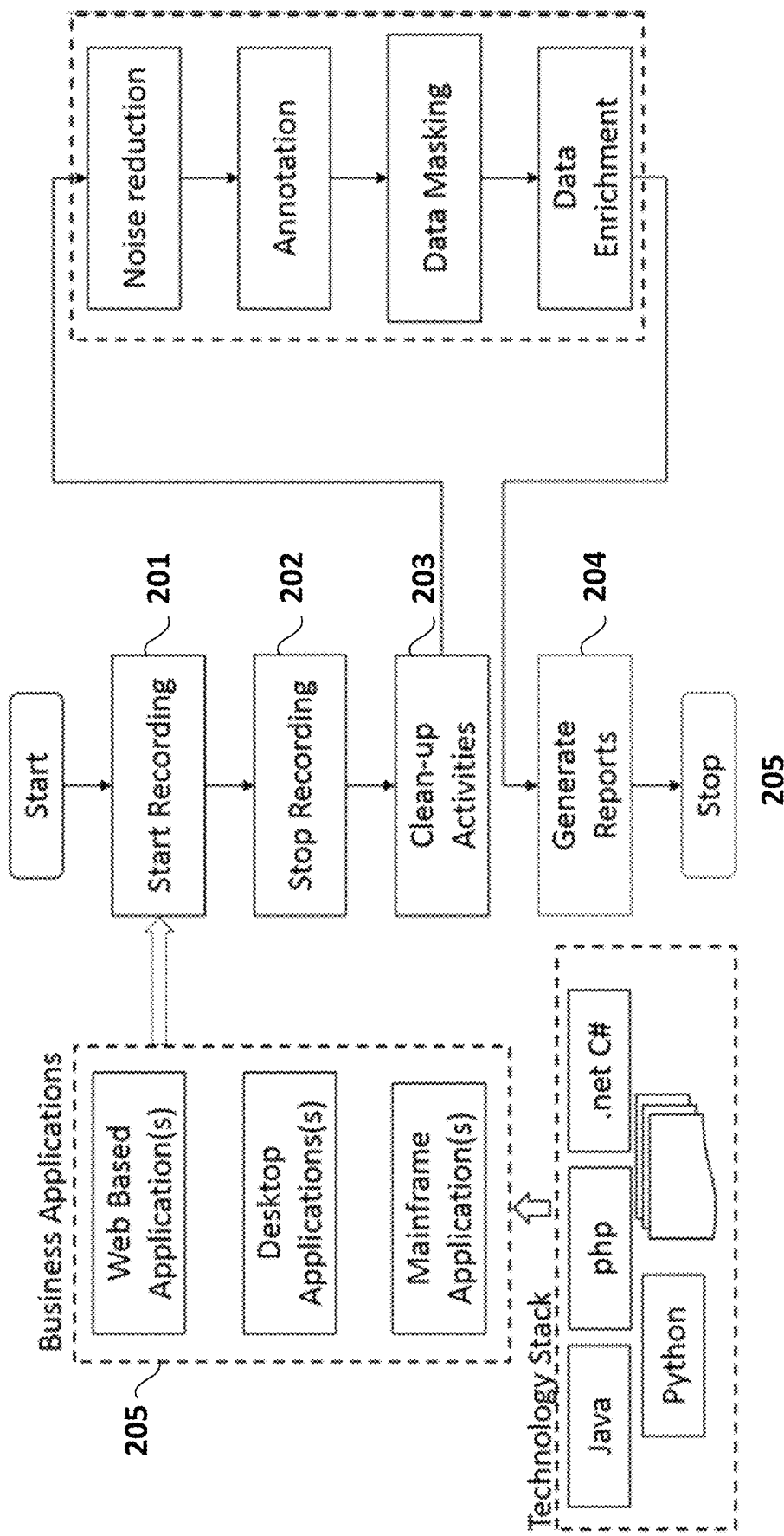

FIG. 2A is a recorder system for generating a workflow process according to an embodiment. FIG. 2B is a flow diagram of the steps for generating a workflow process using the recorder system in FIG. 2A according to an embodiment.

Figure 3:
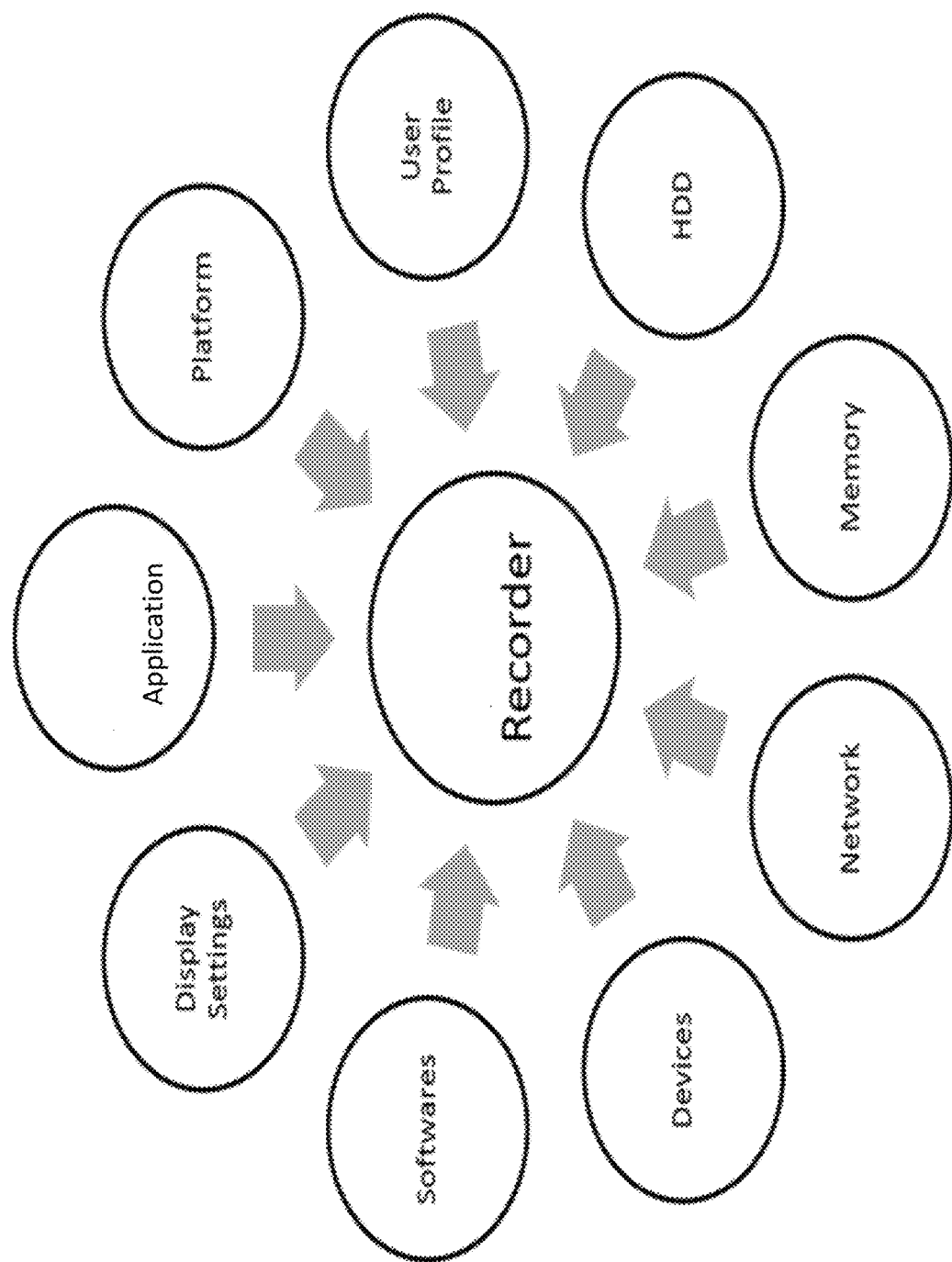

FIG. 3 is a diagram of inputs for a recorder system according to an embodiment.

Figure 4:
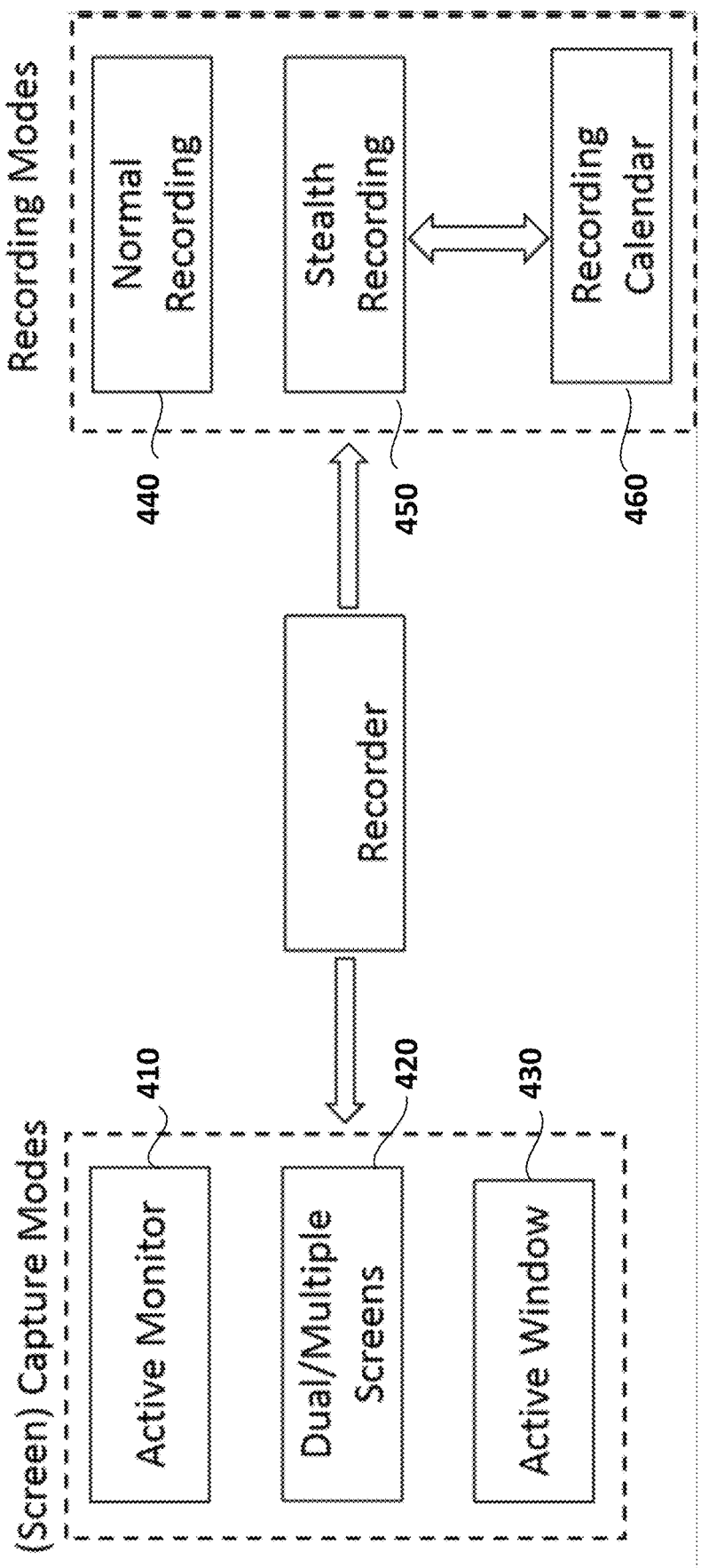

FIG. 4 is a diagram of screen capture modes of a business application and recording modes of a recorder system according to an embodiment.

Figure 5A:
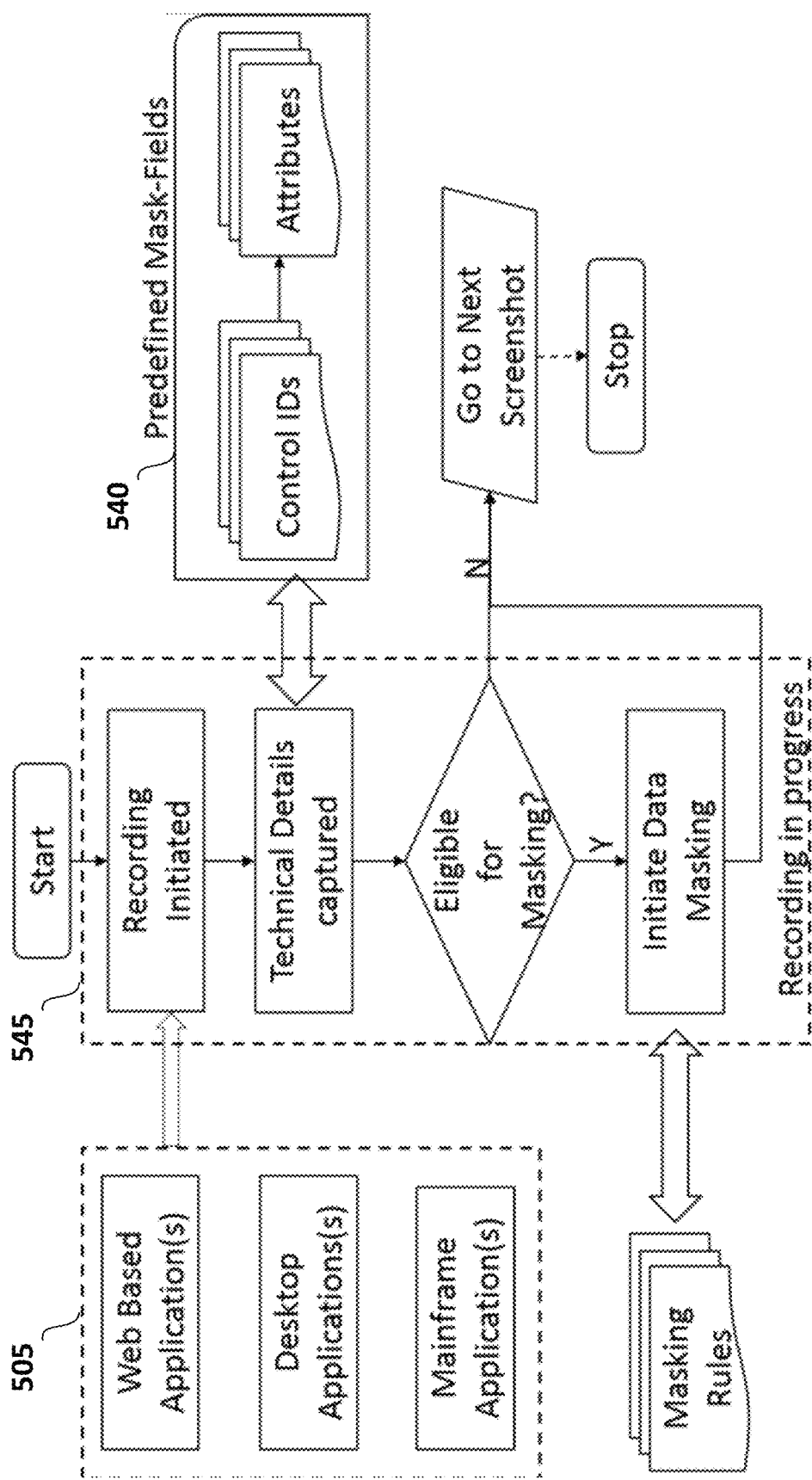
Figure 5B:
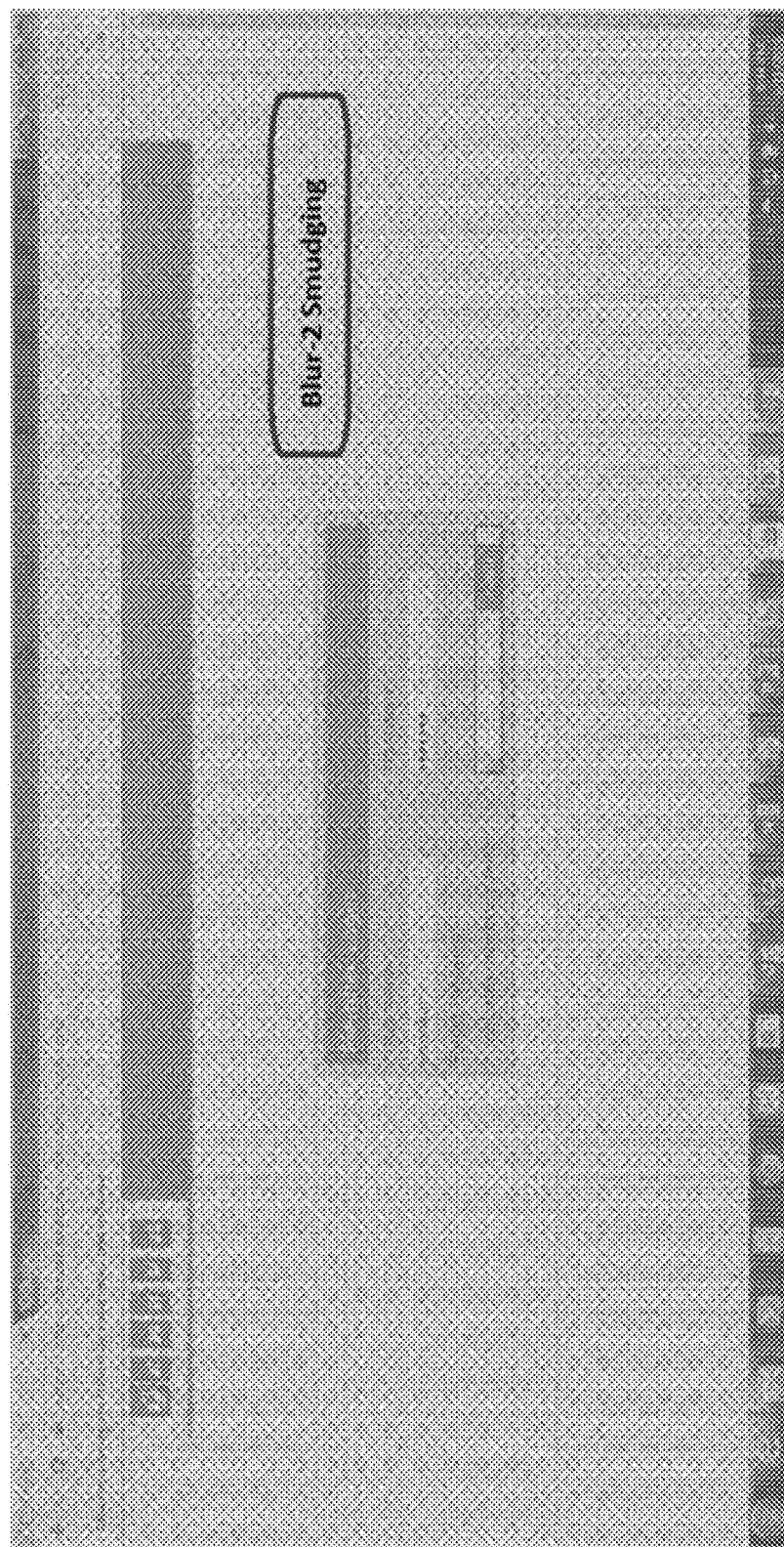

FIG. 5A is a flow diagram of in-process data masking according to an embodiment. FIG. 5B is a blurred screen capture according to an embodiment.

Figure 6:
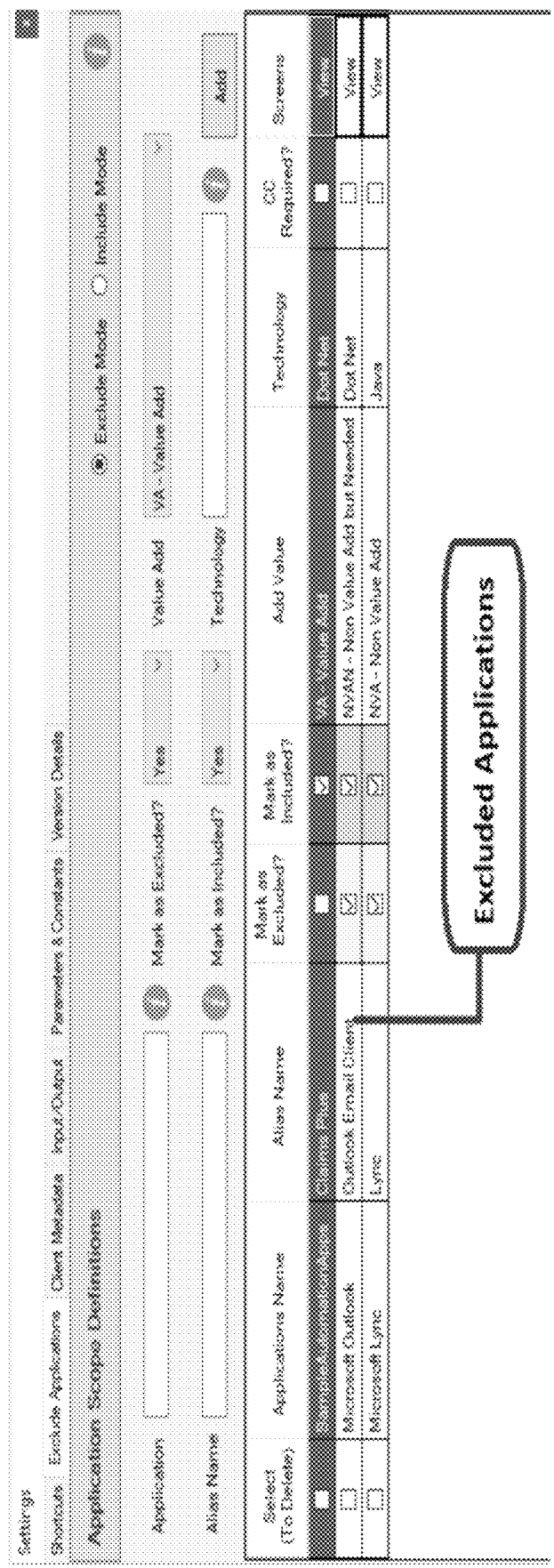

FIG. 6 is a screenshot of include/exclude settings in a recorder system according to an embodiment.

Figure 7:
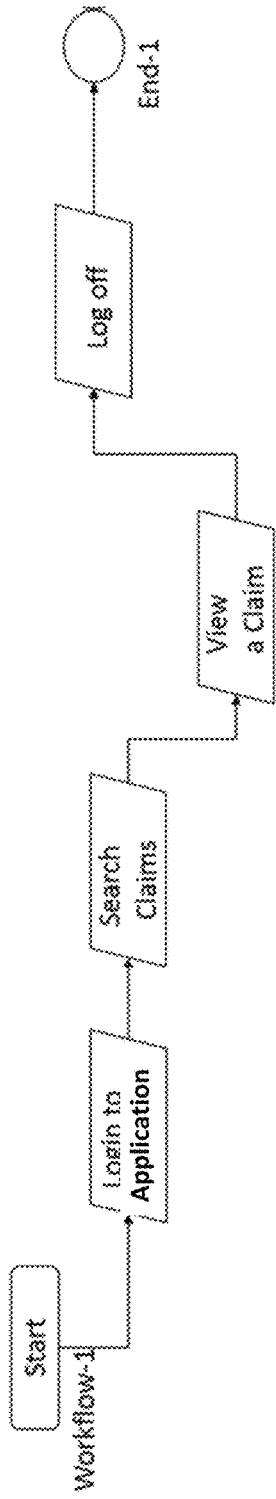

FIG. 7 is a flow diagram of a series of the activities performed by the individual in Example 1.

Figure 8:
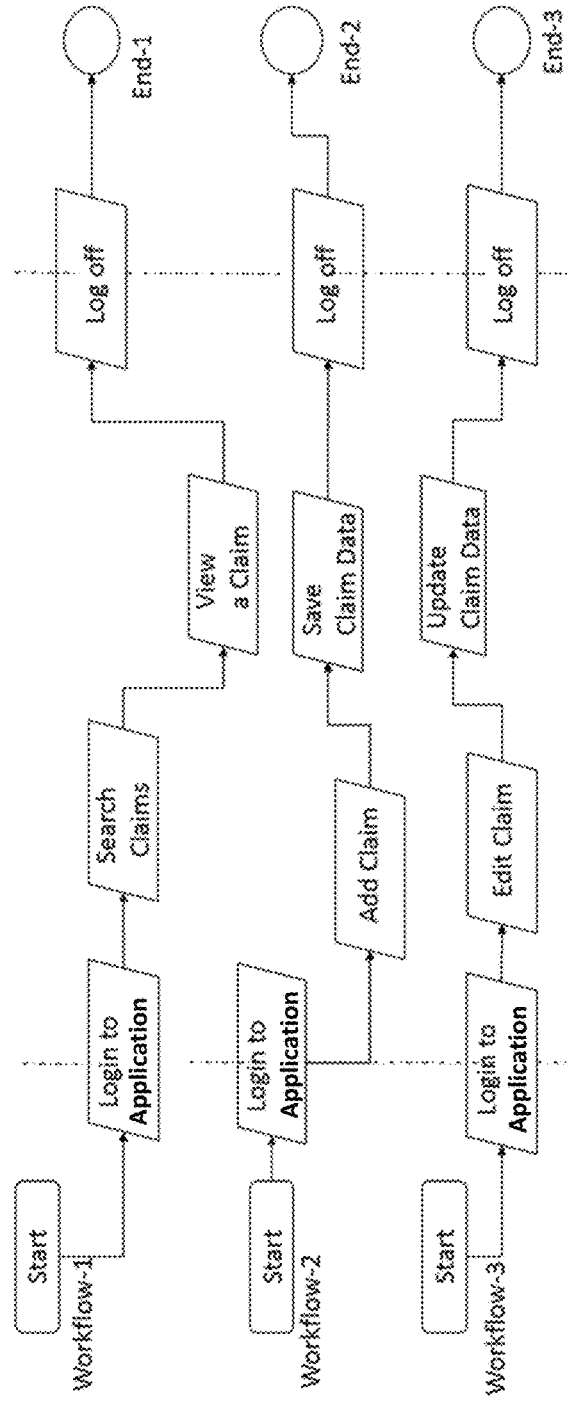
Figure 9:
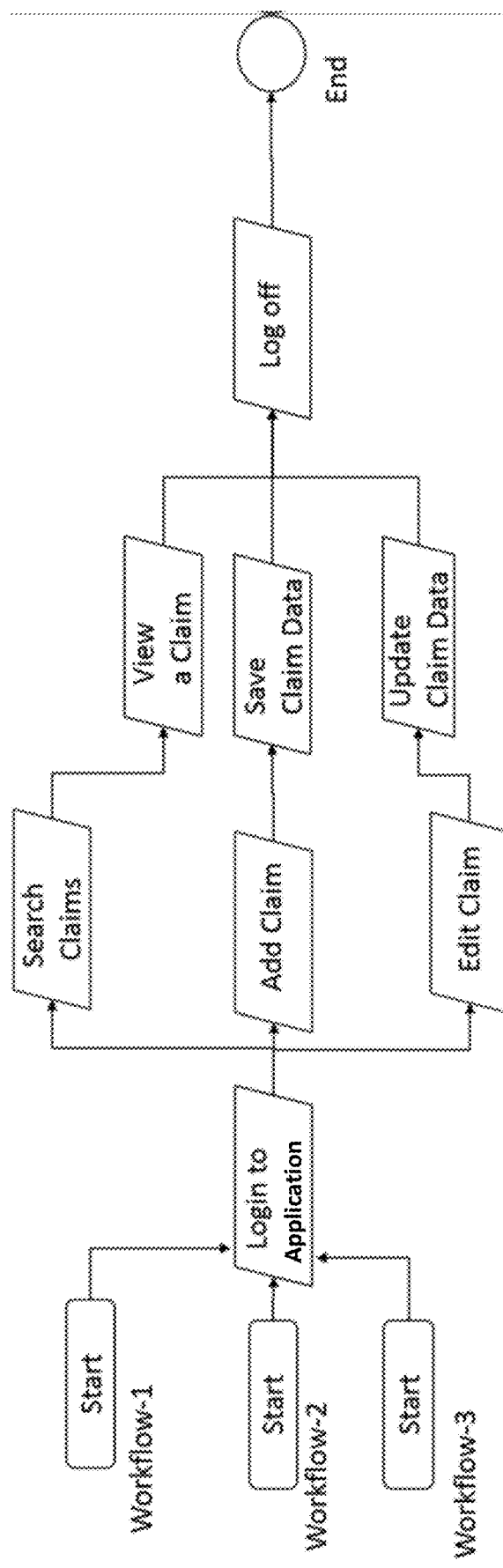

FIGS. 8 and 9 are flow diagrams of superimposed workflows according to embodiments.

Figure 10:
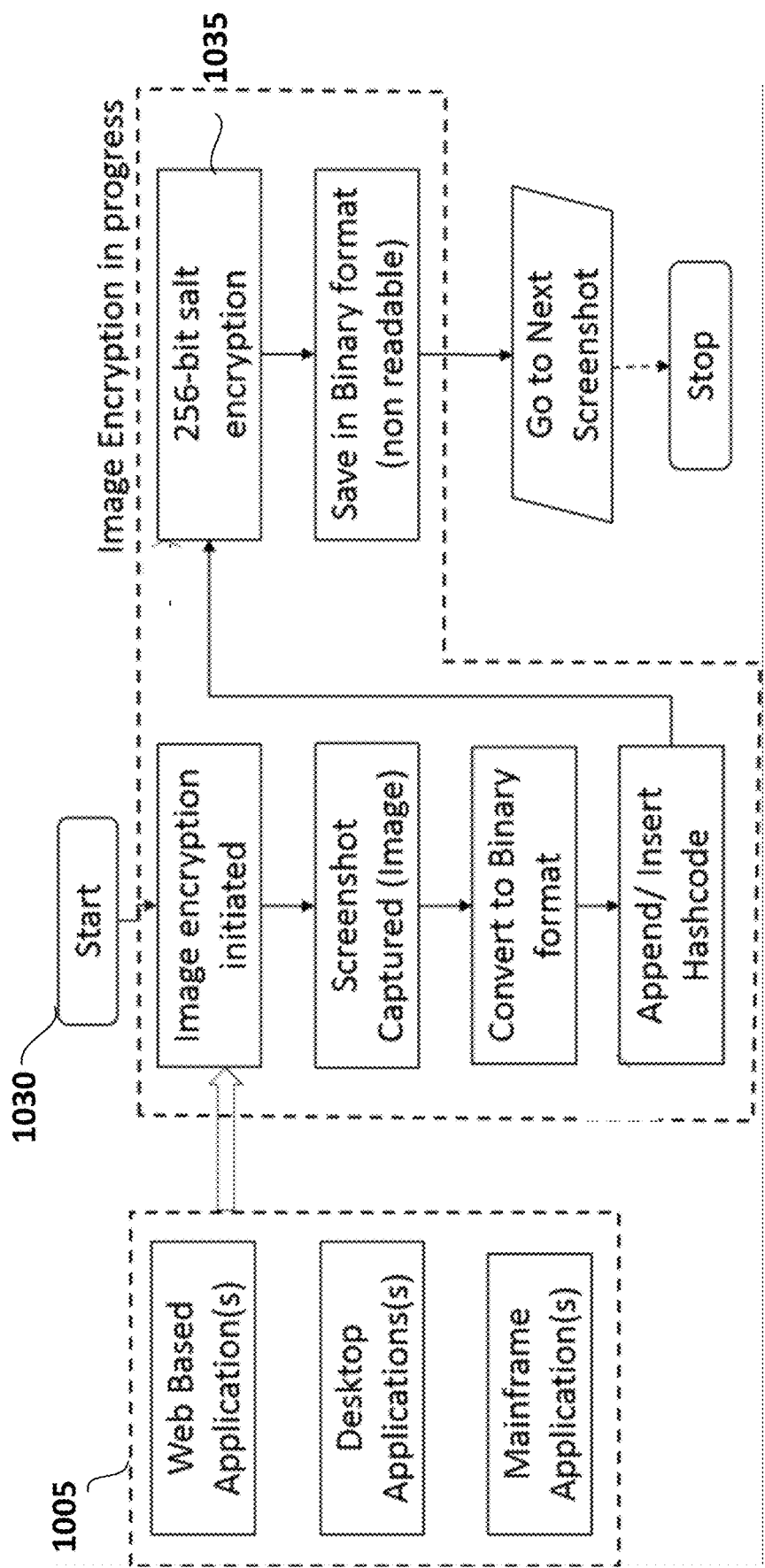

FIG. 10 is a flow diagram of image encryption according to an embodiment.

Figure 11A:
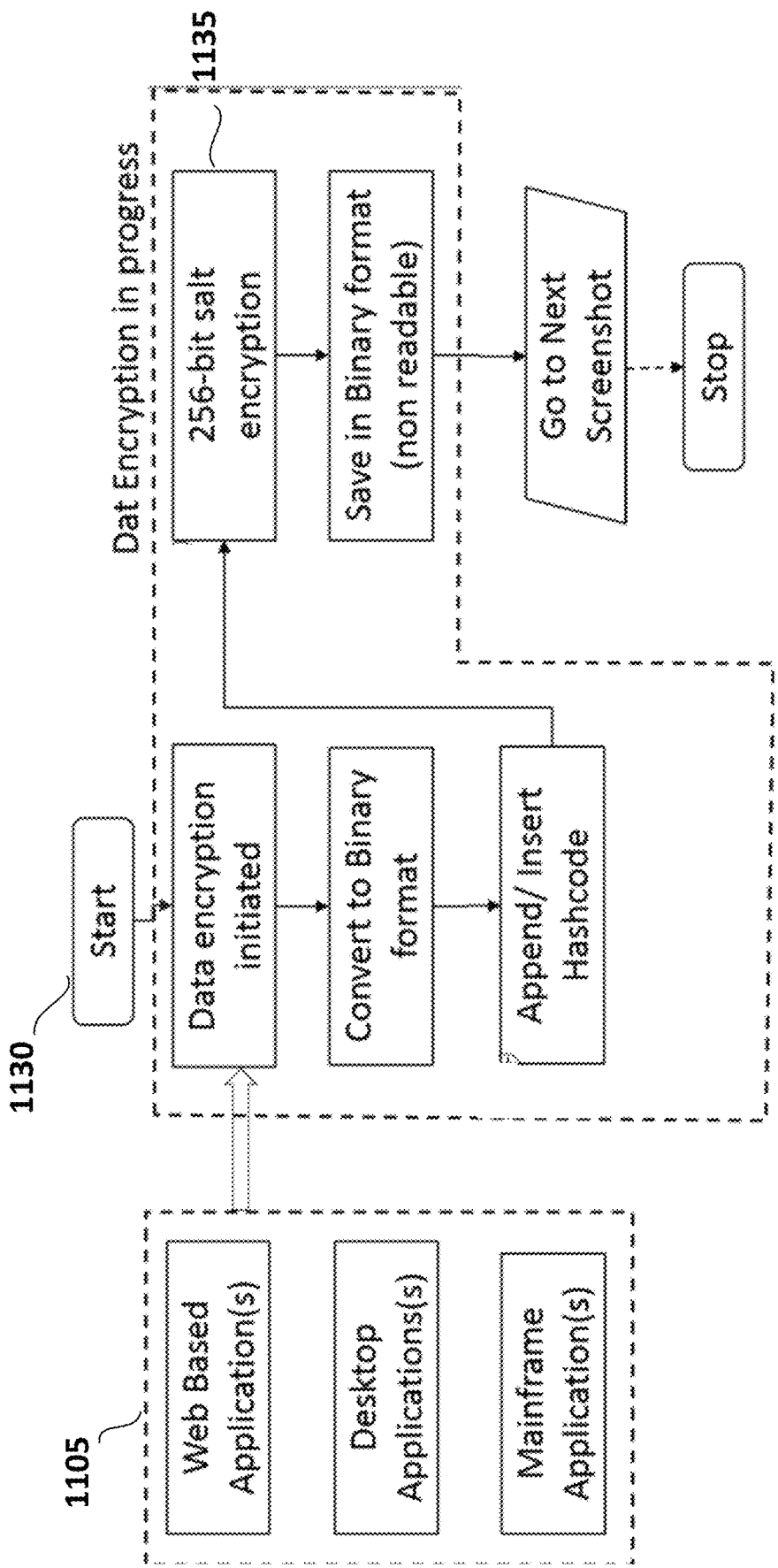
Figure 11B:
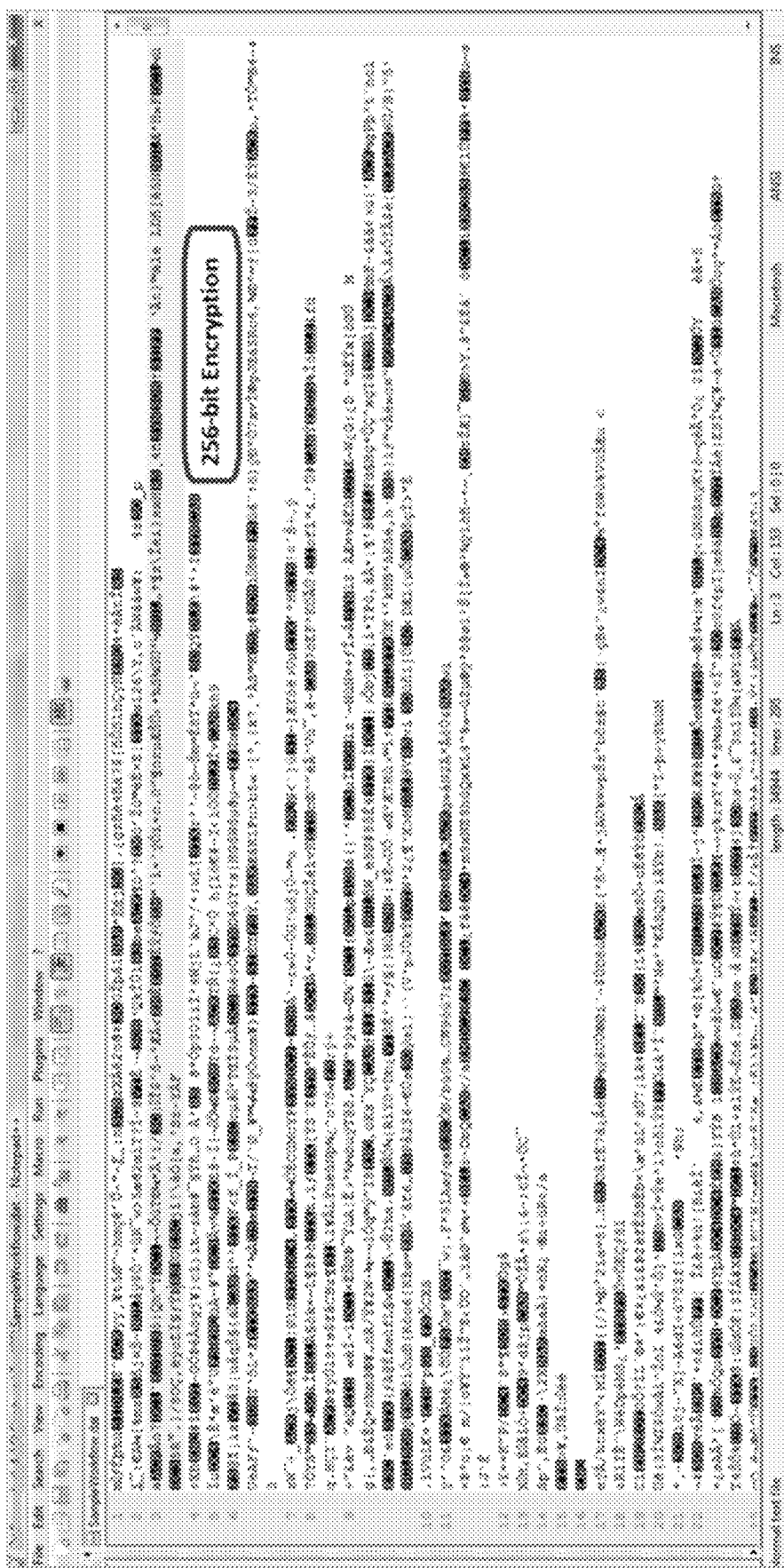

FIG. 11A is a flow diagram of data encryption according to an embodiment. FIG. 11B is a screenshot of encrypted data according to an embodiment.

FIG. 12 is a screenshot of an activity listing of screen images captured by a recorder system according to an embodiment.

Figure 13:
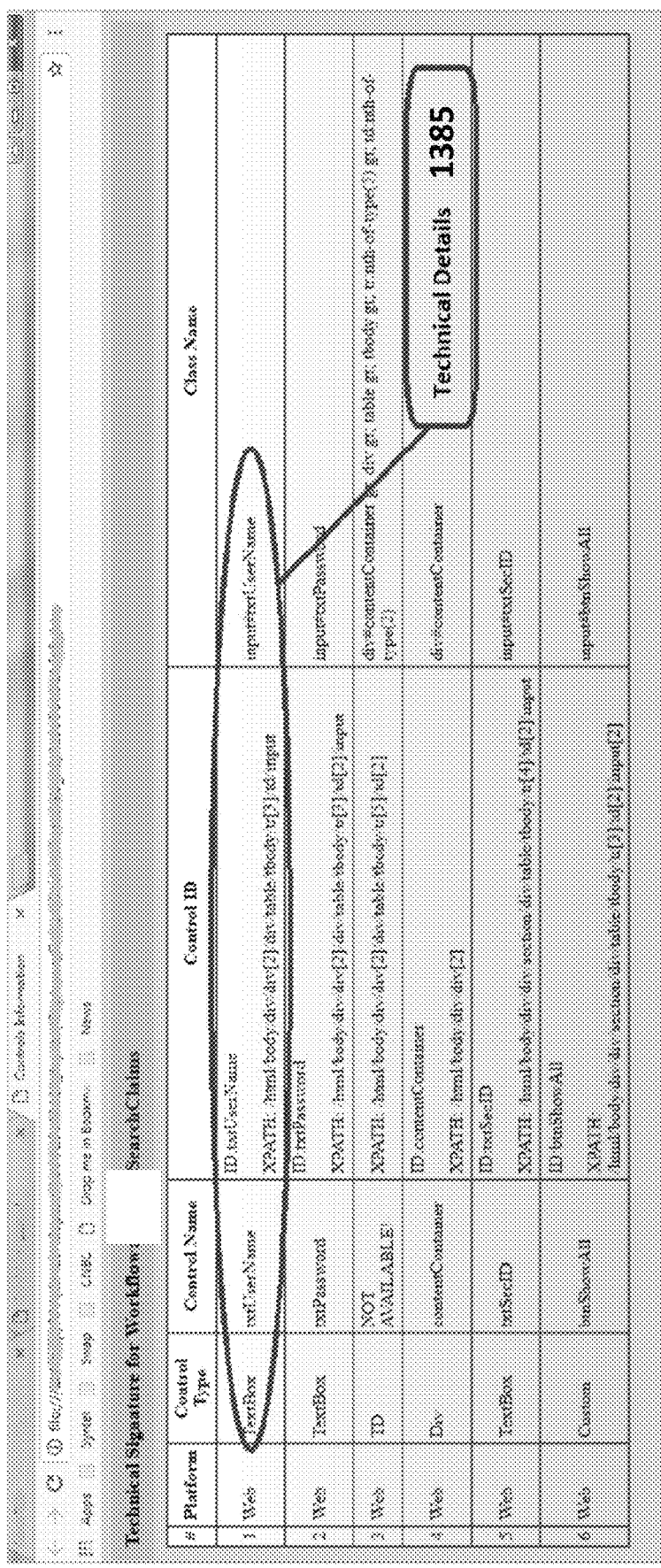

FIG. 13 is a screen shot of technical details in a technical signature according to an embodiment.

Figure 14:
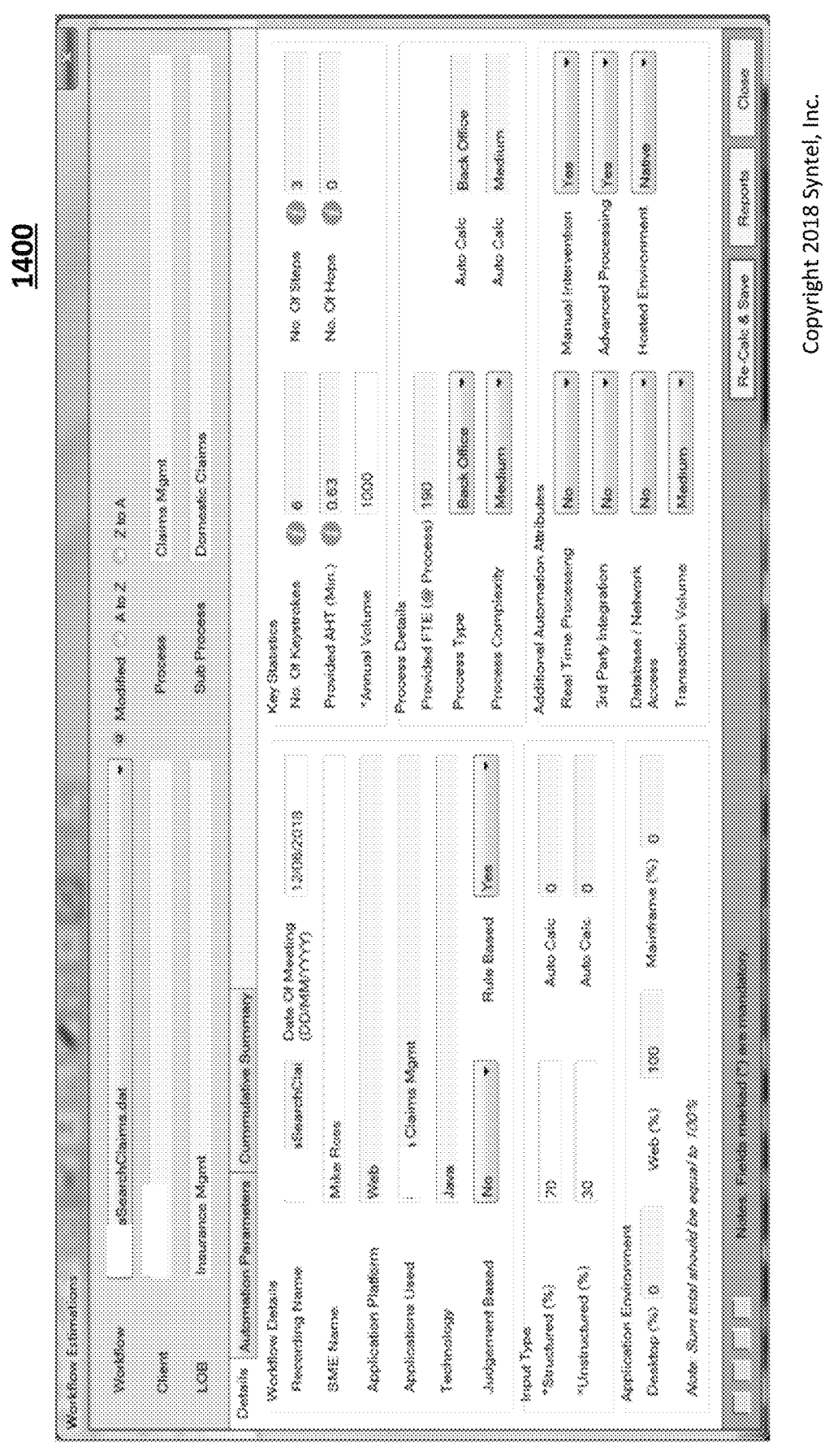
Figure 15:
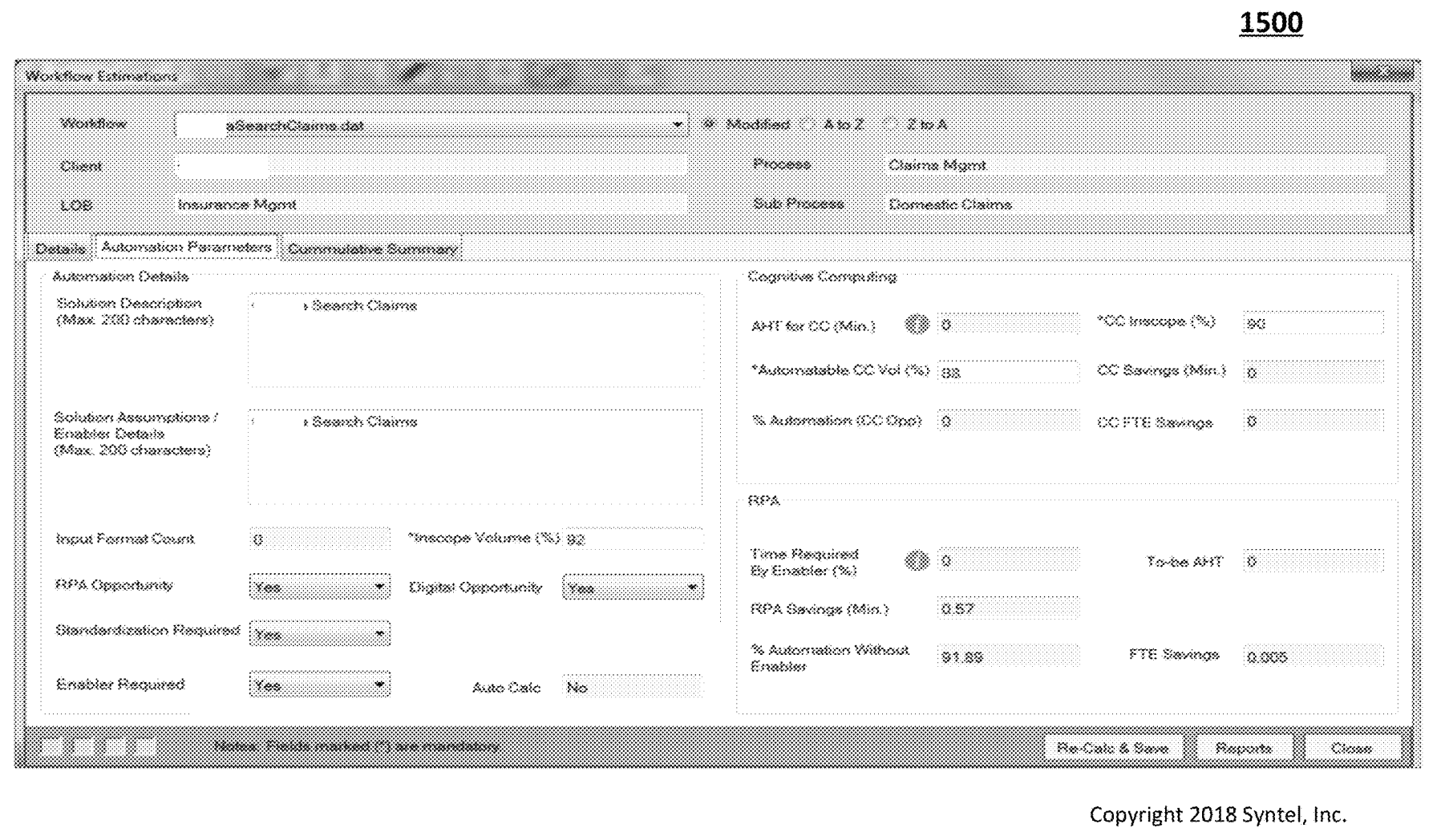
Figure 16:
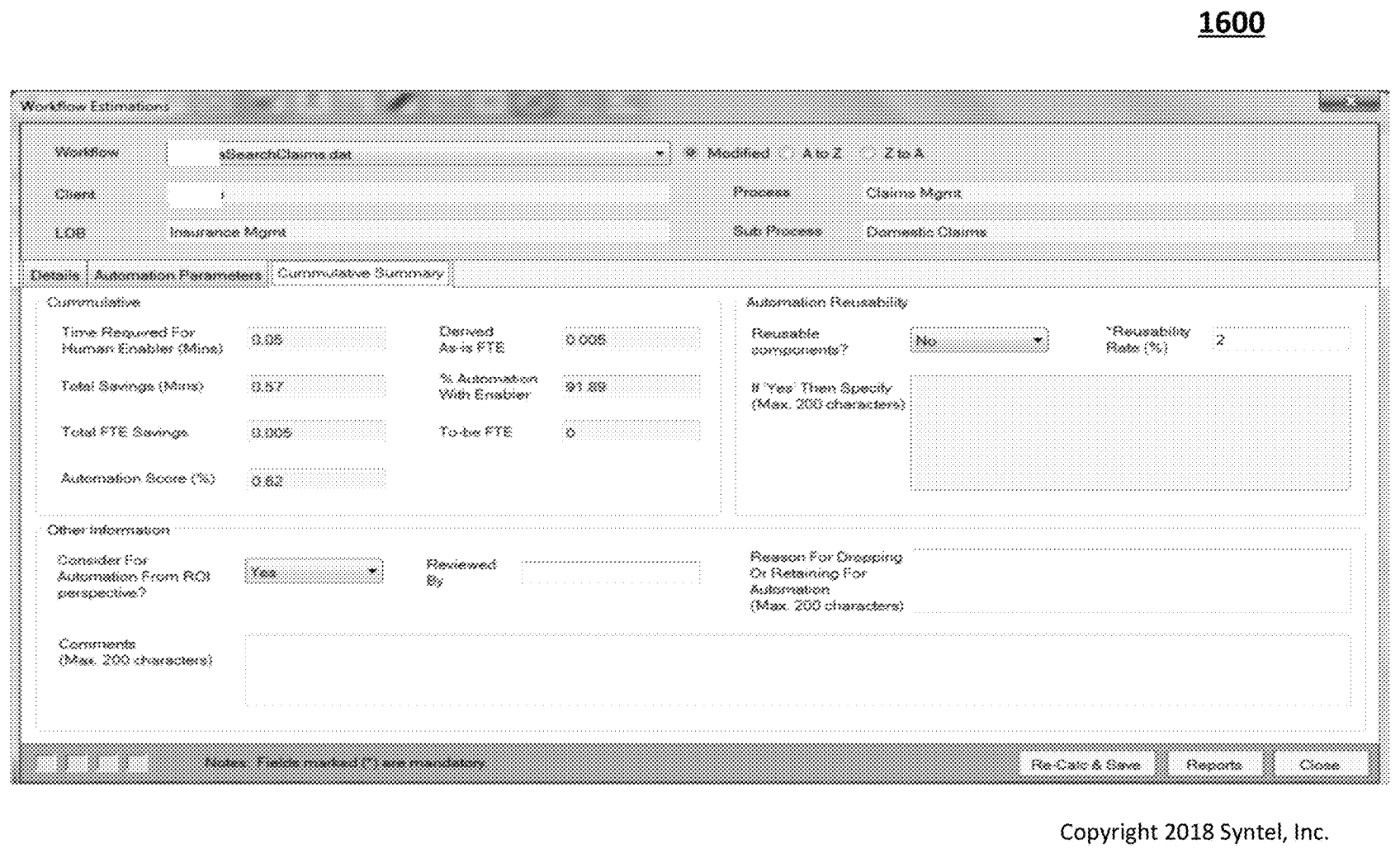

FIGS. 14, 15 and 16 are screen shots of workflow estimations based on the screen captures and information recorded by a recorder system according to embodiments.

Figure 17:
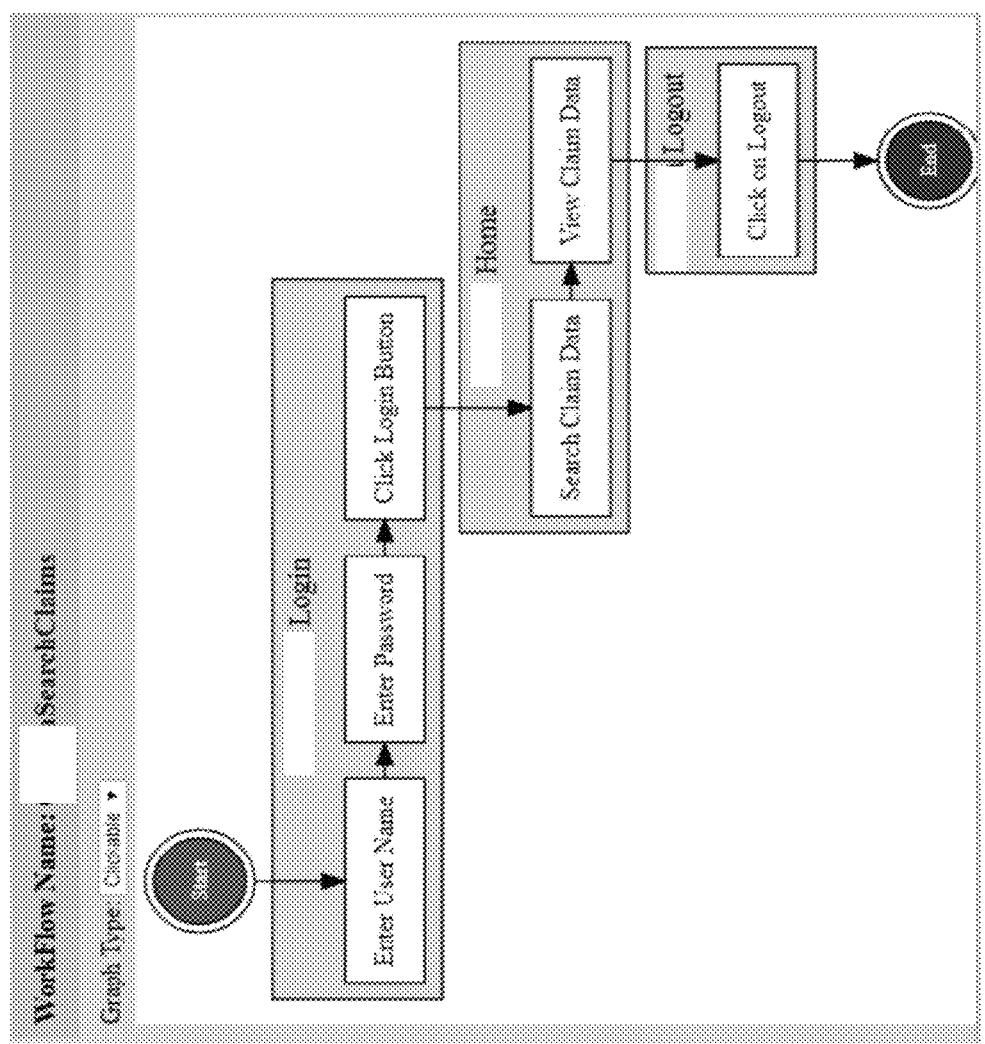

FIG. 17 is a flow diagram of a linear workflow according to an embodiment.

Figure 18:
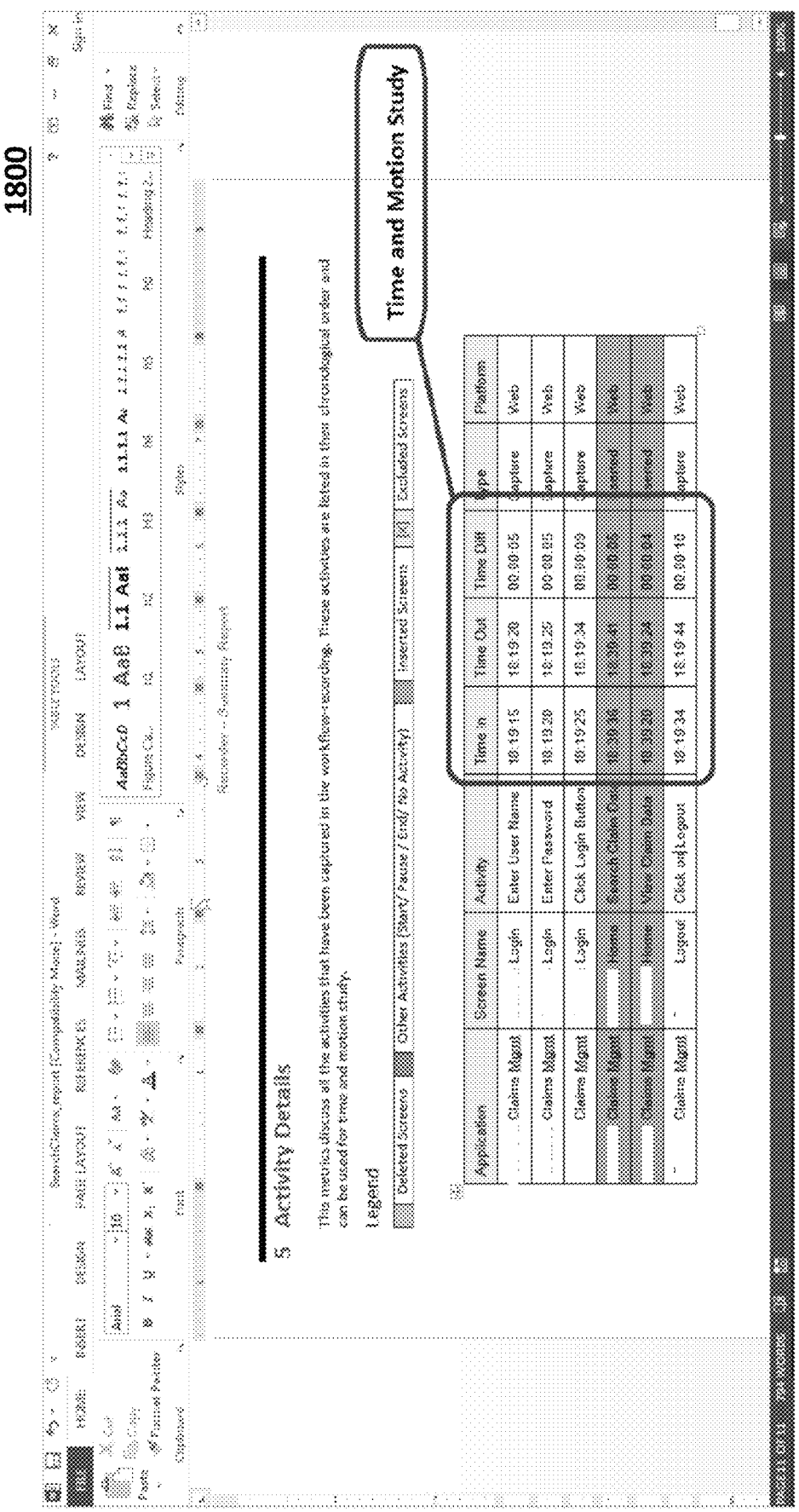

FIG. 18 is a screenshot of an activity details report for a workflow process according to an embodiment.

Figure 19:
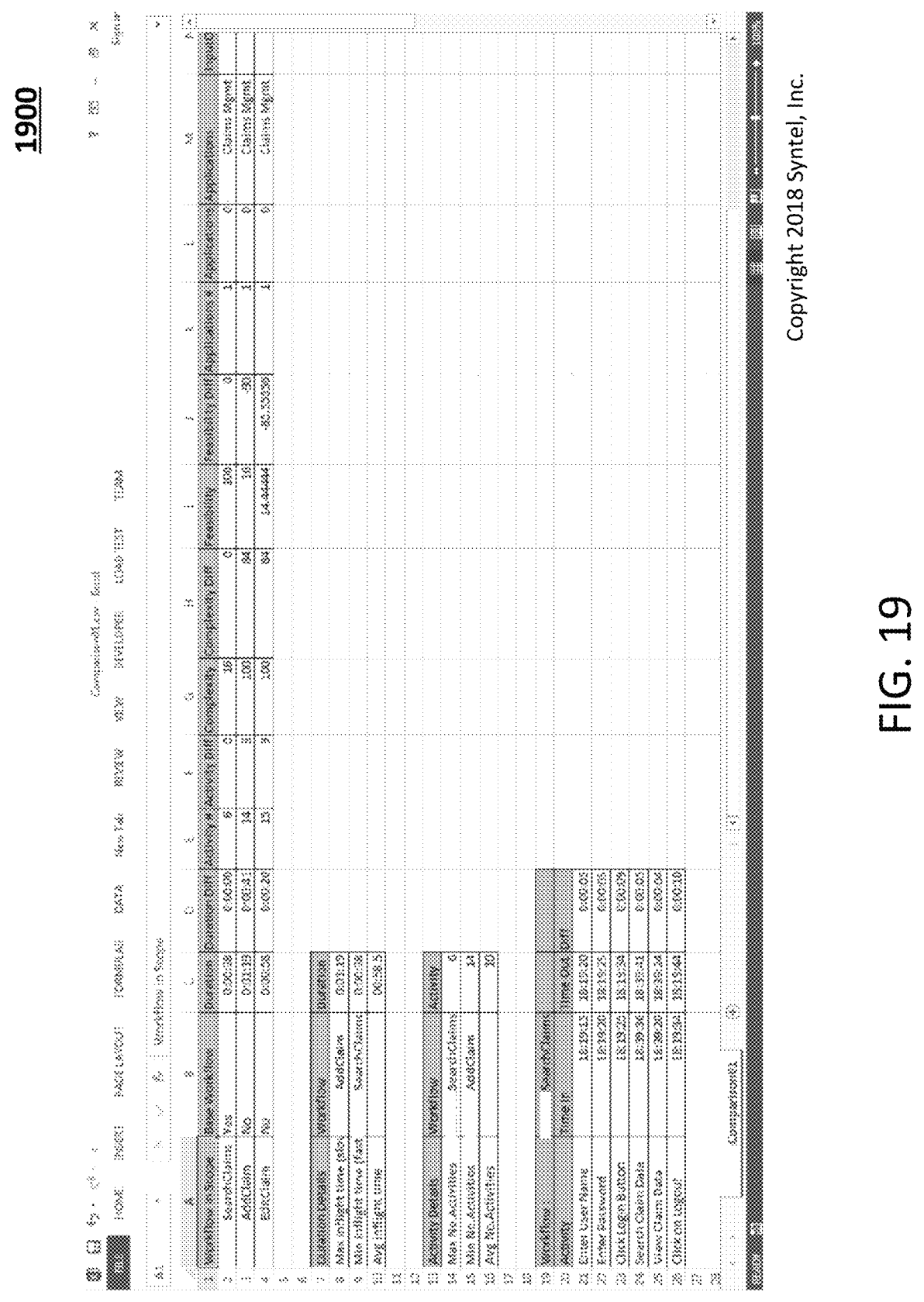

FIG. 19 is a snapshot of metrics generated out of a workflow comparison component according to an embodiment.

Figure 20:
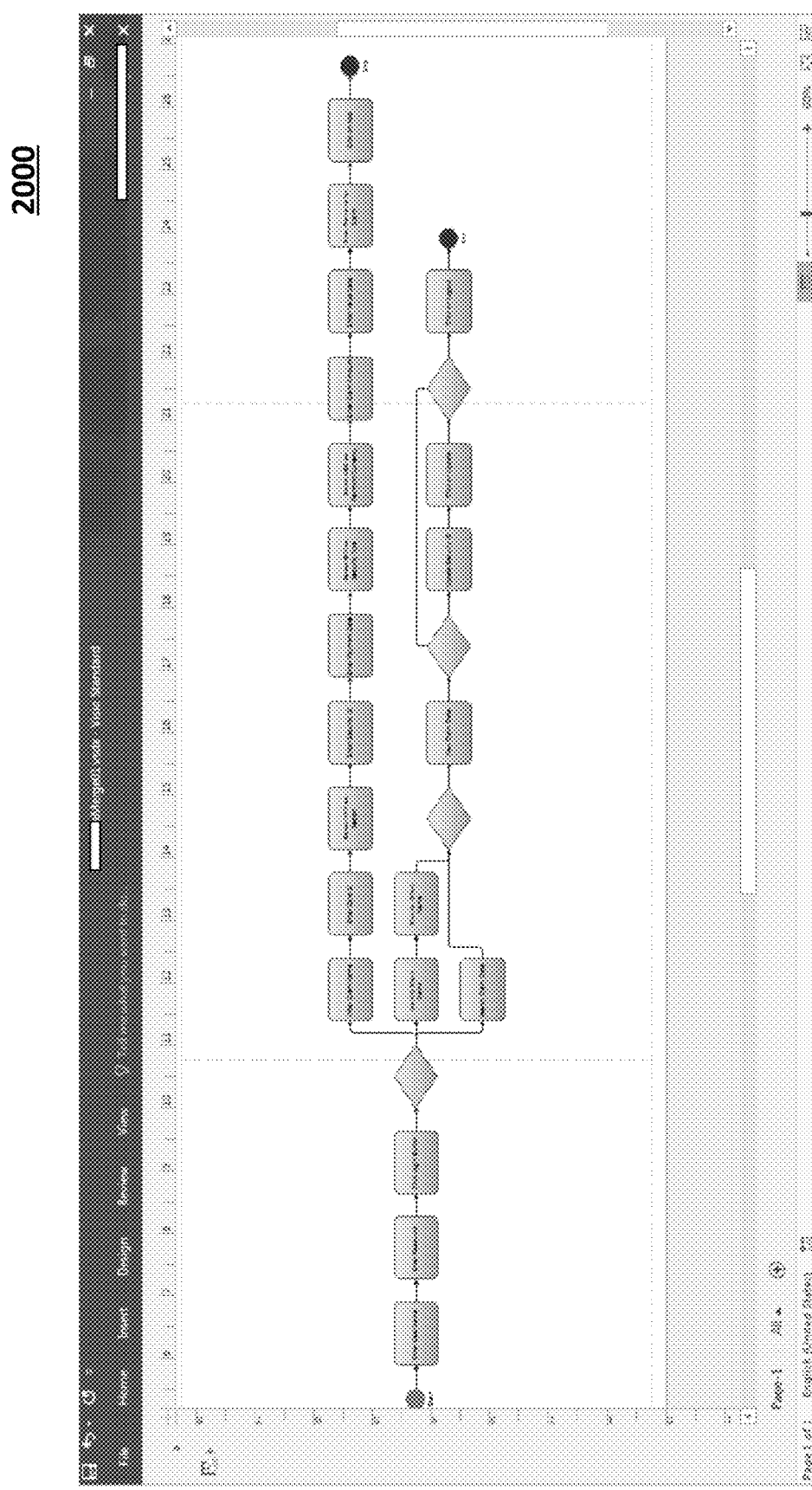
Figure 21:
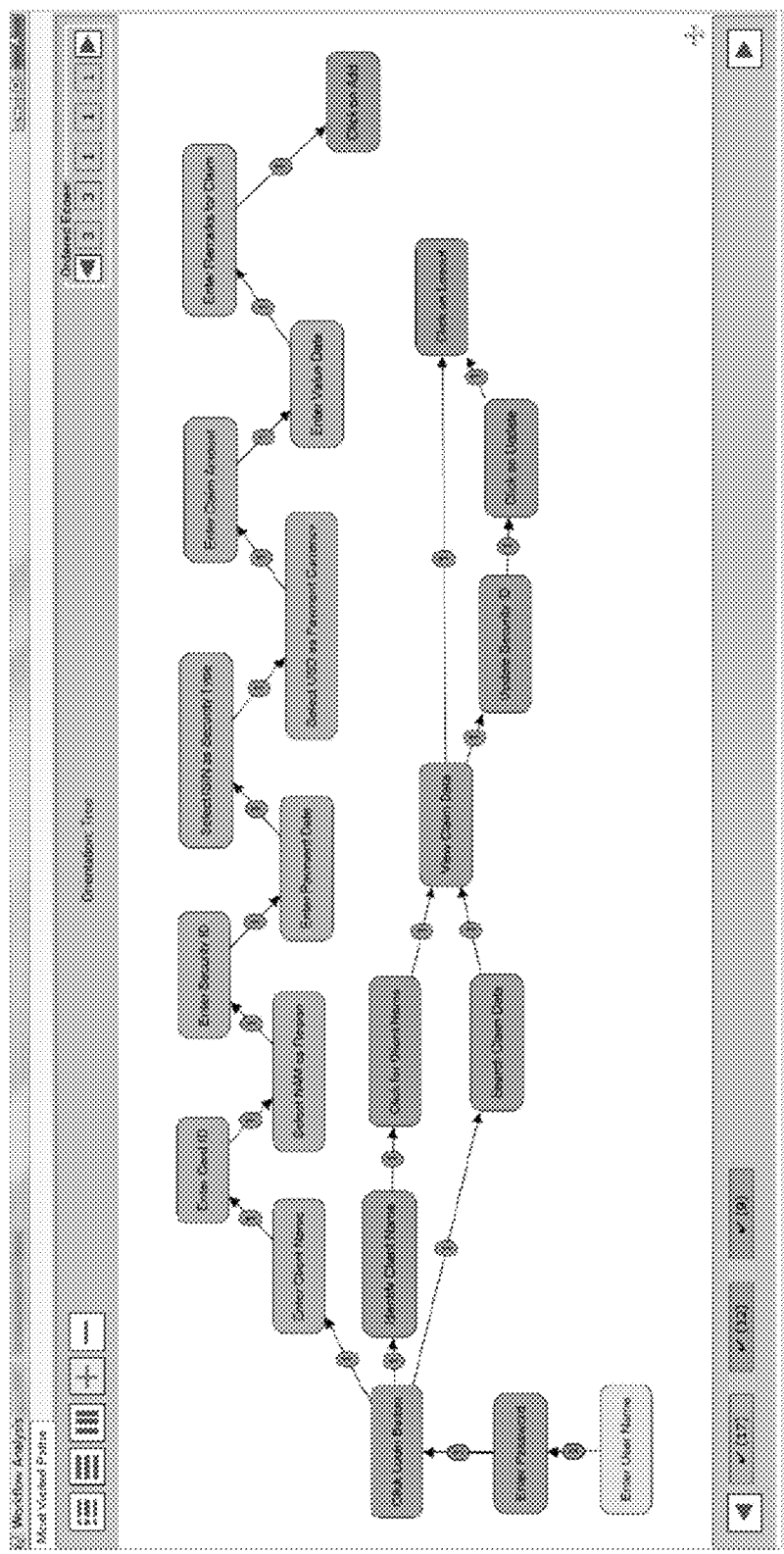
Figure 22:
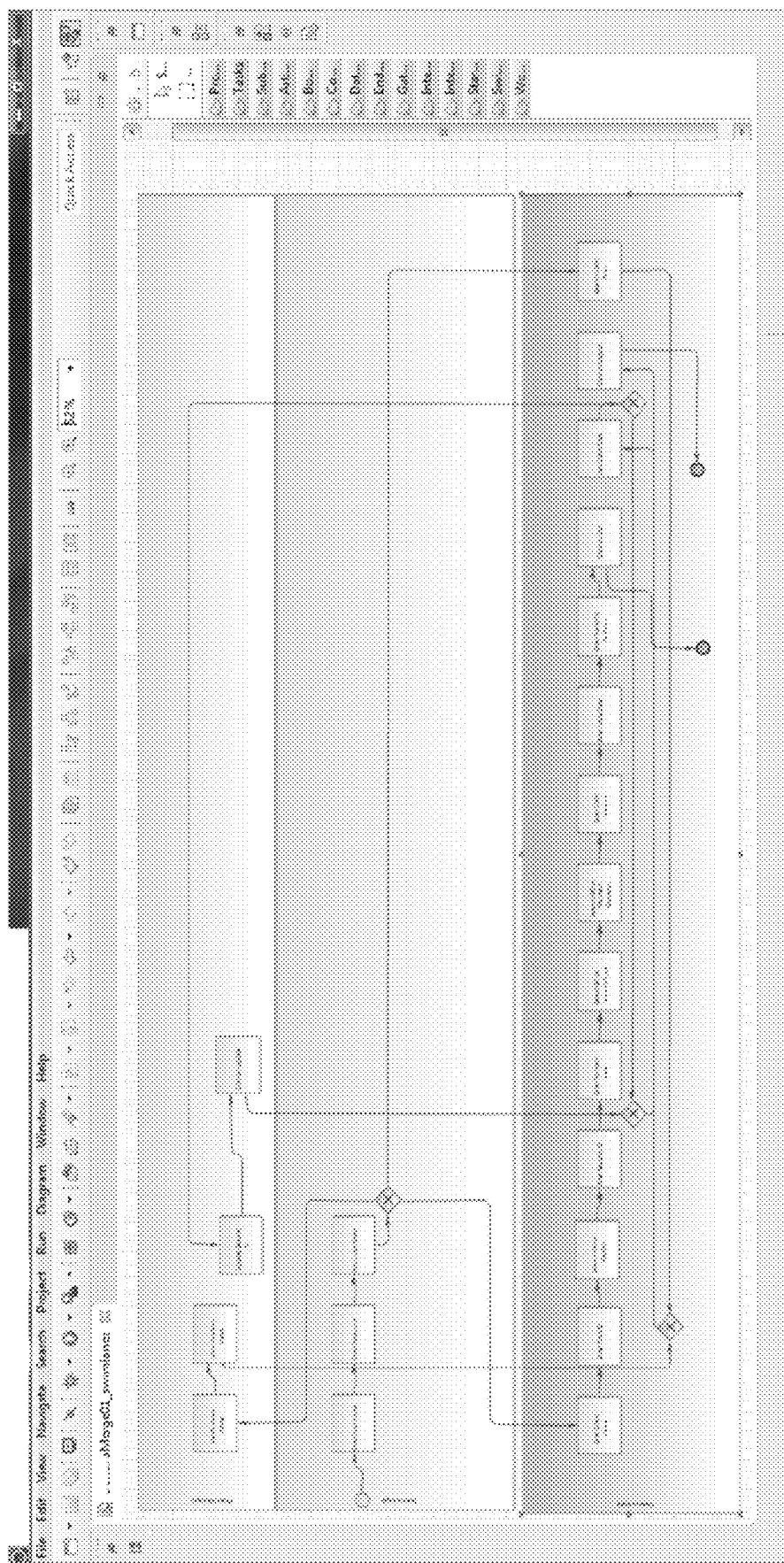

FIGS. 20, 21 and 22 are screenshots of different formats of superimposed version of entire process where multiple workflows are merged together by the tool.

Figure 20A:
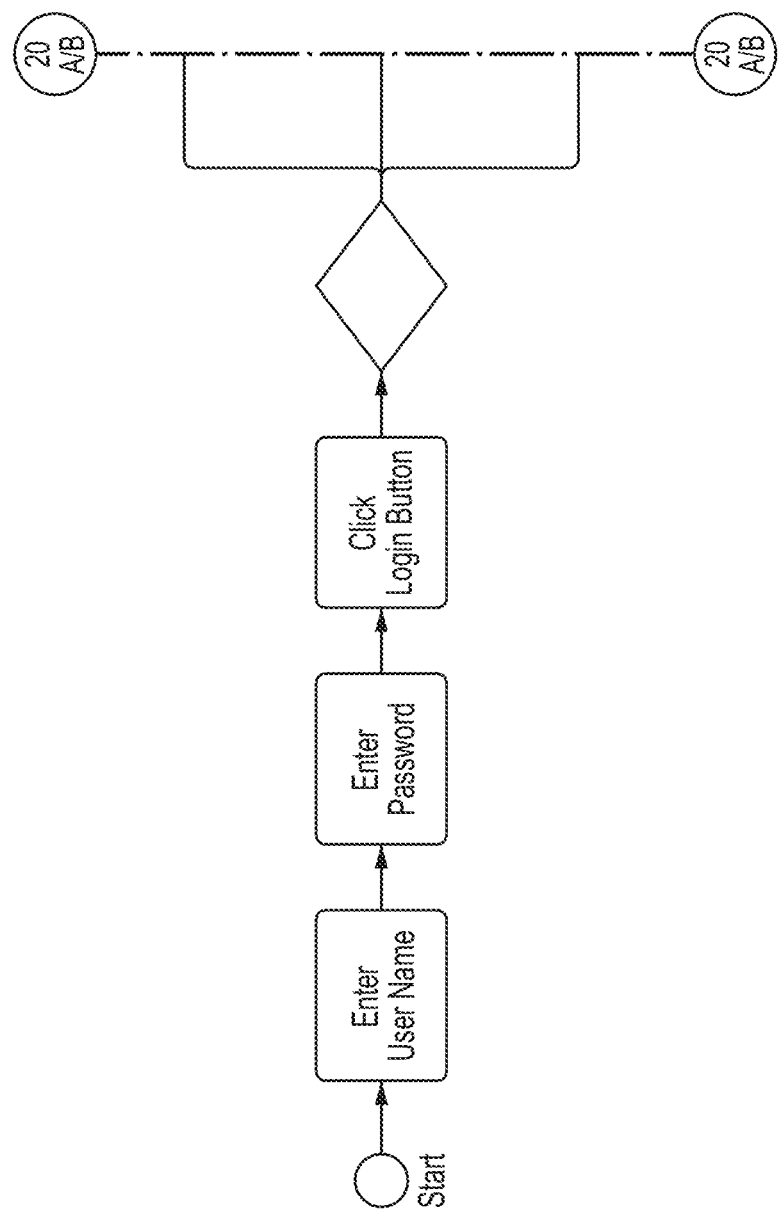
Figure 20B:
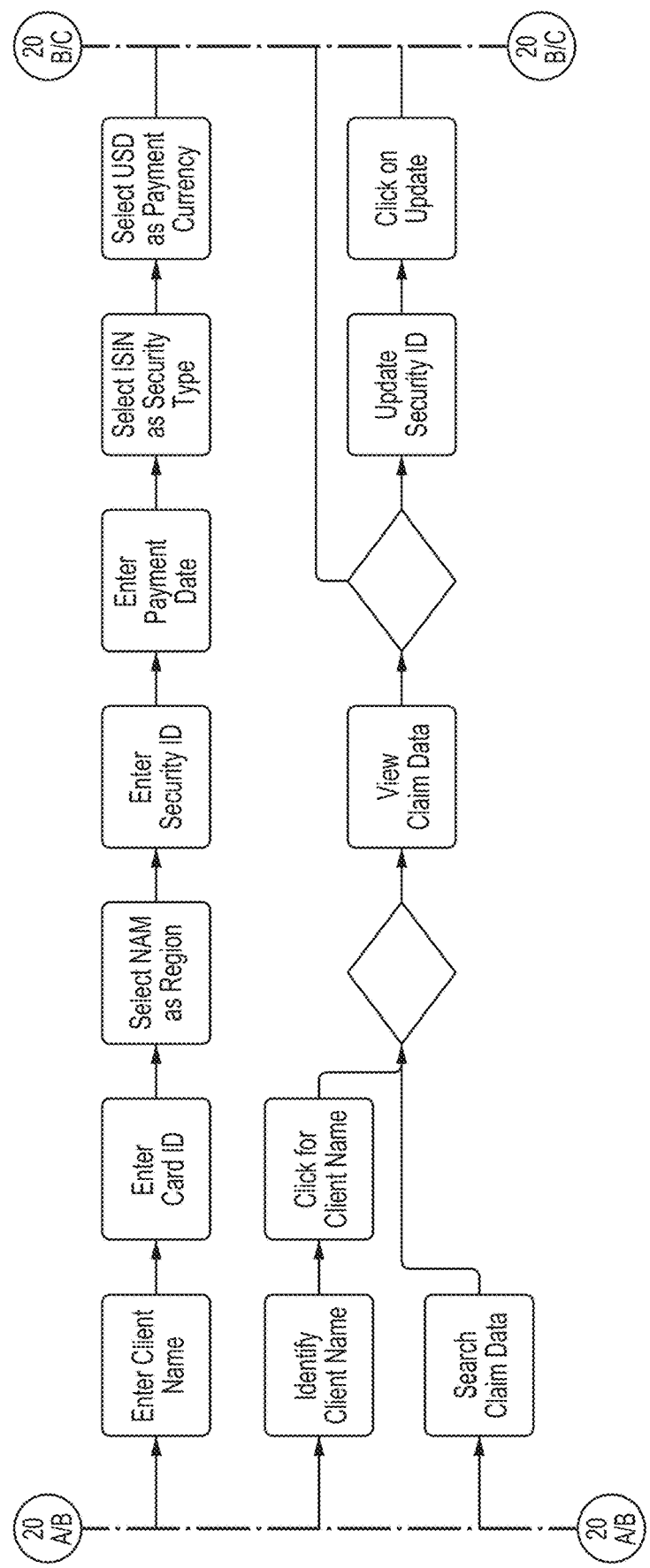
Figure 20C:
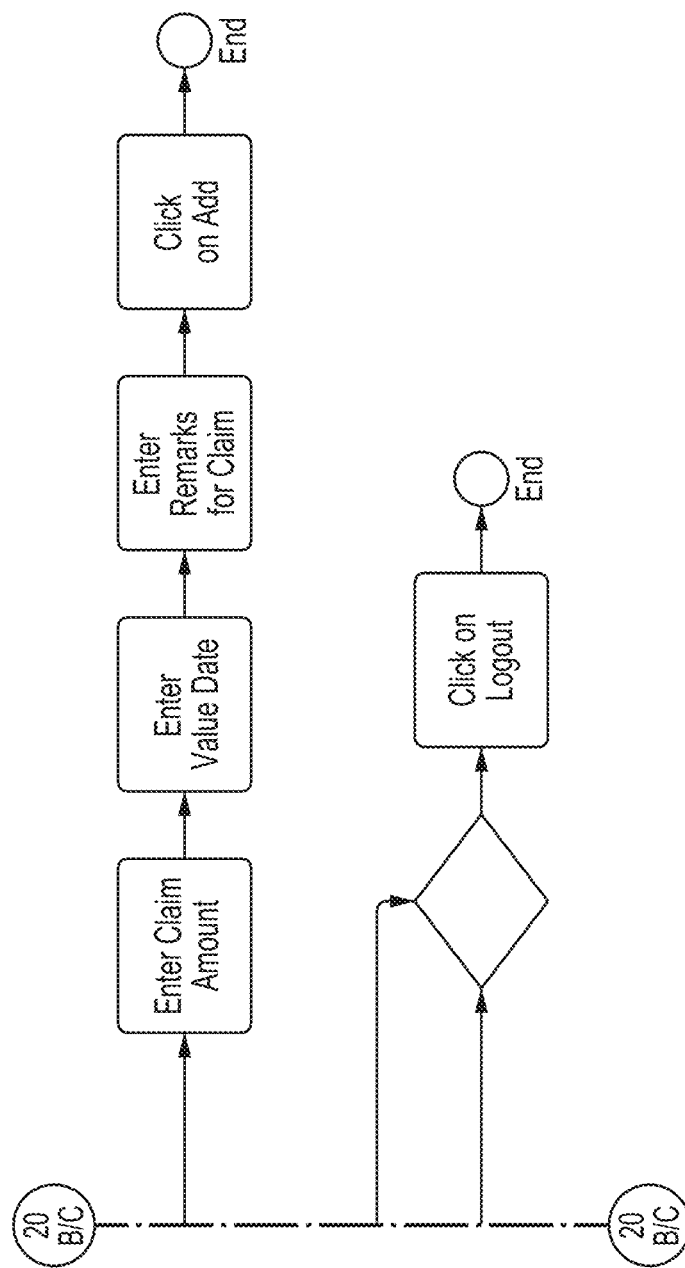
Figure 22A:
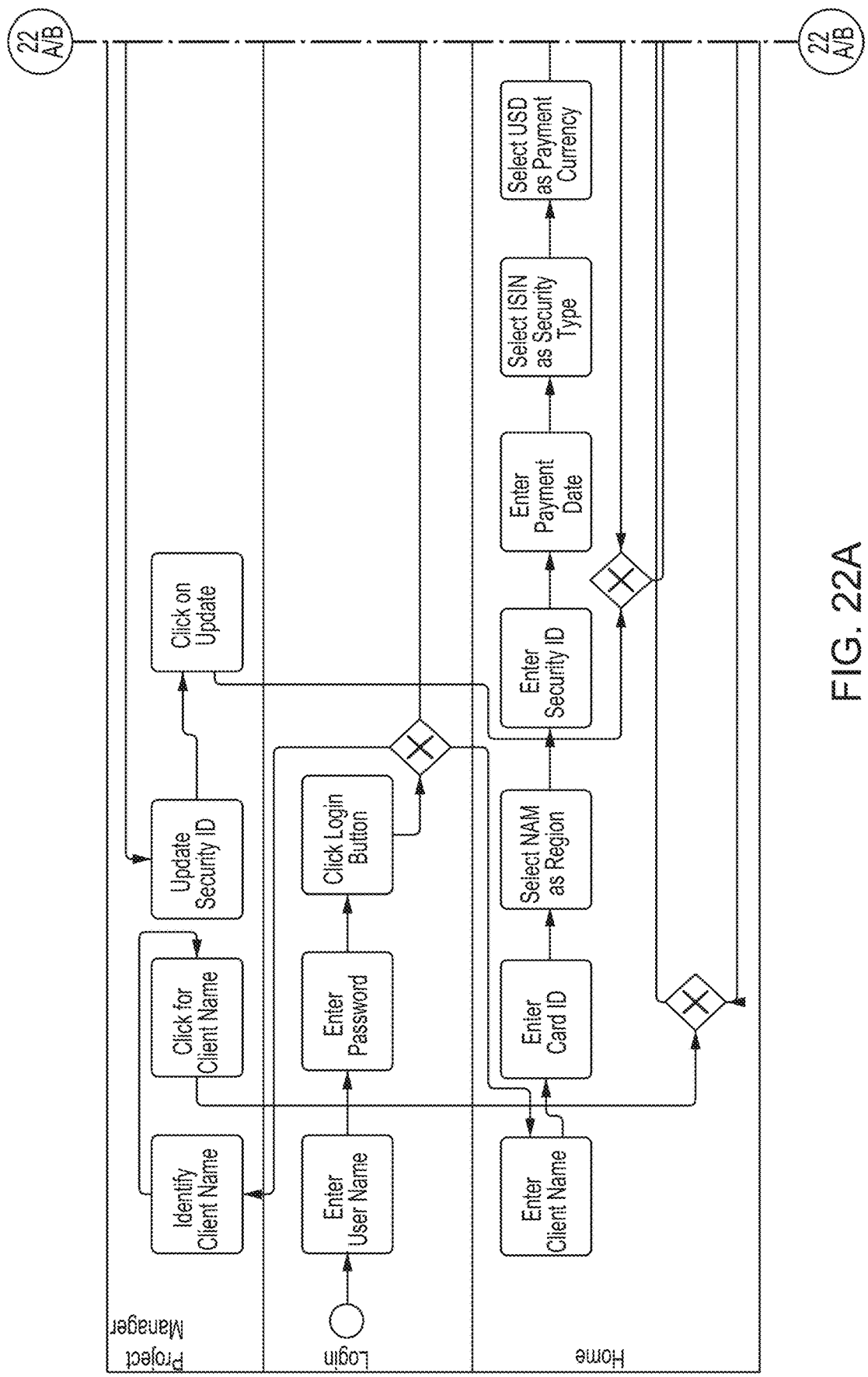
Figure 22B:
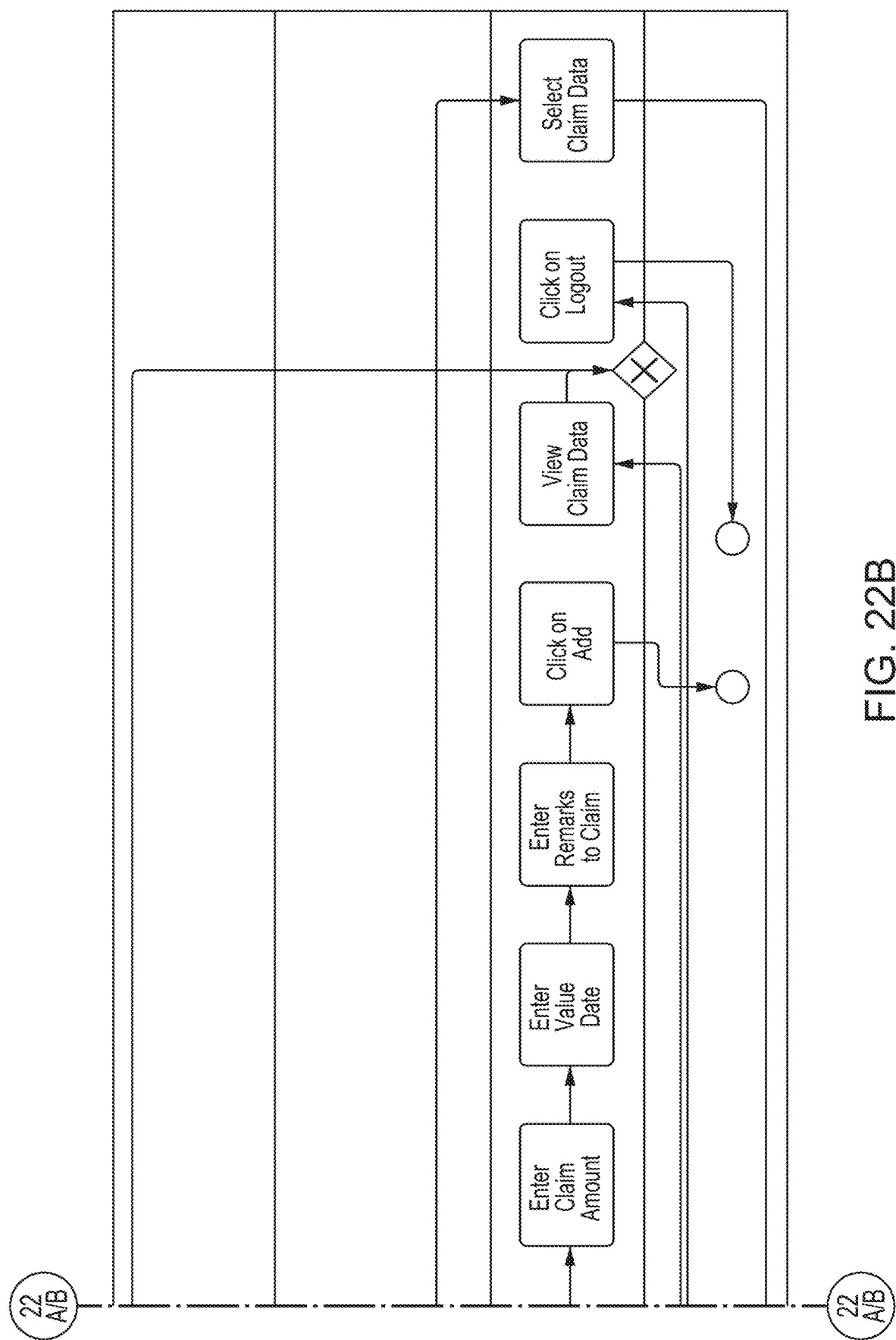

FIGS. 20A to 20C are enlarged portions of FIG. 20, and FIGS. 22A and 22B are enlarged portions of FIG. 22.

Figure 23:
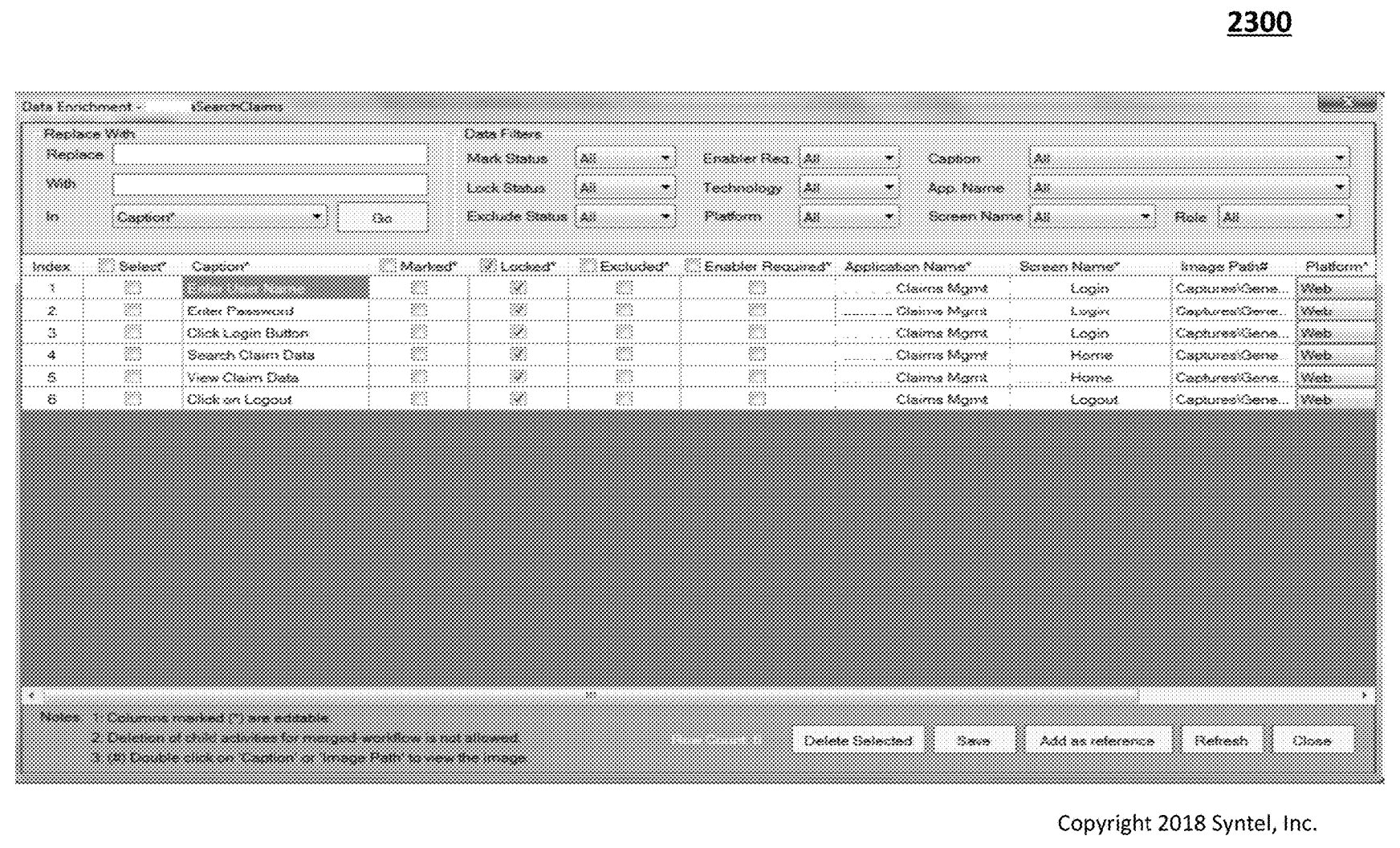

FIG. 23 is a screenshot of a workflow editor according to an embodiment.

Figure 24:
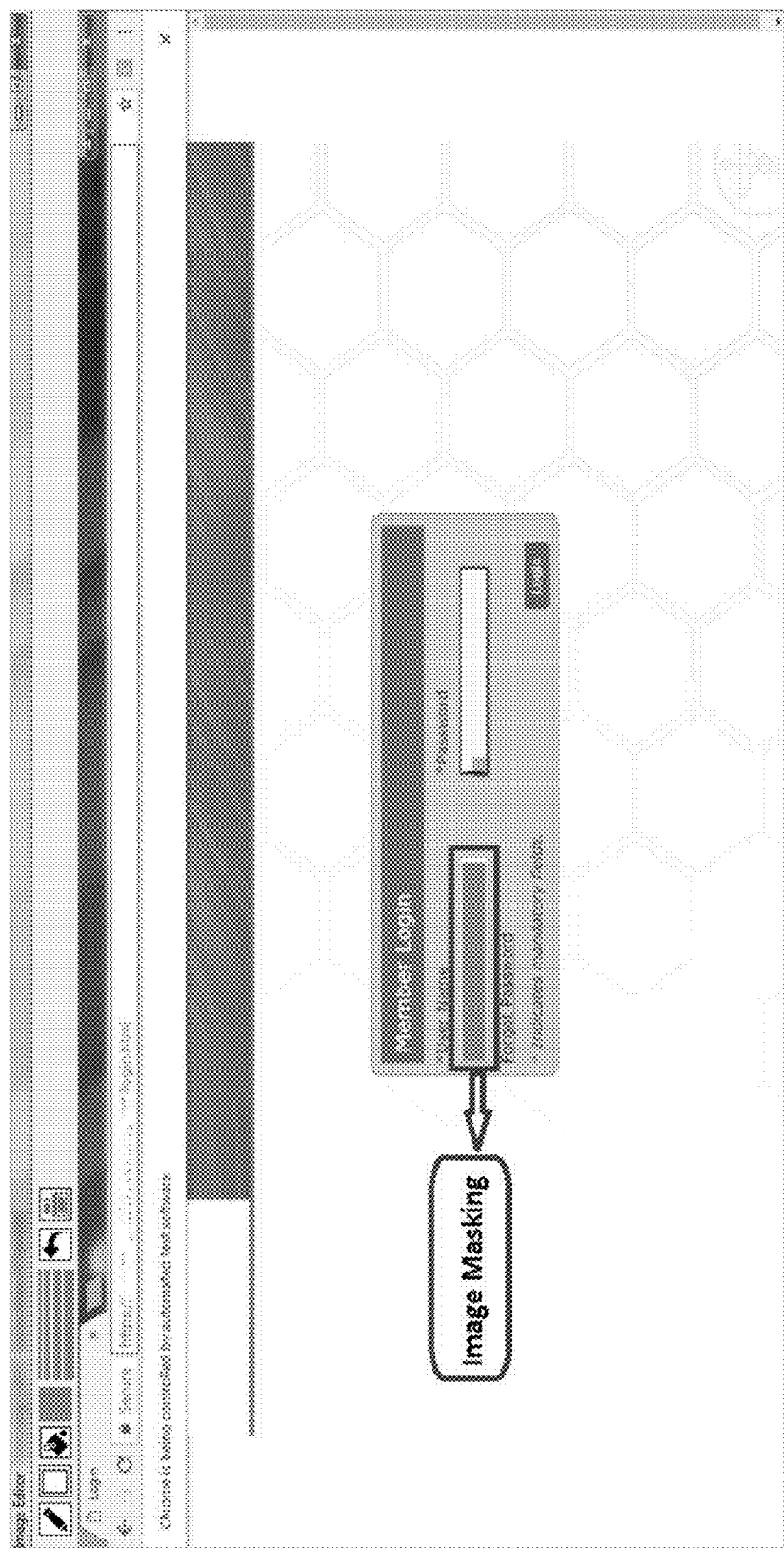

FIG. 24 is a screenshot of an image editor according to an embodiment.

Figure 25:
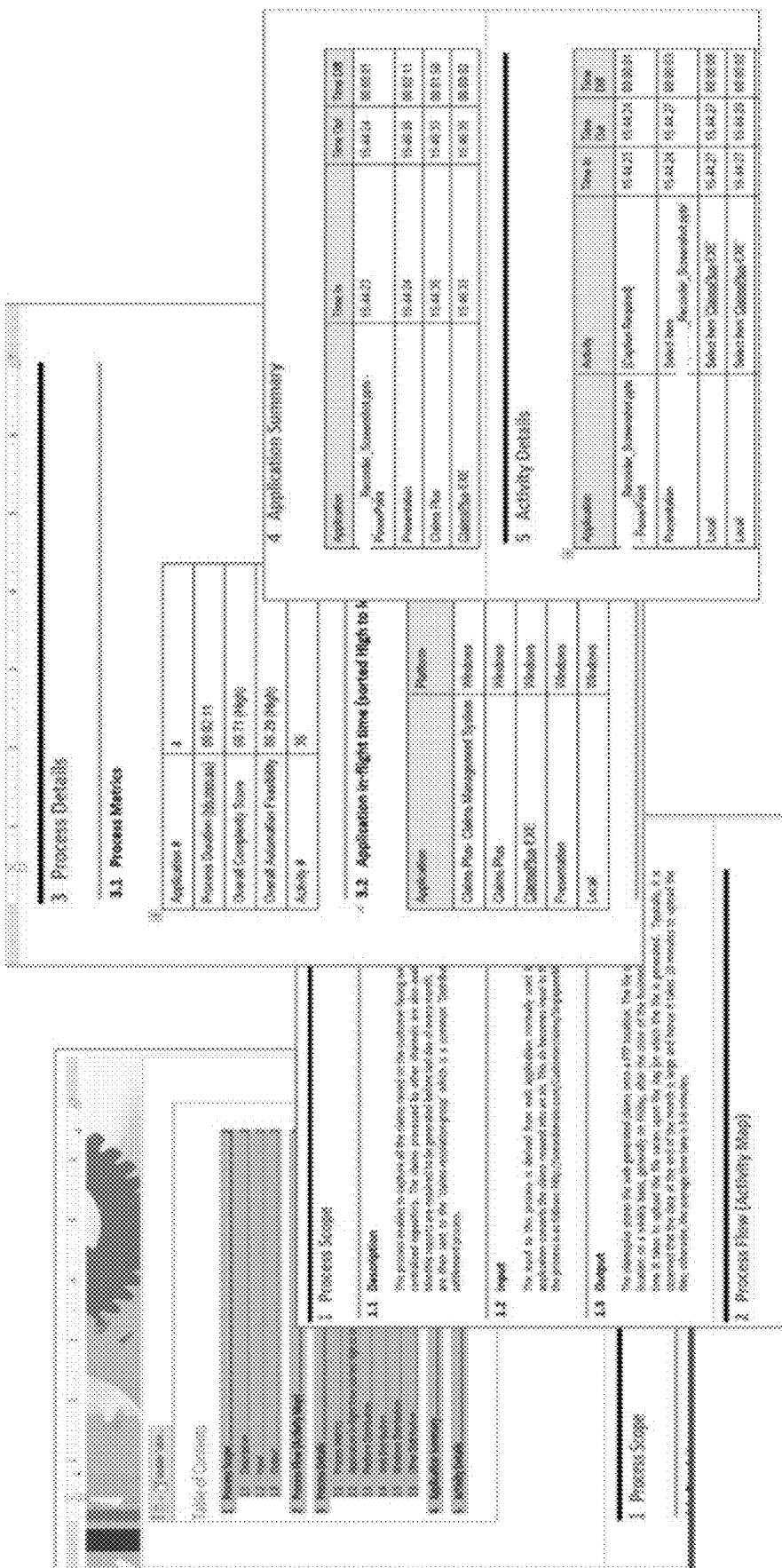
Figure 26:
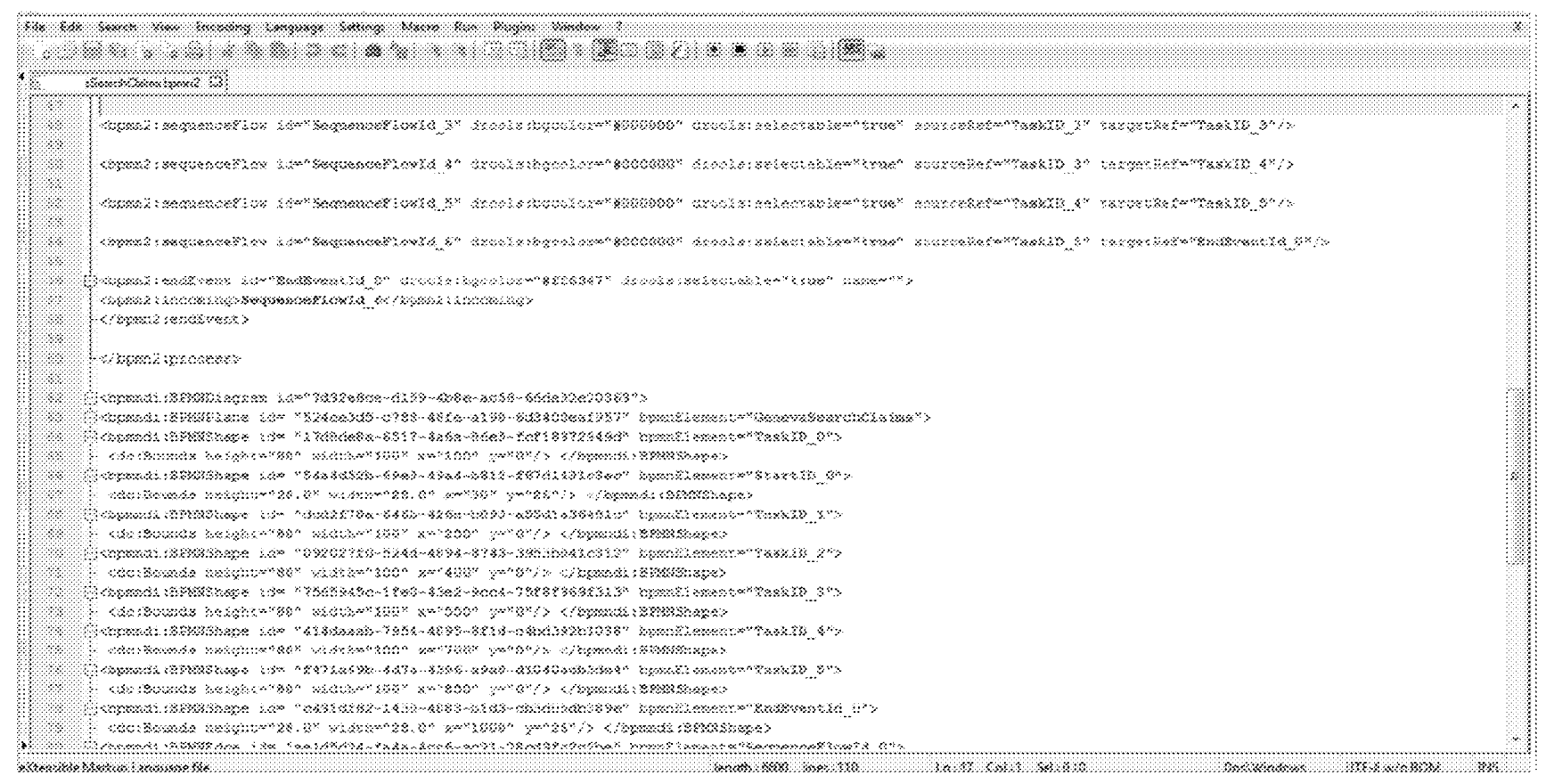

FIGS. 25 and 26 are screenshots of various output formats for displaying workflow details, graphical diagrams in visio, bpmn formats according to embodiments.

Figure 27:
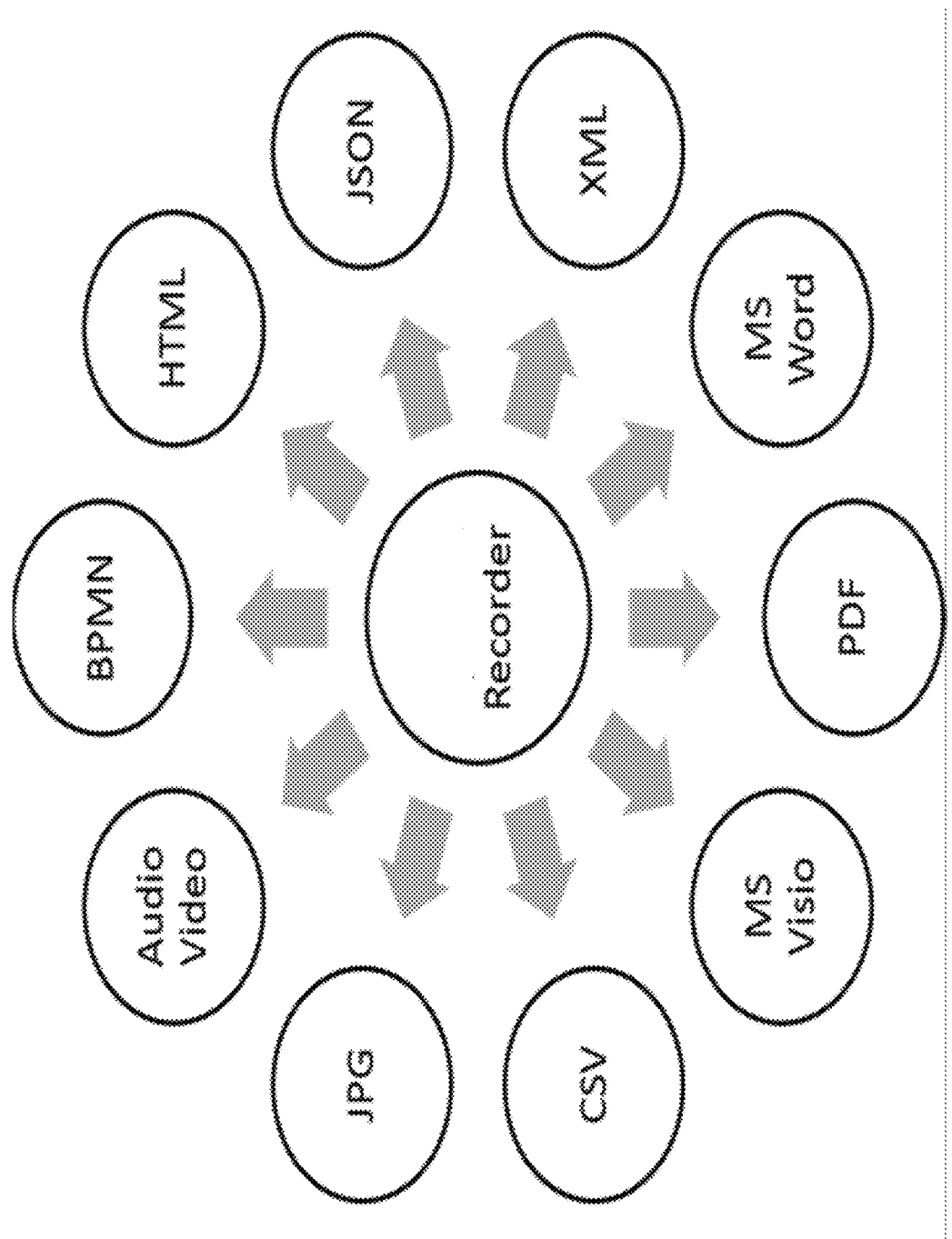

FIG. 27 is a diagram of outputs for a recorder system according to an embodiment.

Figure 28:
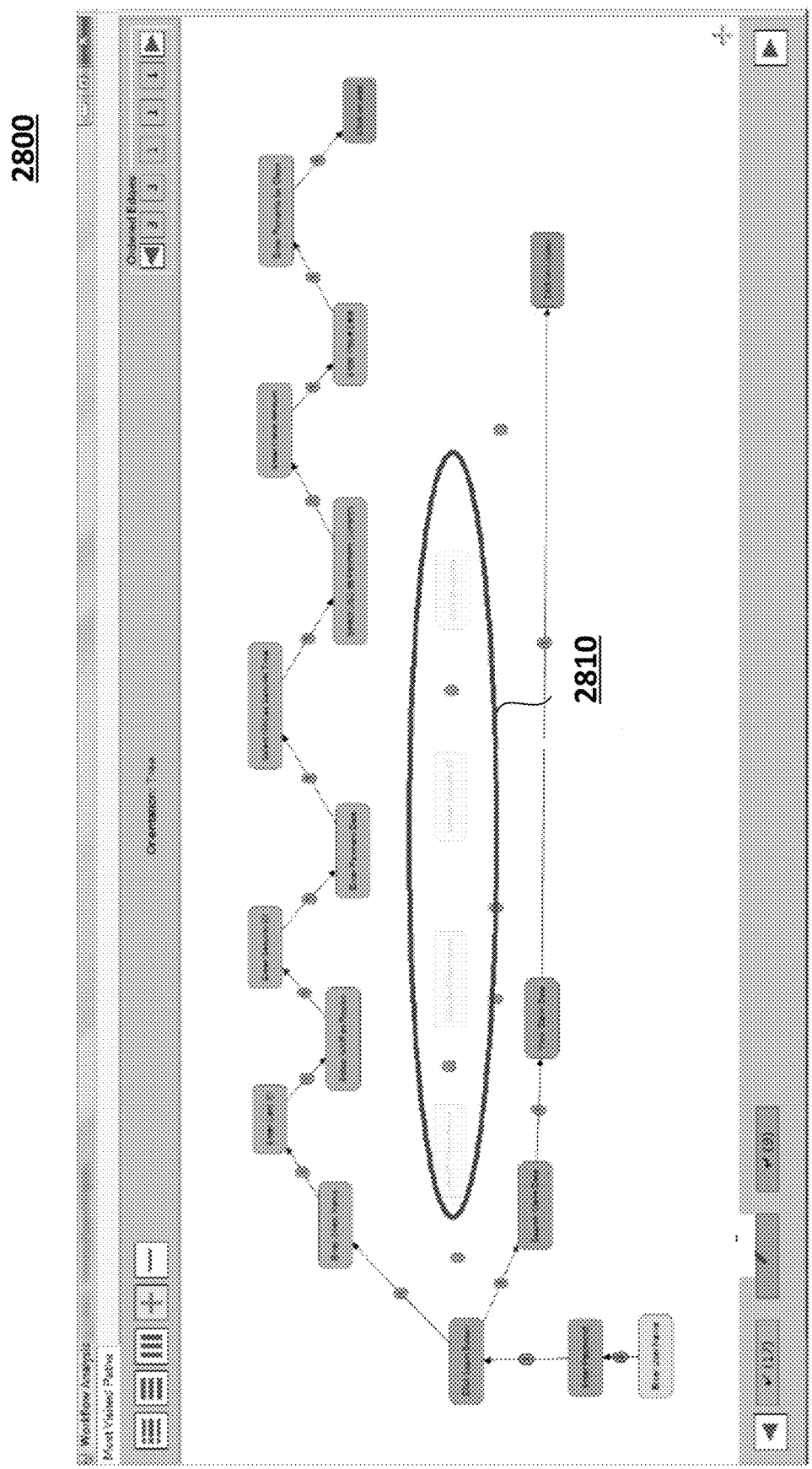

FIG. 28 is a screenshot of the workflow analyzer where three workflows are merged together according to an embodiment.

Figure 29:
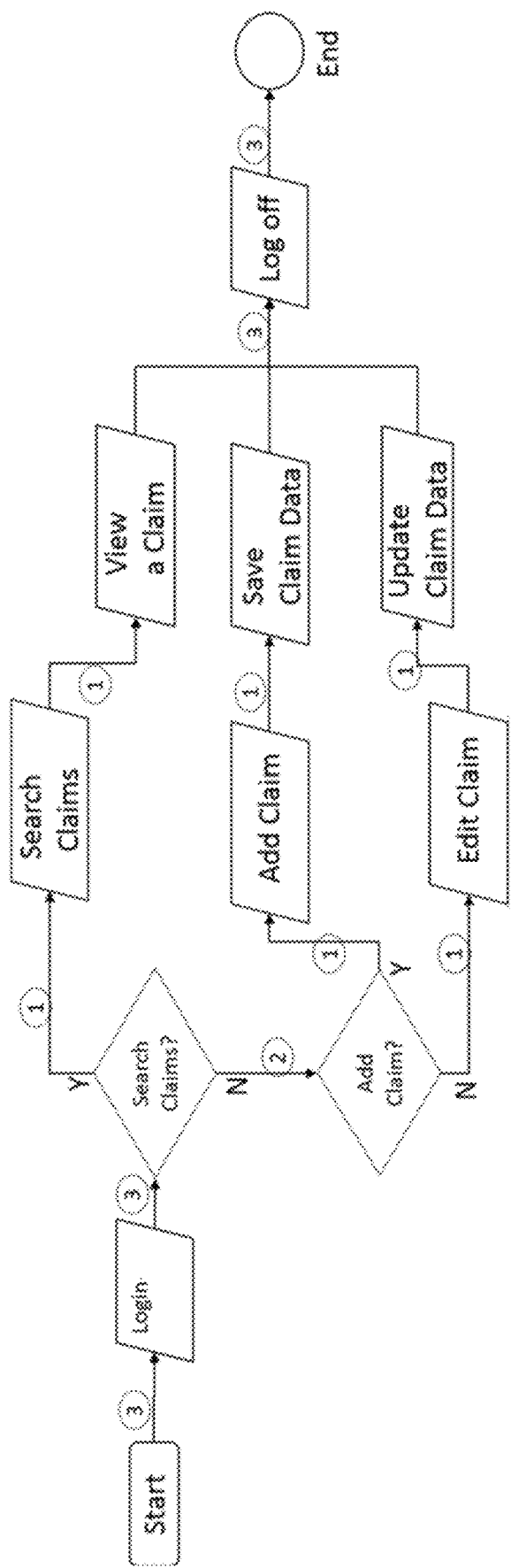

FIG. 29 is a flow diagram of superimposed workflows with most-visited-path information according to an embodiment.

DETAILED DESCRIPTION

Embodiments of the present invention are generally directed to recording a series of screen captures in real-time for generating a business workflow process using a system including a recorder and a processor. The recorder operates in the background while a subject-matter expert (SME) or individual performs a workflow process using a control business application: a system, a database, an application platform and/or an application used to conduct a business. The SME could be performing a workflow process related to any aspect of the business such as manufacturing, development, inventory, customer request, maintenance, or a similar aspect.

The approach and tools used by the system to capture the information (including steps, activities, actions, audio, visuals, or similar information.) associated with a workflow process varies depending upon how the information will be used. For instance, the information could be used for automating a workflow process, providing a job-aid to a new employee/trainee performing the workflow process, adherence to a certain compliance associated with the workflow process, or a similar visual. The information is captured in multiple formats like word, pdf, EXCEL, csv, POWERPOINT, VISIO, graphical drawings, html, wave, or a similar format.

The processor can superimpose multiple forms of information for a workflow process, and generate a graphical representation in a workflow data file that is formatted in accordance with Business Process Model and Notation (BPMN) 2.0 (an industry standard) and/or VISIO format. BPMN 2.0 formatted data files serve as the basic technical input for automation modeling. BPMN 2.0 is a standard set of diagramming conventions for describing business processes. It is designed to visualize a rich set of process flow semantics within a process and the communication between independent processes.

The system provides a workbench to create a comprehensive standard operating procedure (SOP) for an identified workflow. The SOP includes navigational steps in the form of a graphical representation of all information used by the SME to perform a workflow process. As discussed below in further detail below, step(s) can be enriched with its corresponding screenshot and a high level caption explaining the step.

Other attributes like application platforms (web, cloud, or windows), list of business applications, automation complexity and feasibility information, or similar attributes are derived as additional observations. A comprehensive "time and motion" report is also generated that provides an exact time for each step performed during the completion of the workflow process. The "time and motion" report helps to understand any potential compliance gap, and serves as a guide for an alternate optimum sequence of steps to achieve efficiency gains.

A "process" or a "business process," as used herein, is a combination of multiple steps for performing a specific workflow in which the workflow is unique in nature because it represents a finite and unique variation of set of activities to be performed. The workflow is at times a function of a person's knowledge of the workflow process. For example, a same work product may be achieved by two or more business processes. Hence, the time taken to perform a workflow process may differ from person to person. Human efficiency is another factor that can impact aspects of the workflow process like effective usage of interdependent systems, number of hops between various systems, time taken to perform a workflow, or similar aspects. A "process," by definition, can completely be defined by various attributes like business objectives, underlying applications and the corresponding application platforms, geo-regions, people, processing duration, processing time in a day, underlying workflow processes, approval cycles, upstream and downstream systems, events, or similar attributes.

The recording of the information associated with a workflow process is at times required to be implemented in a stealth mode (discussed below in further detail), for instance, in case of a hostile transition (e.g., an acquisition of one business by another business) where the correctness and completeness of a traditional transition approach (where input from the SME is sought after to understand the process) is not possible.

The impact of continuous technology transformations can make it challenging to maintain a system in an "always on" mode with high-availability. With a continuous trail of technology transformations, it becomes difficult to keep track of the changes in a workflow process, and in some cases, the information pertaining to the workflow process is not updated.

Most businesses attempt to automate repetitive and manual processes. A business portfolio may include processes involving multiple in-house and commercial off-the-shelf (COTS) applications running on multiple servers in multiple locations. The complexity of information technology (IT) systems needed to run a business can be high. Even if the ideal systems, databases, applications and/or application platforms are identified for automation after an involved manual analysis, the feasibility and complexity of automating a workflow process remains unknown, at least at the beginning. Hence the automation roadmap cannot be predicted with confidence.

The system and method disclosed herein is a system that addresses the challenges discussed above, and seamlessly captures and retains information. The technical details captured by the system are used to define the automation roadmap of the workflow process and are further used in a line-of-business (LOB) application. An LOB application is one application from a set of critical computer applications that are vital to running an enterprise, and contains a number of integrated capabilities and ties into databases and database management systems.

The system and method disclosed herein are designed to record a series of screen captures in real-time that can assist in re-tracing the steps that an individual took to complete a business workflow process across various business applications (including applications, application platforms, systems and/or databases), and generate one or more workflow process maps. A time and motion study can also be initiated based on information derived from the screen captures. An automation score is generated, and analyzed to project the overall automation return on investment (ROI) and to establish the foundation of automation-roadmap. The features described herein can be configured, in various embodiments, to be used by different set of users in different roles, viz. Recorder, Editor, Recorder and Editor, Reviewer and User Manager, for example, using Role-Based Access Control (RBAC). The Recorder role is typically identified to perform the workflow-recording, and so, in some embodiments, the features accessible to this role are limited to perform recording only. In practice, these roles can be assigned to subject matter expert (SME) of the workflow.

FIG. 1 is a flow diagram of generating a workflow process according to an embodiment.

Referring to FIG. 1, multiple raw recordings for performing a specific workflow are generated by recording or capturing, in real-time, multiple screen captures as an individual is performing the specific workflow, at 110. A "screen capture" (also called screenshot or screen grab) is a digital image of what should be visible on a computer monitor, television, or other visual output device. A "workflow" is an orchestrated and repeatable pattern of activity, enabled by the systematic organization of resources into processes that transform materials, provide services, and/or process information. The multiple screen captures occur in series. The multiple screen captures each occur in a control application, or on a control application platform or a control system.

In some embodiments, some of the screen captures may be unrelated to the specific workflow. For instance, the individual can be simultaneously performing a specific workflow while performing an unrelated task (e.g., responding to an email unrelated to the workflow during recording), and therefore, screen captures related to the workflow can be interposed between screen captures related to the unrelated task. As another example, the individual can be simultaneously performing two completely different workflows, and therefore, screen captures related to a first workflow can be interposed between screen captures related to a second workflow. As explained in further detail below, the unrelated screen captures can be removed from the related screen captures.

In an embodiment, each of the screen captures can be performed on a different control application, control application platform, and/or control system than the other screen captures. In an alternative embodiment, each of the screen captures can be performed on a same control application, control application platform, and/or control system as the other screen captures. In yet another embodiment, two or more first screen captures can be performed on a same control application, control application platform, and/or control system, and two or more second screen captures can be performed on a control application, control application platform, and/or control system other than that of the two or more first screen captures.

In an embodiment, the recorder non-intrusively records the screen captures by not interacting with the control application, control application platform, and/or control system. The recorder non-intrusively records the screen captures by not interfering with actions taken by the individual. The recorder can record the screen captures without providing a display box that is visible on the computer monitor, television, or other visual output device so as to not draw the attention of the individual.

The raw recordings are stored in an encrypted file that cannot be opened in a readable format to prevent the raw recordings from being exposed as clear-text. The encrypted file is transmitted to a process enricher.

The process enricher can optionally modify the raw recordings by, for instance, removing unrelated raw recordings or adding related steps or information, annotating the raw recordings with captions or other information, masking features in the raw recordings, or performing other modifications.

As discussed above, one or more of the raw recordings recorded by the recorder may be unrelated to the workflow. In an embodiment, at 120, the unrelated raw recordings can optionally be removed by the workflow aggregator to reduce noise or unwanted information from being included in the workflow process.

At 130, a caption can optionally be assigned to one or more of the raw recordings.

At 140, information in the raw recordings and/or data captured during the recording can optionally be masked to prevent disclosure of sensitive information. Masked information and/or data may be permanently omitted, and cannot be recovered back to ensure that the sensitive information is not exposed in clear text.

In an embodiment, other attributes associated with the screen captures can be captured during the recording (e.g., screen name, application name, application technology, technical signatures, or similar attributes). At 150, one or more of the raw recordings can optionally be supplemented with respective attributes for better understanding of the workflow.

The modified raw recordings are used to generate a workflow data file containing a graphical representation of steps, in a sequential order, for performing a process for completing the workflow (referred to a "workflow process"), at 160. The workflow data file can be password protected.

After generation of the workflow data file, assessment reports can be generated, at 170. For instance, automation complexity and feasibility indexes (at the workflow and workflow process levels) can be derived to assist with establishing the priority within the automation roadmap. The assessment reports can include metadata of the workflows, technology stack of the applications in the workflow, a time and motion study for the steps in the workflow process, technology and usage metrics of the applications, or similar information.

FIG. 2A is a recorder system for generating a workflow process according to an embodiment. FIG. 2B is a flow diagram of the steps for generating a workflow process using the recorder system in FIG. 2A according to an embodiment.

Referring to FIGS. 2A and 2B, a recorder system 200 is configured to capture an individual's interactions (e.g., on a computer) as the individual is performing a specific workflow or a specific business transaction by recording, in real-time, two or more screen captures occurring in series. The captured information is helpful in understanding a specific flow of a business transaction in real-time scenarios. The information generated from the individual's interactions is used to analyze technical and business attributes of the workflow.

Referring to FIG. 2A, input files 217 can interact, via various business applications 205 (e.g., a desktop application, a browser application, and/or mainframe apps), with recorder system 200. In an embodiment, a user 210, such as a technical source (e.g., business system analyst or a SME), can also interact with recorder system 200. Input files and/or the user 210 can interact with 215A, 215B, 215C recorder system 200 by, for example, initiating or starting recording 201 or stopping 202 the recording, establishing the settings of the recorder, or performing similar functions. Recorder system 200 records screen captures and captures information irrespective of the technology of application and/or the platform of business application 205. "Technology of application" refers to various software programming languages that are used to build the application like JAVA, APPLETS, JAVA SWING, .NET, PYTHON, PHP, JSP, JSF and similar technologies. "Platform application" refers to whether the application is a desktop based, web-based, or invoked via a mainframe emulators like PCOMM, REFLECTION, or a similar mainframe emulator.

From the recording of the screen captures, recorder system 200 generates raw recordings or raw data. The raw recordings can be stored in an encrypted file that is in .xml or .dat file format.

In an embodiment, recorder system 200 is deployed on at least one business application 205 for recording one or more workflows or business transactions. Typically, related workflows for an identified workflow process are recorded together. The one or more workflows or business transactions each involve the individual, whom performs the specific workflow or the specific business transaction, interacting with at least one business applications 205. The browser applications can be INTERNET EXPLORER, CHROME and/or FIREFOX. However, functionality of recorder system 200 is not limited thereto. Business application 205 can be built using different technologies (such as JAVA, .NET, PYTHON, or a similar technology.), or a COTS product that is specifically designed to perform a set of functions as required by the business. Business application 205 can be a desktop application or a file based system such as MICROSOFT EXCEL or WORD. The workflow or business transaction can include using a same business application 205 multiple times to perform specific activities.

Recorder system 200 operates separately from business application 205. Recorder system 200 is configured to record the screen captures in a non-intrusive, seamless mode whereby recorder system 200 does not interfere with the operation of business application 205, activities performed by the individual performing the specific workflow or the specific business transaction, or displays viewed by the individual performing the specific workflow or the specific business transaction. For instance, during recording, a recorder user interface (UI) or a UI footprint is not visible on business application 205 or to the individual performing the specific workflow or the specific business transaction. Recorder system 200 does not request or require that business application 205 expose any information via an application program interface (API) that uses HTTP requests to get, put, post and/or delete data (e.g., a REST API) in order to record the screen captures. Business application 205 does not have to be modified, reconfigured or require additional configuration to enable recorder system 200 to record or capture the screen captures.

In an alternative embodiment, a recorder user interface (UI) or a UI footprint can be made visible on business application 205 or to the individual performing the specific workflow or the specific business transaction if the individual invokes recorder system 200 by clicking on an icon for recorder system 200 in, for example, a system tray.

In an embodiment, recorder 200 has at least one listener module 215A, 215B, 215C that is configured to record detailed screen captures and collect information from an underlying component within at least one business application 205 during recording. Listener modules 215A, 215B, 215C can include a processor configured to record the screen captures. Listener modules 215A, 215B, 215C are initiated as soon as recorder system 200 is invoked on business application 205.

In an embodiment, listener modules 215A, 215B, 215C can be a desktop listener module 215A, web-based application listener module 215B and/or a mainframe listener module 215C. As business applications 205 are usually a subset of a desktop, a web-based application or a mainframe application, the activities and/or events generated after a mouse click or a key stroke over any underlying component of business application 205 are recorded and captured by recorder system 200.

Desktop listener module 215A is configured to record or capture desktop-based activities including a desktop application, machine details, drivers, software and hardware details, applications, file system, display information, networks, ports, or similar information.

Web-based application listener module 215B is configured to collect inputs on any activity that is active on an http (or https) protocol. Browsers like CHROME, INTERNET EXPLORER and FIREFOX are supported by listener modules 215A, 215B, 215C. Web-based application listener module 215B records or captures request data, response data, originating IPs, data headers, encryption details, or similar information.

Mainframe applications are accessed using mainframe emulators like PCOMM and REFLECTION. Mainframe listener 215C is configured to record or capture activities performed over the mainframe emulators.

In an embodiment, recorder system 200 is configured to be switched on or started, at 201, by an individual so that the individual knows that his/her interactions and activities on business application 205 will be recorded. Upon being switched on, recorder system 200 is configured to record screen captures and capture information by recording screen captures at a pre-set repetitive time interval or in response to any human interaction, for example, using mouse (e.g., mouse-left-click, mouse-right-click, scroll, or similar actions), keystrokes (e.g., tab, enter or pressing any key on a keyboard), touching a display screen, external audio including (e.g., sound files, voice recognition, or other forms of audio.), external video, eye-tracking, or similar interactions. In various embodiments, the recorder system 200 can provide user access via Lightweight Directory Access Protocol (LDAP) integration. For example, embodiments can include dual user authentication modes: one with an organization's LDAP integration and the other with a recorder system-specific centralized database. The authentication mechanism can be configured without any change in code and may support configuration of multiple (network) domains within the organization because in a large enterprise, the users may be grouped by their geographical regions. The LDAP credentials are external to the portal and hence do not need additional management of users within the portal especially when the users leave the group or organization.

Recorder system 200 is configured to record the screen captures of a display monitor to generate the raw recordings. The raw recordings can be in a .png, .jpeg, .gif and/or .tiff format. Recorder system 200 is further configured to capture attributes of an individual's interaction with business application 205. The attributes include, but are not limited to, a number of clicks, a number of tabs, keystrokes, mouse coordinates, a number/type of applications, hops between applications and platforms, name of application, screen name, mainframe emulator session ID, process ID, memory consumed, CPU usage by the workflow at that a specific point in time, health of the computer (such as overall CPU, memory and network usage of the computer), control ID, control type (e.g., link, button, tab, grid, drop down, radio button, checkbox, or a similar control.), class name, control-data value, external audio in various formats (e.g., way, mp3, or similar formats) and video (e.g., .mp4, .avi, .asf, .mov, .flv, .swd, .mpg, .wmv, .divx), process name, process description, technology of application, platform of application.

FIG. 3 is a diagram of inputs for a recorder system according to an embodiment. As shown in FIG. 3, the recorder system can receive inputs from various sources including, without limitation, one or more applications, platforms, user profiles, a Hard Disk Drive (HDD) or other storage device, memory, network(s), devices, software, and display settings.

FIG. 4 is a diagram of screen capture modes of a business application and recording modes of a recorder system according to an embodiment.

Screen capture modes of a business application represent the visual display state of a business application at the time of the activity. If the business application 205 is performed using a single CPU, then recorder system 200 is configured to record the screen captures in an active screen mode 410. In active screen mode 410, recorder system 200 is configured to record the full screen of the active monitor. The last screen, on which a mouse was clicked, is considered the active screen. The screen capture will contain the contents of the active screen in an image format, irrespective of whether the last screen is a primary screen or a secondary screen.

If the business application 205 is performed using a single CPU connected to more than one display monitors, then recorder system 200 is configured to record the screen captures in active screen mode 410, a dual/multiple active screens mode 420, or an active window mode 430. In the dual/multiple screens mode 420, recorder system 200 capture the full screen from all of the monitors attached to the CPU. Dual/multiple screens mode 420 captures the information on all screens in a single screenshot so as to refer multiple screens simultaneously. Active window mode 430 is a subset of active screen mode 410. In active window mode 430, recorder system 200 is configured to capture only an active window of an active screen, and not the full screen of the active screen. Active window mode 430 captures the data in the form of image and in a more clear and concise manner.

Recording modes of a recorder system according to embodiments can include capturing the screen captures in a normal recording mode 440 or a stealth recording mode 450.

In the normal recording mode 440, recorder system 200 begins recording in response to an individual's interaction with business application 205 by, for example, clicking a "start recording" button on a recorder UI. Recorder system 200 prompts to provide a name to the recording workflow, and immediately starts capturing the interactions and activities. During the recording, the recorder UI is not displayed on the screen, therefore the individual is not visually distracted by the recorder UI during the recording. The recorder UI is minimized or not visible. In an embodiment, an icon can be available in the system tray to make the recorder UI visible, for example, if the individual desires to stop or pause the recording by clicking on "stop recording" button.

Recorder system 200 can be installed as a service on the end user's machine and an active-time window, within which recorder system 200 should be in activated state, can be pre-configured. In the stealth recording mode 450, recorder system 200 is configured to silently record in the background all interactions and activities as would be captured in the normal mode. After the active-time window has elapsed, recorder system 200 goes into a hibernation mode until the next active-time window. The stealth recording mode 450 allows to a user to establish non-activation windows where the recorder is in hibernate mode and is not triggered the recording of screen captures and the capture of the attributes. In stealth recording mode 450, the raw recordings captured by recorder system 200 are hidden and encrypted. The stealth recording mode 450 also allows for the control of the number raw recording files, maximum size of the raw recording files and/or a definite time-period for recording by operating in a recording calendar mode 460 (e.g., one file each for a day, a week, a night or a month).

Recorder system 200 is configured to record screen captures and capture attributes of all types of business applications 205, in a single session or in multiple sessions, irrespective of whether the business applications 205 are web-based applications or desktop-based applications or mainframe applications. Recorder system 200 supports multiple browsers, and the business application 205 could be accessed by any browser. More than one web-based application can also be on a same browser, or on multiple bowsers. A combination of activities and interactions occurring on web-based applications, desktop-based applications and/or mainframe applications can be captured by recorder system 200 in one session where an individual is not required to make a manual switch of recorder system 200 before the individual jumps from one application to another application. Recorder system 200 can also record screen captures occurring in more than one instance on a same browser, multiple browsers, a same desktop application, or multiple desktop applications, in one session.

FIG. 5A is a flow diagram of in-process data masking according to an embodiment.

Recorder system 200 is configured to perform inflight masking, at 545, while the recording of screen captures on business application(s) 505 is in progress. At 540, recorder system 200 can be pre-configured to mask specific fields depending upon their identity. The field of interest can be categorized by automation ID, class name, control type, application name, or a similar category. The categorization makes the field of interest unique. The category of fields to be mask is configurable to allow for additional attributes to be added or removed as desired. Whenever similar combination information is detected by the recorder, data-masking algorithm is implemented on the data-value for that control. In-process masking begins before a cleanup process (203 of FIG. 2B) starts. Thus, a user does have to perform manual data masking for such pre-configured fields during the cleanup process.

FIG. 5B is a blurred screen capture according to an embodiment.

In an embodiment, in-process masking can camouflage or blur an entire screen for a duration of the recording so that the sensitive information displayed on the screen during the recording is not exposed in a clear visual to a subsequent individual who may be privy to the raw recordings. In-process masking can also blurs or camouflages a raw recording of business application 205 captured during the recording. The level or degree of blurring can vary. For instance, at a lowest degree/level, the raw recordings and/or the screen of business application 205 can be lightly blurred and an image may appear slightly distorted. At subsequent degrees/level, blurring can be more intense and distortion increases until the image is unrecognizable.

Referring to FIG. 5B, blurring level is set to 2. Screen capture 500 is not clearly visible but one can see that screen capture 500 is a login screen. However, the text (the username, password, or a similar text) in screen capture 500 is not readable. Assuming the information in a screen capture is sensitive and should not be disseminated in clear text, in-process masking protects sensitive date while displaying a screen that gives an overall picture of the activity and/or interaction.

Some recordings may be lengthy and difficult to continuously record. Furthermore, an individual may have to perform activities and interactions unrelated to the workflow (such as making/receiving business calls on a telephone, replying to urgent emails, providing an urgent deliverable, or similar actions). If recorder system 200 is kept in a switched-on mode, the recorder system 200 may continue to capture the unrelated activities and interactions (such as responding to an urgent mail using an email client like OUTLOOK or a similar email client. As a result, the raw recordings will include the unrelated activities and interactions, resulting in a longer process for cleaning up the raw recordings. To avoid capturing the unrelated activities and interactions, recorder system 200 is configured to pause and resume recording. For instance, if there is an unrelated activity that individual must perform while the recording is in progress, the individual can pause recorder system 200 by, for example, in a system tray, clicking on a pause icon for recorder system 200. The activities and/or interaction henceforth will not be captured by recorder system 200 until the individual goes back in the system tray, and clicks on a resume icon for recorder system 200. Upon resuming recording, the activities and/or interactions will be recorded and appended to the previous recording. The pause/resume feature may be used multiple times in a single session.

In an embodiment, the individual can mark one or more business applications 205 as "out-of-scope" for recording. Thus, if recorder system 200 is recording and the individual performs an activity that are not part of the business workflow, recorder system 200 will record the corresponding screen capture and highlight the screen capture to indicate that the activity occurred on a business application 205 marked out-of-scope marked.

During cleanup of the raw recordings, a user may override a default configuration and mark one or more screen captures as in-scope although the screen capture was recorded on a business application 205 marked out-of-scope in the default configuration. Recorder system 200 will remove the highlighting, and the screen capture will appear as if it was recorded on a business application 205 marked in-scope.

Recorder system 200 is configured to implement the above-described include/exclude feature on business applications and/or screens.

FIG. 6 is a screenshot of include/exclude settings in a recorder system according to an embodiment.

Referring to FIG. 6, screen capture 600 depicts three business applications: CLAIMS PLUS, OUTLOOK EMAIL CLIENT, and LYNC. CLAIMS PLUS, OUTLOOK EMAIL CLIENT, and LYNC are marked as included. Therefore, all activities and interactions occurring on CLAIMS PLUS, OUTLOOK EMAIL CLIENT, and LYNC will be recorded. OUTLOOK EMAIL CLIENT and LYNC are also marked as excluded.

Therefore, all the screen captures occurring on OUTLOOK EMAIL CLIENT and LYNC will be immediately identified by recorder system 200 as excluded, and highlighted.

Example 1: assume an individual wants to record a workflow of searching for claims in a claims management system. TABLE 1 below includes the steps the individual would perform for the workflow.

TABLE 1

| Login to Application | (No action) | None | Activity Screenshots (Images) |
|---|---|---|---|
| Provide Username | Type username-text in the User-textbox | Keyboard typing | Technical signatures Platform Information |
| Provide Password | Type Password-text in the Password-textbox | Keyboard typing | Sequence of activities Time duration of activities |
| Click on Login Button | Click on 'Login' Button | Mouse click | Application Technology stack |
| Search Claims | Click on 'Search Claims' Button | Mouse click | Application Names Screen Names |
| View Particular Claim | Click on a claim link | Mouse click | Automation Complexity |
| Logoff | Click on 'Logout' button | Mouse click | Automation Feasibility Automation Roadmap Automation Scripts Graphical Navigation Flow |

*Not all outputs are discussed in this list.

In Example 1, the individual performs activities includes (i) typing text in a text box, and (ii) clicking a link or a button. The sequence of activities is combined together form a workflow or a business transaction.

FIG. 7 is a flow diagram of a series of the activities performed by the individual in Example 1. The combination of the activities in that order forms a "linear workflow" for performing a "Search Claims" workflow in the business application.

FIGS. 8 and 9 are flow diagrams of superimposed workflows according to embodiments.

Referring to FIGS. 8 and 9, two or more linear workflows for performing the business transaction can be logically grouped together under a same workflow process, for example, a "Claims Management" workflow process. Two or more linear workflows can be merged together to provide a graphical diagram of the workflow process. Activities common between two or more linear workflows can be grouped together in the graphical diagram.

Referring back to FIG. 2, process aggregator 225 is configured to merge or superimpose two or more linear workflows.

In an embodiment, recorder system 200 includes an import/export manager 220 is configured to import a recording input file that has been generated based on an earlier recording on a same business application 205, or on a recorder of a different business application 205. Import/export manager 220 can include file and data validators. The validators are configured to check the sanity of the data format, and the recording input file to ensure that the recording input file is suitable to be loaded into recorder system 200. Import/export manager 220 is configured to accommodate recordings executed using an older version of recorder system 200 (i.e., backward compatibility). If (i) a current recording is being performed by a newer version of recorder system 200 and (ii) the imported recording input file is from an older version of recorder system 200, import/export manager 220 will enrich the recording input file so that the recording input file is compatible with the current version of recorder system 200. The import/export manager 220 is also configured to export an encoded file of the raw recordings in a .xml format or .dat format.

FIG. 10 is a flow diagram of image encryption according to an embodiment.

In an embodiment, the raw recordings generated during recording of the screen captures are not stored in a default (open) mode. Referring to FIG. 10, the moment recorder system 200 begins recording the screen captures from business application(s) 1005, a two-phase image encryption 1030 is performed on the raw recordings to convert the raw recording into a binary format by inserting pre-defined hash codes at certain known file-positions, resulting in image encryption of the raw recording. The encrypted raw recordings are not in a plain text readable format.

Additional encryption is performed on the encoded raw recordings by implementing 256-bit salt encryption 1035 on the altered binary codes. A salt, as used herein, is random data used as an additional input to a one-way function that "hashes" data to safeguard data in storage. Hashing allows for later authentication, without keeping and therefore risking exposing the raw recording in the event that the authentication data store is compromised. The result of the 256-bit salt encryption 1035 is saved in a non-image format.

In an embodiment, the algorithm used for encryption is applied to decrypt the raw recording while viewing the screen image at rest in the image editor (discussed below). The encryption algorithm used can be the Rijndael algorithm, for example. Encryption restricts the raw recordings from being viewed externally. The encryption is reversible and is not permanently applied over the raw recording. A reverse logic can be implemented to view these images on the image editor.

FIG. 11A is a flow diagram of data encryption according to an embodiment. FIG. 11B is a screenshot of encrypted data according to an embodiment.

The attribute data that is captured during recording is encrypted using two-phase data encryption. Referring to FIG. 11A, the moment recorder system 200 begins capturing attribute data from business application(s) 1005, a two-phase data encryption 1130 is performed on the attribute data to convert the attribute data into a binary format by inserting pre-defined hash codes at certain known file-positions, resulting in data encryption of the attribute data. As shown in FIG. 11B, the encrypted attribute data is not in a plain text readable format.

Additional encryption is performed on the encoded attribute data by implementing 256-bit salt encryption 1135 on the altered binary codes. The result of the 256-bit salt encryption 1135 is saved in a non-image format.

In an embodiment, the algorithm used for encryption is applied to decrypt the attribute data while viewing in the process enricher (discussed below). The encryption algorithm used can be the Rijndael algorithm, for example. Encryption restricts the attribute data from being viewed externally. The encryption is reversible and is not permanently applied over the attribute data. A reverse logic can be implemented to view the data on the process enricher.

According to an embodiment, recorder system 200, once being configured and activated on an end user's computer/system, cannot be copied on to another computer/system as it is. The activation of recorder system 200 encodes the IP address of the host computer/system into the activation file. The IP address of each computer/system is unique within a given domain. A machine-specific attribute (such as an IP address in this example) can be configured to other machine-specific attributes (such as a physical asset ID or host name). The ability to configure specific machine attributes is useful in cases if the IP is generated dynamically and is not constant throughout, or if the system undergoes a refresh/reboot periodically and the IP address undergoes changes during the refresh/reboot. To prevent the creation of illicit copies of recorder system 200, if recorder system 200 (that is installed on one computer) is copied to another computer, recorder system 200 will not work if the machine-specific attributes do not match and recorder system 200 will fail to load.

In an embodiment, recorder system 200 is configured to perform in-process or inflight control of the quality of the raw recordings by adjusting dots per inch (DPI) settings of the screen captures as recorder system 200 is recording. The lower the DPI is, the lower the quality is. Controlling the quality of the raw recordings allows for control over the overall size of the raw recording file. When recorder system 200 is in the in-process control mode, recorder system 200 can selectively increase or decrease the quality of the raw recordings during the recording by increasing or decreasing the dots-per-inch (DPI) of the screen captures. In an embodiment, the minimum DPI is 100. In an embodiment, the maximum DPI is 300. However, embodiments are not limited thereto. Default DPI setting can be overridden in the settings/configuration file. In an embodiment, in-process DPI control is activated by combinational keys (e.g., CTRL+F4 for decreasing the DPI, and CTRL+F5 for increasing the DPI). The DPI settings can be configured to increase and decrease in 20 DPI increments.

In an embodiment, recorder system 200 is configured to capture black and white screen capture images and/or color screen capture images.

If the screen captures are recorded as black and white screen images, the size of the image of the raw recording is drastically reduced without compromising the information (or content) in the image and the performance of recorder system 200 improves. The ability to record the screen captures as black and white screen images is useful where hard disk drive (HDD) space availability is a challenge.

In an embodiment, recorder system 200 has a no-image capture mode whereby only other technical and/or non-technical information is captured. Thus, no screen captures are recorded if recorder system 200 is in the no-image capture mode. No-image capture mode is useful if data-only information is required. As no images are captured, the overall size of the recording file is less, making it faster to load the recording file onto a workflow aggregator (as discussed hereinbelow).

According to an embodiment, recorder system 200 has a load-no-image mode. If recorder system 200 is in the load-no-image mode, recorder system 200 temporarily ignores instructions to load images in the recorder editor. In load-no-image mode, the images are captured during the recording, however the process enricher will not display the images of the raw recordings on an image strip. Instead, an empty-thumbnail image is available on the image strip. The user has an option to click on the empty-thumbnail image to view the image of the raw recording.

Referring back to FIG. 2, recorder system 200 includes a workflow aggregator 230. Workflow aggregator 230 is configured to receive raw recording data from listener modules 215A, 215B, 215C. Workflow aggregator 230 is configured to gather and assimilate the workflow information together from listeners 215A, 215B, 215C. A workflow may receive information from any one or combination of desktop listener 215A, web-based listener 215B and mainframe listener 215C. Workflow aggregator 230 is configured to associate workflow(s) to a known workflow process, and transmit the captured information to process enricher 290.

FIG. 12 is a screenshot of an activity listing of screen images captured by a recorder system according to an embodiment.

Referring to FIG. 12, an activity data 1200 is captured during the recording. Activity data 1200 includes an activity listing 1260. Additional parameters are also captured in the activity data 1200 by activity such as time of capture 1265 and time total 1270. A complexity score 1275 and a feasibility score 1280 are calculated for each activity.

FIG. 13 is a screen shot of technical details in a technical signature according to an embodiment.

Referring to FIG. 13, a technical signature 1300 according to an embodiment includes technical details 1385 for the screen captures. As shown in TABLE 2 below, the technical signature can include a control type, a control name, a control ID, a class name, and/or a platform type. In the highlighted portion of technical details 1385, an underlying component of a control no. 1 is a text box on a web application with a class name of input #txtUserName and a control ID of XPATH:/html/body/div/div[2]/div/table/rbody/tr[3]/td/input.

TABLE 2

| | | |
|---|---|---|
| 1 | Control Type | This attribute helps to understand if the underlying component is a textbox or link or button or a similar control. |
| 2 | Control Name | This is the technical name of the underlying component. |
| 3 | Control ID | This attribute represents the automation ID of the component. For web based application, it provides the xpath of the component. This is one of the values used to automate the particular component. |

TABLE 2-continued

| 4 | Class Name | This attribute represents the class name of the component. Again this value may be used to automate the component. |
|---|---|---|
| 5 | Platform | This attribute discuss the platform of the application for the underlying component. Possible outcomes are web, desktop and mainframe. |

FIGS. 14, 15 and 16 are screen shots of workflow estimations based on the screen captures and information recorded by a recorder system according to embodiments.

FIG. 14 shows an information summary 1400 pertaining to the workflow details, input type, business application environment, key statistics, process details and additional automation attributes.

FIG. 15 shows an information summary 1500 pertaining to automation parameters such as automation details, cognitive computing and robotic process automation (RPA).

FIG. 16 shows an information summary 1600 pertaining to a cumulative summary such as cumulative details, automation reusability and other information.

The parameters shown in FIGS. 14, 15 and 16 are used to derive the automation score (discussed later) for the workflow process.

Additional information (not shown) can include system information (e.g., screen resolution), operating system, RAM, HDD, installed programs, environment variables, driver information, hostname, IP, open ports, users connected, external devices connected (e.g., USB, printers, hard disks, or a similar device).

In an embodiment, the data of the raw recording is further processed to derive a set of metrics (discussed below in further detail).

Recorder system 200 is configured to generate an audio/video (A/V) file, after the recording is completed. The audio that is recorded can include inbound audio (e.g., where an individual is executing a business transaction and interacting with an end customer on call) and/or outbound audio (e.g., where an individual is explaining a business transaction during a transition exercise). The video that gets recorded can be a digital recording of interactions and/or activities that the individual performs on business application 205. Both audio and video recordings can be configured to produce either separate A/V outputs or a combined single A/V output. The rate at which the frames are captured for a video output is configurable during recording by pre-identified combinational key strokes. The pace of the audio is recorded in real-time. However, embodiments are not limited thereto, and the pace of the audio can be configured to be reproduced at different pace if desired. The audio quality can also be controlled during recording via pre-identified combinational key strokes. The recorder also has ability to convert the individual's speech (audio) to text so that the audio content is also available in an alternative readable format.

Recorder system 200 includes a process enricher 290 that receives the raw recordings from workflow aggregator 230. Process enricher 290 is configured to process the raw recordings before transmitting the enriched raw recordings to process aggregator 225. The cleanup activities are executed using process enricher 290.

In an embodiment, recorder system 200 provides multiple features to edit the screen capture during the recording. For instance, recorder system 200 includes an image editor 295, a workflow editor 223, a metrics manager 233 and a feasibility master 243.

Image editor 295 is configured to open a raw recording file in an external editor (e.g., MS Paint) or using a snipping tool, perform image masking, perform image highlighting, replace a new raw recording, load no images, or a similar task). A viewer component, which is associated with image editor 295, is configured to convert the screen capture into thumbnail images for quick reference.

Workflow editor 223 is configured to modify or enrich the raw recordings. Workflow editor 223 is also configured to modify attributes such as name of business application, caption, screen name, technology, application platform, business caption(s), auto-predict functionality, workflow analysis.

Metrics manager 233 is configured to derive different metrics from the raw recordings. In addition to the workflow estimations shown in FIGS. 14, 15 and 16, the automation complexity score and feasibility scores, platform & technology distributions, time and motion study guidelines, overall automation score, most-time-spent applications and platforms, count of steps and screen are a few metrics generated by metrics manager 233. All of the statistical calculation are performed and managed by metrics manager 233.

A process can be a combination of multiple workflows, which exist due to various business scenarios and variation in the execution of business transactions. Every small deviation in the nature and sequence of activities creates a possibility to have a new workflow. Process aggregator 225 can contain metadata information about a business process. In an embodiment, the metadata information can be manually fed by an end user into recorder system 200. Process aggregator 225 is configured to superimpose or merge related workflows, and compare a control of a workflow with other controls of peer workflows to generate a workflow process. Process aggregator 225 can be assigned a combinational key that uniquely calls up process aggregator 225. All such common controls are grouped as a single control-representation and the variation in the workflow is depicted by providing a decision box control to emphasize triaging.

Process enricher 290 transfer the workflow process to process aggregator 225.

FIG. 17 is a flow diagram of a linear workflow process according to an embodiment.

Referring to FIG. 17, the steps for a given screen capture are combined together. For example, "Login" is the name of the screen that contains three user activities: "Enter User Name," "Enter Password" and "Click Login Button." The corresponding image of the "Login" activity is also captured and displayed if a corresponding activity-box is clicked. In addition, the screen name and the business application name are also captured by recorder system 200 during recording.

FIG. 18 is a screenshot of an activity details report for a workflow process according to an embodiment.

Referring to FIG. 18, activity details report 1800 includes a chronological list of activities grouped by application and screen name, timestamps for each activity, duration of the each activity, and an origination type of each activity. The origination type of each activity refers to how the activity was acquired. For instance, activities can be manually inserted by a user, according to an embodiment. As shown, the origination type of the Search Claim Date activity and the View Claim Date activity is inserted. Therefore, the user inserted these activities into the workflow process. The origination type of all other activities is capture. Thus, these activities were captured by recorder system 200. Activity details report 1800 can also include identity of activities that take too much time to perform, identifying a pattern of activities that are performed in a group, identifying repeated activities, identifying any anomalies in time consumed or sequence of activities, or similar information.

Activity details report 1800 can be used to perform a time and motion study for the underlying workflow process to improve the user's understanding of the overall workflow process and the productivity from the underlying workflows.

Recorder system 200 is configured to compare two or more linear workflow processes based on one or more multiple configurable attributes. In an embodiment, recorder system 200 is configured to compare any workflows. In another embodiment, recorder system 200 is configured to compare workflows by different users performing a same workflow process. The ability to compare different workflows is useful to analyze the productivity of a team for a given workflow, and multiple workflows in a workflow process. The attributes for which the workflows are compared are configurable. The attributes include, but are not limited to, time to complete the workflow, number of hops between applications for a given workflow, organized set of activities, or a similar attribute. The output of the workflow analytics can be generated as an EXCEL file. The ability to compare attributes of different workflows is useful to identify and eliminate the bad or unproductive practices performed during the execution of the business transaction. Any process compliance violation can be quickly highlighted based upon base-configuration of activities that are marked as master workflows.

FIG. 19 is a snapshot of metrics generated from a workflow comparison according to an embodiment.

According to an embodiment, the raw recordings and/or the workflow processes displayed in process enricher 290 and/or process aggregator 225 can be edited further by using an external image editor such as MICROSOFT PAINT and a snipping tool. Recorder system 200 is configured to open the raw recordings and/or the workflow processes with MICROSOFT PAINT and a snipping tool. By allowing the raw recordings and/or the workflow processes to be accessed by an external image editor, additional features of the external image editor can be accessed and/or the raw recordings and/or the workflow processes can more appropriately be fine tuned to the activities performed. In an embodiment, recorder system 200 can be configured to automatically save the modified image from external image editor to a native image folder within recorder system 200.

In an embodiment, recorder system 200 is configured to replace one or more of the raw recordings with a new image, allowing the user to further customize a particular activity in the workflow process with an alternative activity or an alternative representation of the activity than that captured in the raw recording. The user can select any image on a local (or network) desktop, and associate the selected image with the current activity. The flexibility of allowing replacement images is useful, for instance, if sensitive information is on the screen and masking all these regions would have to an extent spoiled the visual information in the image.

A process can be a combination of multiple workflows that represents different scenarios and variations of the workflow process. At times, the variation within a scenario is a mere difference, and recording the entire workflow to highlight these small variations is not practical. However, such variations should not be ignored as they are alternatives in the entire workflow process. In such cases, it is advisable to reuse the most common workflow and record only the unique variation for the new workflow. The steps that are unique to the variations can be inserted into the common workflow in a chronological position, allow for all variations of the workflow to be included in the workflow process and for each individual workflow that has very small variations between each other to be recorded.

The clarity of the screen captures recorded by recorder system 200 is dependent on the resolution of the underlying system or business application 205 where recorder system 200 is installed. Some applications have relatively small fonts and a substantial amount of information on a single screen, resulting in low readability of the screen capture. The user can double-click on the screen capture using process enricher 290 to open the screen capture in a zoom editor. Using the mouse scroller, the user can zoom-in or zoom-out the image to identify/read finer details much more clearly. The zoom out and zoom in are capped at 800%. Furthermore, multiple monitor screens may have different screen resolution and the images captured by the recorder system 200 may produce screenshots that are either not consistent or readable. Thus, embodiments can include a resolution converter component to configure the resolution of each monitor screens and produce uniform screenshots with optimum resolution.

Recorder system 200 is configured to capture two or more linear workflows each representing a unique variation within the process. Recorder system 200 is configured to superimpose or merge related workflow processes (e.g., workflows of a given process or subprocess) to form a single workflow process in a nested view of the entire workflow process. An individual or multiple workflow processes, or the merged or superimposed workflow processes, are displayed in a graphical representation and are saved in BPMN 2.0 and MICROSOFT VISIO file formats.

FIGS. 20, 21 and 22 are screenshots of different formats of superimposed workflow processes according to embodiments.

FIG. 20 depicts a superimposed workflow process 2000 where the most-visited-paths are superimposed to identify the high-traffic routes of interactions that can lead to the identification of priority tasks in the automation roadmap. FIGS. 20A to 20C are enlarged portions of FIG. 20, and FIGS. 22A and 22B are enlarged portions of FIG. 22.

Attributes of the raw recordings that are captured during the recording are utilized to derive intelligent metrics as output. One of the objectives of identifying the previously-discussed attributes is to derive automation complexity and feasibility for each activity and/or interaction of the workflow. Other metrics that are derived include most time spent application(s), most time spent platform(s), most time spent screen(s), frequently used application(s), screen(s) and/or platform(s), time and motion list of sequential activities, platform wise time spent on application(s), or a similar metric.

In an embodiment, recorder system 200 is configured to identify steps that require cognitive computing steps by understanding the underlying component and the application information. For example, if the user clicks on a scanned PDF, recorder system 200 can identify that the mouse-click is on a PDF file (type of application) and that the object is in an image (as the PDF is in scanned mode). Thus, recorder system 200 is configured to perform cognitive computing to understand the content of the scanned PDF.

Recorder system 200 is configured to capture the data (and the screen capture image) locally on the users' machine. The raw recording may need additional processing (or clean-up) to derive, or generate, the final outputs.

As mentioned above, recorder system 200 is configured to pick up application names, title(s), a default caption for each activity that the user performs while capturing the workflow.

The application programming interface (API) that is used to extract information from the underlying application is provided by a library such as MICROSOFT-UICOMM wrapper. The default information captured by recorder system 200 has technical nomenclature and may not be used in spoken or written form to refer the business application(s). Process enricher 290 is configured to modify the application names, screen names and captions that are provided by recorder system 200 as default. Process enricher 290 provides multiple filters such as screen captions, application names, out of scope applications, marked screens, technology and platform of the underlying business application 205 to limit the view of displayed data by applying one or more filters together. The activities that are filtered can be selected in one-go or deleted by a one-click delete button. Mass-grouping of the activities to be selected or deleted allows for unrelated screen captures to be modified or removed in a fast and efficient manner. The mass-group feature is provided on a single screen that helps to override the default captions for the workflow activities.

In an embodiment, a caption textbox of recorder system 200 has an auto-predict feature that provides suggestions for possible captions such as, for example, the name of application, name of the screen, and marking a screen as "excluded," for the screen captures based on captions provided in a library containing similar historical activities (for a same workflow, or different workflows). The auto predict algorithm looks for similarities in screen captures using configurable technical signatures of a control based on multiple attributes (e.g., automation ID, class name, application, screen name). The match percentage to identify similar controls from history can be increased by relaxing the combinational technical attributes. The latest caption for such combination is picked up and provided as a suggestive caption.

In an embodiment, recorder system 200 includes a bulk replace-with feature that helps to replace the textual representation of application, screen name, technology, platform and caption of multiple activities in one click. The bulk replace-with feature allows for modification of the text of multiple screen captures at one time to save time editing.

Recorder system 200 is configured to intelligently identify the activities and interactions that require cognitive computing based on key technical attributes such as nature of application and other automation details (ID, class name, or similar details). For example, recorder system 200 is configured to identify that the underlying application is in a PDF format, that the application is not in a native format, and that the application has information in the form of a scanned image. Recorder system 200 is configured to mark an activity as "requires cognitive computing," and is useful to derive the automation feasibility score and the automation complexity score of the activity. For example, if the "requires cognitive computing" is marked as "yes," then the markers serves as a hint that the technical signatures (class name, automation ID, or similar information) alone may not be sufficient to automate the activity. Such activity may require additional effort to identify how exactly the automation of that activity can be achieved. This directly impacts the automation complexity of that activity.

FIG. 23 is a screenshot of a workflow editor according to an embodiment.

Referring to FIG. 23, workflow editor is configured to enhance the metadata of the workflow, as discussed above. In FIG. 23, the caption, application name, screen name, platform can be modified over the default values.

In an embodiment, recorder system 200 is configured to detect the platform of the underlying business application 205, for example, whether it is a desktop based application, a browser based application or a mainframe based application. The detected platform can be overridden by the end user. Recorder system 200 has the ability to learn the corrections performed in the prior workflows and provide the most correct (and the latest) value for the said attribute.

In an embodiment, business applications 205 can be a COTS applications or simple files (such as an EXCEL file or a WORD file) used to perform the workflow. Recorder system 200 is configured to associate business applications 205 with a technology stack (e.g., JAVA, .NET, COBOL, or a similar technology). By assigning the technology stack to the business application 205, recorder system 200 is configured to project the technology stack within the workflow process to help understand the automation feasibility and complexity of the workflow.

A business process is generally a combination of multiple linear workflows. These multiple linear workflows exist due to multiple scenarios and variations in the workflow process. In some instances, there are quite a few activities that are often common between workflows for a given process. If all such workflows (for all possible scenarios and variations) are captured using recorder system 200, then it may be necessary to clean up the workflows to achieve a good output. The clean-up work of all workflows with same set of activities is time consuming, laborious and error prone. Recorder system 200 has an auto-reference feature built in, where it can associate multiple attributes of an already cleaned-up workflow to another workflow recording. The attributes that can be auto filled include, but are not limited to, application name, screen name, caption, automation complexity & feasibility scores, "requires cognitive computing," platform, technology, or a similar attribute. This rule based auto reference can be configured to match the similar set of activities based on base attributes like automation ID, class name, application name, screen name, or a similar attribute. The match percentage can be increased if the combinational matching criteria is relaxed.

Processes can have well-defined structures associated with them such as line of business, function, region, etc. These structures may represent the reference data (taxonomy) for that process. The recorder system 200 has the ability to configure and associate process taxonomies such as, for example, 'Org Structure', 'Line of Business', 'Geo Region', 'Regulatory Compliance', 'Legal Entity', 'Risk Classification', 'Control and Measures', 'Product and Services'. In some embodiments, these process taxonomies may be pre-configured as the master-taxonomy. However, the user can create new taxonomies (of n levels) as per the business requirements. Also taxonomies are optional in nature, and hence the user can selectively pick and choose the taxonomies which are relevant to the process. The taxonomies also help to group the processes so as to understand and compare multiple attributes across taxonomies.

Recorder system 200 is configured to record screen captures for the interactions and activities with business applications 205. The screen captures an image that gets associated with metadata that is captured as information for the particular interaction or activity. The association of the image is useful for providing the caption of the activity. The default caption sometimes does not provide enough intelligence to finalize the text of the caption. Hence, it becomes necessary to visualize the screen state at a particular point in time for a particular activity. Recorder system 200, using process enricher 290, generates visual of the screen state at the particular point in time for the particular activity. For example, in at least one embodiment, the user may double-click on the default caption for an activity, and the corresponding image for that activity is displayed. The user immediately understands the need and purpose of the activity and accordingly provides a meaningful caption to the activity. The image-capture feature works for single monitor and/or multiple monitors with similar or different screen resolutions and DPI. As per default settings, for multiple monitor scenario, the screen captures for all the monitors are laterally grouped to form a single image. The zoom feature helps to view the details of the image clearly if the image is cluttered because of grouping of the screenshots from multiple monitors. The user can change the default settings to capture only the "active" monitor if required.

Recorder system 200 provides default rule based captions to the activities captured. These captions are available at every step within a workflow and can be too much detail or information one to review. For example, a login screen of an application can contain following four steps—provide a User ID step, a provide password step, a "click on remember me button" step and a "click on login button" step. From a business SME standpoint, all these four steps can be represented by a single business-caption labeled as "Logon to Application." This short caption provides enough information from a business flow perspective as to what activity is performed in the workflow. Recorder system 200 provides a feature to represent two or more logical steps with a single text-representation, referred to as a business-caption. These business captions are further used to provide a business-flow graphical representation, discussed later in this document.

Recorder system 200 provides a feature that captures the screen capture of each activity and/or interaction with a business application. The screen capture represents an activity within a workflow of a process. The screenshot may contain business application's data that is sensitive to be exposed to general audience. Hence from a data security compliance perspective, it may become necessary to mask regions on the screenshot that contain sensitive information. The permanent masking feature is provided by recorder system 200 where the screen capture can be edited to provide an opaque, solid color layer exactly over the region where sensitive information is displayed in clear text. In an embodiment, the opaque and solid color rectangle is permanently superimposed over the sensitive information. In another embodiment, the opaque and solid color rectangle is temporarily superimposed over the sensitive information. This feature helps to secure the sensitive information from being exposed to external audience.

FIG. 24 is a screenshot of an image editor according to an embodiment.

Referring to FIG. 24, in image editor 2400, the username used in the workflow is sensitive, and the "User Name" text is masked with an opaque orange-color rectangle to hide (or mask) the sensitive information (also referred to as image-masking). Image masking helps to avoid exposure of specific sensitive information on the screen.

Embodiments can include an automatic bulk image masking capability in which the image masking can be configured to be master setup and applied over similar region on other screens. This saves time that would otherwise be required to mask every other image that has same sensitive information on it. The region masking is uniform in nature and hence coincides with exact size on other screen with similar region. For example, if in a workflow there are multiple screenshots has sensitive information like SSN, then user can mask only one image and can use this feature to auto-image-mask the SSN on other screens automatically. In such embodiments, the image recognition algorithm is configured to detect a similar region ("SSN" in this case) and image-mask it.

Recorder system 200 is also configured to highlight a particular region with color rectangle surrounding the region of interest to draw the attention of the end user to focus on that particular region. The highlight can be supported with a call out text to emphasize more on the activity performed on that screen. The call out graphics can be added as a superimposed layer over the original screenshot image. An additional text box is provided to discuss more on the possible rules that may be associated with the underlying step. The text (as description) for the activity can be converted into an audio file for further reference in audio format. The audio file is associated specifically to the step as additional information. A text to speech library is implemented to associate the audio with the activity.

Recorder system 200 is configured to capture screen captures in response to a mouse click. During the recording, the end user could click more than once on the same screen without a change in data on the screen. Such duplicate screens are not required and do not provide any additional information. However, it is difficult to identify and eliminate such duplicate screens. An image comparison module in recorder system 200 helps to identify, or suggest, the duplicate images obtained during recording. In some embodiments, such duplicate images can be automatically deleted. The match percentage to qualify the images as duplicate is set to 95% as default. However, embodiments are not limited thereto, and the default can be modified via the configuration file. The image comparison module not only compares the images but also compares other attributes of the activity such as application name and screen name to qualify the image as duplicate. These additional attributes are configurable and can be added or ignored via configuration file settings.

FIG. 22 is a screen shot of a BPMN file generated out of recorder according to an embodiment. FIGS. 22A and 22B are enlarged portions of FIG. 22.

The user does not have to manually create a process diagram to understand all of the scenarios and variations in the process. As shown in FIG. 22, a BPMN file 2200 can be graphically viewed using any BPMN editor such as ECLIPSE, WILD FLY BPMN or MODELIO. The BPMN file generated follows BPMN 2.0 notations and can be further used by technical architect to understand the technical design of the entire process. The common activities within a set of workflows are represented only once in the superimposed workflow. A decision box representation is used to bifurcate all subsequent activities that are different from the peer workflows. The convergence and divergence of arrows into or from an activity is achieved via the decision boxes. The bpmn file can be further used to automate the workflows using a BPMN engine.

One of the outputs of superimpose feature is automatic generation of MICROSOFT VISIO file. The BPMN file (discussed earlier) is a technical (graphical) outcome of the superimpose feature and is mostly consumed by technical team (architects). A MICROSOFT VISIO graphical representation output is more from a knowledge management perspective to understand the finer details and variations of each flow within a process. VISIO is a single view (graphical) representation of the entire process.

Recorder system 200 is configured to associate each step to a swimlane place holder. The user can either create a new swimlane place holder or use the ones defined as default within the recorder. If the user does not associate the activities explicitly to any swimlane in particular, then all the activities get mapped to the default swimlane. The user can define (via a process enricher module) multiple swimlanes and associate each activity to one of the swimlanes. The BPMN 2.0 and MICROSOFT VISIO files both support swimlanes feature. The BPMN and MICROSOFT VISIO files are generated in such a way that if these files are opened in their respective editors, the user can visualize each step into their respective swimlanes as was configured using the recorder editor. The swimlanes can represents any logical separation between activities like they can represent different actors within workflows or departments or groups. The provision to visualize activities within a single (or multiple) workflow helps to clearly identify the accountability of the activity within these actors/departments of the process. These are reusable swimlane place holders and can be used for subsequent workflows if required.

The BPMN and MICROSOFT VISIO files are generated for linear workflows as well.

For example, FIG. 21 is a screenshot of a VISIO file generated out of a recorder system according to an embodiment.

Referring back to FIG. 2A, output manager 253 is configured to transmit outputs from recorder system 23. The various output formats supported by the recorder such as word, pdf, xls, csv, visio, bpmn and similar formats are managed by output manager 253. Output manager 253 also provides reports on rich visualization platform. The reports that are generated are available online (over https or http) and can be accessed over an intranet or the internet. Output manager 253 provides a set of outbound adapters for various consumer systems such as databases (e.g., MS SQL Server, Oracle, or a similar database), version control (e.g., pvcs, MS Team foundation server, or a similar control), SMTP mail and multiple COTS automation platforms such as BLUE PRISM, automation anywhere, RANOREX, or a similar platform). The output generated by recorder system 200 is compatible enough to be consumed by these automation platforms.

FIGS. 20, 21, 25 and 26 are screenshots of various output formats for displaying workflow details, graphical diagrams in visio, bpmn formats according to embodiments.

Recorder system 200 produces a MICROSOFT WORD report as one of the outputs. The WORD report is templatized (i.e., a user is free to change/modify the graphical format (as per the customer needs) and alter the chronological order of the sections within the template without change in code). The program or the module responsible to generate the WORD report, looks for the section marker within the WORD template and places the dynamic content generated by the module's algorithm into the template file. One or more sections can be selectively ignored if the automatic dynamic content is not required for that section, in the WORD report.

The different sections of the WORD report are workflow scope, workflow metrics, application inflight time, platform distribution, web distribution, windows distribution, mainframe distribution and time and motion study details. The workflow scope section includes the pre and post activities that are carried out by the end user in order to execute the current workflow. For example the pre activities to a workflow could be downloading an EXCEL from a FTP file server, or logging into an ITSM tool and converting the stats of the task to 'Work in Progress' and alike. The post activities (activities supposed to be done after the workflow) could be informing the stake holders about completion of the task via mail, or updating a business application with a status such as completed or physically shifting the work-file to the outward tray, or similar statuses. The workflow metrics section discuss various mathematical indices that are automatically calculated by the recorder for example, the count of business applications within the workflow, the number of hops between each application, the duration of workflow before and after cleanup activities, overall automation complexity and feasibility scores of the workflow, the number of activities within the workflow before and after cleanup. Application in-process time discusses the platform and the time consumed by the user on that particular business application to identify the potential automation candidate (application) if the workflow were to be automated in near future. The listing of application name, platform and inflight time (in descending order) is available in this section. The platform distribution section pertains to the overall time consumed by the user on unique platforms like windows, web and mainframe. The listing provides platform name, inflight time and the count of steps performed in that platform. Web distribution section lists down all the applications that are web based. The listing appears in chronological order of their usage in the workflow. Other attributes like the inflight time (of web applications), and the count of steps in web application are displayed in the list. Windows distribution section lists down all the application that are windows based. The listings appear in chronological order of their usage in workflow. Similarly, the mainframe distribution section pertains to the listings of mainframe applications. The count of unique screens within each application is also displayed as one of the metrics. This helps to fine tune the automation feasibility of the underlying business application.

One or more graphs are also dynamically displayed in the WORD report:

Recorder system 200 is configured to generate an automation complexity & feasibility graphs of the top configurable applications listed according to their automation complexity and feasibility. The nature of graph (i.e., bar) can be configured to other graph types such as pie chart, line chart, area chart, or similar graphs. The color of the graph chart is also configurable. The automation complexity and feasibility is calculated by number of attributes like automation ID, class name, xpath, cognitive computing required status, robotic processing automation status, nature of input format (structured or unstructured), count of inputs, % distribution of various types of inputs, underlying technology and platform of business application, real time processing requirements, third party integration, annual volume, database/network access requirements within that workflow, need for standardization of workflow, natural language processing, or a similar attribute. The automation feasibility and complexity are reported in percentages and are discussed at each activity level. The activity level metrics are rolled up to workflow and process levels. If multiple workflows are merged together to form a process, the automation and feasibility metrics for that process can also be calculated. These metrics are important considerations for deriving automation roadmap for the processes.

Recorder system 200 provides a HTML report that has multiple menus such as clickable linear workflow, HTML video, workflow transition assurance assessment module, technical signature table, and activity timeline table. The clickable linear workflow that is a graphical representation of series of steps in sequence for a workflow. Each activity is represented by a rectangular clickable box with the caption of the activity written over it. The activities that are part of one screen are grouped together with an outer rectangular box. Each activity is joined by arrows in sequence of their appearance in the workflow. The rectangular box for the activity, if clicked, pops up the corresponding screenshot of the activity that was captured during the recording. The availability of screenshot for the activity in the workflow helps to understand the workflow more clearly.

HTML video is a video-like representation of a workflow in action. The screen captures recorded by recorder system 200 are displayed back to back optionally with a pre-configured delay of one more seconds. The combination of such series of screen captures gives an effect of video.

Workflow transition assurance assessment module is another feature that is most widely used as a job aid for new joinees to understand the workflow step by step. The time taken by the new joinee to understand each activity is automatically calculated by recorder system 200. The user can navigate forward and backward to understand the activities. The workflow transition assurance assessment module act as self-learning toolkit for new joinees and records learning efforts in the system.

The technical signature section contains the list of all the technical attributes that the recorder captures in due course of recording for the underlying component and/or business application. The attributes that are captured are automation ID, control name, class name, control type (password type, dropdown, link, text box, button, or a similar control), labeled by, help text, access key, windows-handle (hWnd), keyboard focus, enabled/disabled status, visibility (true/false) parental hierarchy, xpath, emulator session IDs, framework ID (win32 or 64 bit application), process ID, process name, process description, table & grid patterns, mouse coordinates, screen resolution, operating system, single/dual/multiple screens, or a similar attribute.

FIG. 27 is a diagram of outputs for a recorder system according to an embodiment.

Output file formats that can be generated by recorder system 200 include comma separated values (.csv) file, XML, MICROSOFT EXCEL, json, bpmn, pdf, and MICROSOFT VISIO, audio-video file (avi or mpg4).

Recorder system 200 is configured to capture the technical signature of the underlying control as discussed above. Subsequently, upon completion of the recording for the underlying business transaction, recorder system 200 generates software code that helps to automate the workflow that has been captured. Recorder system 200 supports multiple software language like JAVA, .NET, PYTHON, C++, or a similar language. that can be configured as the outbound automation script language. Multiple software languages can also be configured for a given workflow so that the architects can later decide the choice of software language for automation implementation. The automation implementation further supports multiple automation frameworks that are widely used especially in robotic (Desktop) process automation such as white framework (test stack white), CODE UI, SELENIUM AUTOMATION FRAMEWORK, WINIUM, AUTO IT, SIKULI, PIWINAUTO, or a similar technology.

As previously mentioned, recorder system 200 is able to generate automation scripts in multiple software languages. The auto-play component uses these auto generated code to compile and run the automations script to imitate the activities and interactions on business applications 205. The input data to this automation script is configurable and can be externalized via additional software code. This feature helps to revalidate the recording of the workflow and identify missing variation if any.

A complex process has typically more than 20 workflows that represent different scenarios and variation within the process. The collective graphical representation of the workflows could be confusing to understand and interpret the workflow process. A workflow analyzer makes it easy to understand each child workflow (independently or in combination) one by one. The user can pick and choose to bind the scope of workflows-under-analysis and understand them logically. Each workflow is represented by a unique color to differentiate amongst other workflows to improve the readability of the process workflow. If other child workflows get added to the mainstream bunch of workflows, the graphical representation starts becoming more and more complex. Workflow analyzer allows a user to drag the workflow activities to other empty (unoccupied) area within to understand the relationship across activities and workflows. While the rectangular boxes that represent the activities are dragged along on the canvas, it still maintains the connectivity with other activities within same or peer workflows. The canvas also allows zoom facility over the graphical representation. The zoom in and zoom out capacity is capped to 800%. Another feature that is implemented over the canvas is the ability to re-position the workflows to a center of the canvas. This is helpful especially if the user drags multiple activity boxes on the canvas and the default layout is lost. The re-positioning of workflows helps to align the workflows equally across center of canvas. The superimposed workflows are visually placed with appropriate spacing between each rectangular activity boxes without overlapping each other.

FIG. 28 is a screenshot 2800 of the workflow analyzer where three workflows are merged together according to an embodiment.

Referring to FIG. 28, workflow 2810 of the three workflows is marked as "not selected" according to an embodiment and is greyed out, increasing the readability of remaining two workflows and understand their interactions and common activities.

FIG. 29 is a flow diagram of superimposed workflows with most-visited-path information according to an embodiment.

Workflow analyzer provides a canvas that can import multiple linear workflows that gets superimposed over each other. Each workflow is represented by unique color activity-boxes. There may be some activities that are common across two or more workflows. The common activities are highlighted with the count they are commonly shared across workflows. The count is displayed between the preceding activity and the activity in question hovering over the connected arrow between these two activities. The higher the count, the more frequent are these activities performed across workflows. These paths are the most visited path in the entire sequence of the process. The "most visited path" information helps to identify the top activities that can be considered to start with for automation.

Various embodiments can also include the capability to associate default life cycle status to the workflow (e.g., rolled up to sub process and process level). These statuses may indicate the processing of the workflow that is yet to be completed so as to make it available for the end users. 'Planned', 'Recording in progress', 'Cleanup in Progress', 'Workflow submitted', 'Quality-Control', 'signed off', 'On-Hold', 'duplicate', 'Non-Recordable' are a few of the statuses that are automatically assigned based on the event that has been triggered. These statuses provide an indication of progress made in the process mapping and automation-roadmap objectives so that corrective action can be initiated in case the progress is lagging behind the project plan.

Recorder system 200 includes a bus or other communication mechanism for communicating information, and a processor coupled to a bus for processing information. The processor can be any type of general or specific purpose processor. The processor may be any type of general purpose processor, or could be a processor specifically designed to record, in real-time, screen captures appearing in series to generate a plurality of raw recordings, the captures each occurring in a control application or on a control platform; and generate a workflow data file based on the plurality of raw recordings. The workflow data file includes a graphical representation of steps in a sequential order for performing a workflow process. The workflow data file is executable by at least two selected from a workflow application and a workflow platform, such as an application-specific integrated circuit ("ASIC"). The processor may be the same processor that operates the entire recorder system 200, or may be a separate processor. The processor can implement the recording functionality described above.

Recorder system 200 further includes a memory for storing information and instructions to be executed by the processor. Memory can be comprised of any combination of random access memory ("RAM"), read only memory ("ROM"), static storage such as a magnetic or optical disk, or any other type of non-transitory computer-readable medium.

A non-transitory computer-readable medium can be any available medium that can be accessed by processor, and can include both a volatile and nonvolatile medium, a removable and non-removable medium, a communication medium, and a storage medium. A communication medium can include computer readable instructions, data structures, program modules, or other data in a modulated data signal such as a carrier wave or other transport mechanism, and can include any other form of an information delivery medium known in the art. A storage medium can include random access memory ("RAM"), dynamic RAM ("DRAM"), static RAM ("SRAM"), read only memory ("ROM"), flash memory, cache memory, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

According to an example embodiment, the memory stores software modules that provide functionality when executed by processor. The software modules include an operating system that provides operating system functionality for system, as well as the rest of the electronic device. The software modules can also include the process enricher 290 that clean-up functionality of the raw recordings (as described above). However, example embodiments are not limited thereto.

Recorder system 200 can further include a communication device (e.g., a network interface card) that provides wireless network communication for infrared, radio, Wi-Fi, or cellular network communications. Alternatively, communication device can provide a wired network connection (e.g., a cable/Ethernet/fiber-optic connection, or a modem).

The processor can be further coupled via bus to a visual display for displaying a graphical representation or a user interface to an end-user. The visual display can be a touch-sensitive input device (i.e., a touch screen) configured to send and receive signals from processor, and can be a multi-touch touch screen.

Several embodiments have been specifically illustrated and/or described. However, it will be appreciated that modifications and variations of the disclosed embodiments are covered by the above teachings and within the purview of the appended claims without departing from the spirit and intended scope of the invention.

What is claimed is:

1. A method of analyzing a workflow process using a plurality of screen captures, the method comprising:
   recording the plurality of screen captures in real-time to generate a plurality of raw recordings, the plurality of screen captures occurring in series, and each of the plurality of screen captures occurring on a control business application;
   generating, using a processor, a workflow data file based on the plurality of raw recordings, the workflow data file including a graphical representation of steps in a sequential order for performing the workflow process, the workflow data file being compatible with a workflow application;
   capturing user-interaction based data during the recording of the plurality of screen captures; and
   generating an operational metrics report for the workflow process based on said user-interaction based data to assist in establishing priority tasks within an automation roadmap of the workflow process,
   wherein the operational metrics report includes one or more of
      workflow scope,
      workflow metrics,
      application inflight time,
      platform distribution,
      web distribution,
      windows distribution,
      mainframe distribution,
      a time-and-motion study,
   wherein the user-interaction based data includes one or more of
      a click,
      a tab,
      a keystroke,
      mouse coordinates,
      a number of used-control applications,
      a number of used-control platforms,
      audio,
      video, and
   wherein the workflow data file is further based on the user-interaction based data.

2. The method of claim 1, further comprising:
   measuring a total number of hours taken to perform the workflow process according to the workflow data file; and
   reporting the total number of hours in the operational metrics report.

3. The method of claim 2, wherein
   the operational metrics report further includes one or more of an automation complexity score, feasibility score, and
   the generating of the workflow data file includes using one or more of the automation complexity score, the feasibility score.

4. The method of claim 3, wherein
   said workflow scope comprises pre and post activities carried out by a user in order to execute a workflow;
   said workflow metrics comprise mathematical indices that are automatically calculated including one or more of a count of business applications within the workflow,
a number of hops between each application,
a duration of workflow before and after cleanup activities,
a number of activities within the workflow before and after cleanup;
said application inflight time includes an identification of a platform and a time consumed by the user on a business application to identify a potential automation candidate application for consideration to be automated;
said platform distribution comprises an overall time consumed by the user on the platform;
said web distribution comprises a listing of applications that are web based;
said Windows distribution comprises a listing of applications that are windows based; and
said mainframe distribution comprises a listing of mainframe applications.

5. The method of claim 3, wherein said automation complexity score and said feasibility score are calculated based on a plurality of attributes including one or more of a like automation ID, class name, xpath, cognitive computing required status, robotic processing automation status, structured nature of input format, count of inputs, percentage distribution of types of inputs, underlying technology and platform of business application, real time processing requirements, third party integration, annual volume, database/network access requirements within that workflow, need for standardization of workflow, natural language processing.

6. The method of claim 1, further comprising:
superimposing multiple graphical representations each corresponding to one of a plurality of linear workflows to generate a merged graphical representation of a common workflow;
identifying one or more activities that are common among said plurality of linear workflows; and
calculating a count of a frequency of occurrence of each activity that is common of said one or more activities among said plurality of linear workflows,
wherein said superimposing comprises superimposing one or more most-visited-paths to identify high-traffic routes of interactions to identify said priority tasks in said automation roadmap.

7. The method of claim 1, wherein the recording of the plurality of screen captures is selective.

8. The method of claim 1, wherein
the workflow application is a diagramming and vector graphics application, and
the workflow data file is in a .bpmn format, a .vsd file format, a vsdx. file format, a .vsdm file format, or a .vdx file format.

9. The method of claim 1, wherein
the plurality of screen captures are each in an active-time window, and
the recording of the plurality of screen captures is paused if the active-time window is closed, and resumes if the active-time window is opened.

10. The method of claim 1, further comprising automatically identifying activity that requires cognitive computing.

11. The method of claim 1, further comprising generating source code for the workflow data file in at least one software language based on the plurality of raw recordings.

12. The method of claim 1, wherein the generating of the workflow data file includes encrypting at rest each of the plurality of raw recordings or metadata of the plurality of raw recordings using 2-phase 256 bit encryption to prevent output of the plurality of raw recordings in clear text.

13. The method of claim 1, further comprising
capturing a technical attribute during the recording of the plurality of screen captures; and
predicting a caption for each of the plurality of screen captures based on one or more of the technical attribute, historical references, and a standardized caption for each of the plurality of screen captures based on similar captions using natural language processing,
wherein the technical attribute includes one or more of a control ID, a control type, a control name, a class name, a control-data value, an x-path, a process name, a process ID, a process description, a name of the control business application, a name of a screen of the control business application.

14. The method of claim 1, wherein the recording of the plurality of screen captures occurs across two or more computer monitors, wherein the two or more computer monitors comprise different resolutions, and wherein the recording of the plurality of screen captures includes adjusting a resolution of the plurality of raw recordings during the recording to provide uniform resolution among screen captures from said two or more computer monitors.

15. The method of claim 1, further comprising
recording A/V data associated with the plurality of screen captures during the recording to generate a plurality of A/V raw recordings; and
adjusting a playback rate of the plurality of A/V raw recordings to correspond to a playback rate of the plurality of raw recordings.

16. A system for analyzing a workflow process using a plurality of screen captures, the system comprising:
a recorder configured to record the plurality of screen captures in real-time to generate a plurality of raw recordings, the plurality of screen captures occurring in series, and each of the plurality of screen captures occurring on a control business application;
a processor configured to
generate a workflow data file based on the plurality of raw recordings, the workflow data file including a graphical representation of steps in a sequential order for performing the workflow process, the workflow data file being compatible with a workflow application;
capture user-interaction based data during the recording of the plurality of screen captures; and
generate an operational metrics report for the workflow process based on said user-interaction based data to assist in establishing priority tasks within an automation roadmap of the workflow process,
wherein the operational metrics report includes one or more of workflow scope, workflow metrics, application inflight time, platform distribution, web distribution, windows distribution, mainframe distribution, a time-and-motion study,
wherein the user-interaction based data includes one or more of a click, a tab, a keystroke, mouse coordinates, a number of used-control applications, a number of used-control platforms, audio and video, and
wherein the workflow data file is further based on the user-interaction based data.

17. The system of claim 16, wherein the processor is further configured to
measure a total number of hours taken to perform the workflow process according to the workflow data file; and report the total number of hours in the operational metrics report.

18. The system of claim 16, wherein
the operational metrics report further includes one or more of an automation complexity score, a feasibility score, and
the generate the workflow data file includes using one or more of the automation complexity score, the feasibility score.

19. The system of claim 18, wherein
said workflow scope comprises pre and post activities carried out by a user in order to execute a workflow;
said workflow metrics comprise mathematical indices that are automatically calculated including one or more of a count of business applications within the workflow, a number of hops between each application, a duration of the workflow before and after cleanup activities, a number of activities within the workflow before and after cleanup;
said application inflight time includes an identification of a platform and a time consumed by the user on a business application to identify a potential automation candidate application for consideration to be automated;
said platform distribution comprises an overall time consumed by the user on the platform;
said web distribution comprises a listing of applications that are web based;
said Windows distribution comprises a listing of applications that are windows based; and
said mainframe distribution comprises a listing of mainframe applications.

20. The system of claim 18, wherein said automation complexity score and said feasibility score are calculated based on a plurality of attributes including one or more of a like automation ID, class name, xpath, cognitive computing required status, robotic processing automation status, structured nature of input format, count of inputs, percentage distribution of types of inputs, underlying technology and platform of business application, real time processing requirements, third party integration, annual volume, database/network access requirements within that workflow, need for standardization of workflow, natural language processing.

21. The system of claim 16, wherein the processor is further configured to
superimpose multiple graphical representations each corresponding to one of a plurality of linear workflows to generate a merged graphical representation of a common workflow;
identify one or more activities that are common among said plurality of linear workflows; and
calculate a count of a frequency of occurrence of each activity that is common of said one or more activities among said plurality of linear workflows,
wherein said superimpose comprises superimposing one or more most-visited-paths to identify high-traffic routes of interactions to identify priority tasks in an automation roadmap.

22. The system of claim 16, wherein the record the plurality of screen captures is selective.

23. The system of claim 16, wherein
the workflow application is a diagramming and vector graphics application, and
the workflow data file is in a .bpmn format, a .vsd file format, a vsdx. file format, a .vsdm file format, or a .vdx file format.

24. The system of claim 16, wherein
the plurality of screen captures are each in an active-time window, and
the record the plurality of screen captures is paused if the active-time window is closed, and resumes if the active-time window is opened.

25. The system of claim 16, wherein the processor is further configured to automatically identify activity that requires cognitive computing.

26. The system of claim 16, wherein the processor is further configured to generate source code for the workflow data file in at least one software language based on the plurality of raw recordings.

27. The system of claim 16, wherein the generate the workflow data file includes encrypting at rest each of the plurality of raw recordings or metadata of the plurality of raw recordings using 2-phase 256 bit encryption to prevent output of the plurality of raw recordings in clear text.

28. The system of claim 16, wherein the processor is further configured to
capture a technical attribute during the record the plurality of screen captures; and
predict a caption for each of the plurality of screen captures based on one or more of the technical attribute, historical references, and a standardized caption for each of the plurality of screen captures based on similar captions using natural language processing,
wherein the technical attribute includes one or more of a control ID, a control type, a control name, a class name, a control-data value, an x-path, a process name, a process ID, a process description, a name of the control business application, a name of a screen of the control business application.

29. The system of claim 16, wherein the record the plurality of screen captures occurs across two or more computer monitors, wherein the two or more computer monitors comprise different resolutions, and wherein the record the plurality of screen captures includes adjusting a resolution of the plurality of raw recordings during the record to provide uniform resolution among screen captures from said two or more computer monitors.

30. The system of claim 16, wherein the processor is further configured to
record A/V data associated with the plurality of screen captures during the record to generate a plurality of A/V raw recordings; and
adjust a playback rate of the plurality of A/V raw recordings to correspond to a playback rate of the plurality of raw recordings.

31. A non-transitory computer readable medium having instructions embodied thereon that, when executed by a processor, cause the processor to perform operations comprising:
recording a plurality of screen captures in real-time to generate a plurality of raw recordings, the plurality of screen captures occurring in series, and each of the plurality of screen captures occurring on a control business application;
generating, using the processor, a workflow data file based on the plurality of raw recordings, the workflow data file including a graphical representation of steps in a sequential order for performing a workflow process, the workflow data file being compatible with a workflow application;
capturing user-interaction based data during the recording of the plurality of screen captures; and generating an operational metrics report for the workflow process based on said user-interaction based data to assist in establishing priority tasks within an automation roadmap of the workflow process,
wherein the operational metrics report includes one or more of workflow scope, workflow metrics, application inflight time, platform distribution, web distribution, windows distribution, mainframe distribution, a time-and-motion study,
wherein the user-interaction based data includes one or more of a click, a tab, a keystroke, mouse coordinates, a number of used-control applications, a number of used-control platforms, audio and video, and
wherein the workflow data file is further based on the user-interaction based data.

32. The non-transitory computer readable medium of claim 31, wherein the operations further comprise
measuring a total number of hours taken to perform the workflow process according to the workflow data file; and
reporting the total number of hours in the operational metrics report.

33. The non-transitory computer readable medium of claim 31, wherein
the operational metrics report further includes one or more of an automation complexity score, a feasibility score, and
the generating of the workflow data file includes using one or more of the automation complexity score, the feasibility score.

34. The non-transitory computer readable medium of claim 33, wherein
said workflow scope comprises pre and post activities carried out by a user in order to execute a workflow;
said workflow metrics comprise mathematical indices that are automatically calculated including one or more of a count of business applications within the workflow, a number of hops between each application, a duration of the workflow before and after cleanup activities, a number of activities within the workflow before and after cleanup;
said application inflight time includes an identification of a platform and a time consumed by the user on a business application to identify a potential automation candidate application for consideration to be automated;
said platform distribution comprises an overall time consumed by the user on the platform;
said web distribution comprises a listing of applications that are web based;
said Windows distribution comprises a listing of applications that are windows based; and
said mainframe distribution comprises a listing of mainframe applications.

35. The non-transitory computer readable medium of claim 33, wherein said automation complexity score and said feasibility score are calculated based on a plurality of attributes including one or more of a like automation ID, class name, xpath, cognitive computing required status, robotic processing automation status, structured nature of input format, count of inputs, percentage distribution of types of inputs, underlying technology and platform of business application, real time processing requirements, third party integration, annual volume, database/network access requirements within that workflow, need for standardization of workflow, natural language processing.

36. The non-transitory computer readable medium of claim 31, wherein the operations further comprise
superimposing multiple graphical representations each corresponding to one of a plurality of linear workflows to generate a merged graphical representation of a common workflow;
identifying one or more activities that are common among said plurality of linear workflows; and
calculating a count of a frequency of occurrence of each activity that is common of said one or more activities among said plurality of linear workflows,
wherein said superimposing comprises superimposing one or more most-visited-paths to identify high-traffic routes of interactions to identify priority tasks in an automation roadmap.

37. The non-transitory computer readable medium of claim 31, wherein the recording of the plurality of screen captures is selective.

38. The non-transitory computer readable medium of claim 31, wherein
the workflow application is a diagramming and vector graphics application, and
the workflow data file is in a .bpmn format, a .vsd file format, a vsdx. file format, a .vsdm file format, or a .vdx file format.

39. The non-transitory computer readable medium of claim 31, wherein
the plurality of screen captures are each in an active-time window, and
the recording of the plurality of screen captures is paused if the active-time window is closed, and resumes if the active-time window is opened.

40. The non-transitory computer readable medium of claim 31, wherein the operations further comprise automatically identifying activity that requires cognitive computing.

41. The non-transitory computer readable medium of claim 31, wherein the operations further comprise generating source code for the workflow data file in at least one software language based on the plurality of raw recordings.

42. The non-transitory computer readable medium of claim 31, wherein the generating of the workflow data file includes encrypting at rest each of the plurality of raw recordings or metadata of the plurality of raw recordings using 2-phase 256 bit encryption to prevent output of the plurality of raw recordings in clear text.

43. The non-transitory computer readable medium of claim 31, wherein the operations further comprise
capturing a technical attribute during the recording of the plurality of screen captures; and
predicting a caption for each of the plurality of screen captures based on one or more of the technical attribute, historical references, a standardized caption for each of the plurality of screen captures based on similar captions using natural language processing,
wherein the technical attribute includes one or more of a control ID, a control type, a control name, a class name, a control-data value, an x-path, a process name, a process ID, a process description, a name of the control business application, a name of a screen of the control business application.

44. The non-transitory computer readable medium of claim 31, wherein the recording of the plurality of screen captures occurs across two or more computer monitors, wherein the two or more computer monitors comprise different resolutions, and wherein the recording of the plurality of screen captures includes adjusting a resolution of the plurality of raw recordings during the recording to provide uniform resolution among screen captures from said two or more computer monitors.

45. The non-transitory computer readable medium of claim 31, wherein the operations further comprise
- recording A/V data associated with the plurality of screen captures during the recording to generate a plurality of A/V raw recordings; and
- adjusting a playback rate of the plurality of A/V raw recordings to correspond to a playback rate of the plurality of raw recordings.

* * * * *